United States Patent
Kirsch et al.

(10) Patent No.: US 7,531,106 B2
(45) Date of Patent: May 12, 2009

(54) MESOGENIC COMPOUNDS, MEDIUM FOR ELECTRO-OPTICAL DISPLAYS AND ELECTRO-OPTICAL DISPLAY

(75) Inventors: Peer Kirsch, Kanagawa (JP); Elvira Montenegro, Weinheim (DE); Louise Diane Farrand, Dorset (GB); Detlef Pauluth, Ober-Ramstadt (DE); Michael Heckmeier, Hemsbach (DE)

(73) Assignee: Merck Patent GmbH, Darmstadt (DE)

( * ) Notice: Subject to any disclaimer, the term of this patent is extended or adjusted under 35 U.S.C. 154(b) by 527 days.

(21) Appl. No.: 10/569,459

(22) PCT Filed: Aug. 10, 2004

(86) PCT No.: PCT/EP2004/008942
§ 371 (c)(1),
(2), (4) Date: Feb. 24, 2006

(87) PCT Pub. No.: WO2005/019378
PCT Pub. Date: Mar. 3, 2005

(65) Prior Publication Data
US 2006/0286308 A1 Dec. 21, 2006

(30) Foreign Application Priority Data
Aug. 25, 2003 (EP) .................. 03018707

(51) Int. Cl.
*C09K 19/00* (2006.01)
*C09K 19/06* (2006.01)
*C09K 19/52* (2006.01)

(52) U.S. Cl. .............................. 252/299.01; 252/299.6; 430/20; 430/270.1; 428/1.1; 349/117

(58) Field of Classification Search ............ 252/299.01, 252/299.6; 430/20, 270.1; 428/1.1; 349/117
See application file for complete search history.

(56) References Cited

U.S. PATENT DOCUMENTS

| 5,344,587 | A | * | 9/1994 | Coates et al. | .......... 252/299.66 |
| 5,958,290 | A | * | 9/1999 | Coates et al. | .......... 252/299.01 |
| 6,177,154 | B1 | | 1/2001 | Matsui et al. | |
| 6,569,505 | B2 | * | 5/2003 | Poetsch et al. | .............. 428/1.1 |

FOREIGN PATENT DOCUMENTS

JP 08143498 6/1996

OTHER PUBLICATIONS

Bezborodov V S et al: "Synthesis and Properties of Some Laterally Substituted Liquid Crystals" Liquid Crystals, Taylor and Francis Ltd, London, GB, vol. 21, No. 6, Dec. 1, 1996, pp. 801-806, XP000639773.
Patent Abstracts of Japan vol. 1996, No. 10, Oct. 31, 1996.

* cited by examiner

*Primary Examiner*—Geraldina Visconti
(74) *Attorney, Agent, or Firm*—Millen, White, Zelano, Braningan, P.C.

(57) ABSTRACT

The instant invention relates to liquid crystal media comprising a strongly dielectrically positive component A, comprising one or more compounds of formula I

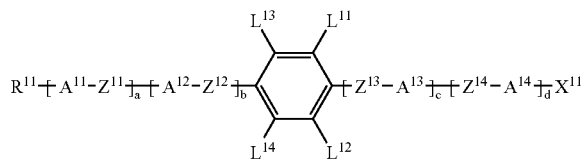

wherein the parameters have the meanings given in the text. It also relates to the compounds as such and to mesogenic or liquid crystalline mixtures comprising these compounds.

18 Claims, No Drawings

MESOGENIC COMPOUNDS, MEDIUM FOR ELECTRO-OPTICAL DISPLAYS AND ELECTRO-OPTICAL DISPLAY

FIELD OF THE INVENTION

The present invention relates to mesogenic compounds, media for electro-optical displays comprising these and to electro-optical displays comprising these media, in particular to displays using mesogenic modulation media which are in an optically isotropic state at the temperature of operation of the light modulation elements and to respective modulation elements and displays.

PROBLEM TO BE SOLVED AND STATE OF THE ART

Liquid Crystal Displays (LCDs) are widely used to display information. Electro-optical modes employed are e.g. the twisted nematic (TN)-, the super twisted nematic (STN)- and the electrically controlled birefringence (ECB)-mode with their various modifications, as well as others. Besides these modes, which all do use an electrical field, which is substantially perpendicular to the substrates, respectively to the liquid crystal layer, there are also electro-optical modes employing an electrical field substantially parallel to the substrates, respectively the liquid crystal layer like e.g. the in-plane switching (IPS)-mode (compare e.g. DE 40 00 451 and EP 0 588 568).

Besides the various different modes using the liquid crystal medium as such, oriented on surfaces, which typically are pre-treated to achieve uniform alignment of the liquid crystal material, there are applications using composite systems of liquid crystal materials of low molecular weight together with polymeric materials such as e.g. polymer dispersed liquid crystal (PDLC)-, nematic curvilinearily aligned phase (NCAP)- and polymer network (PN)-systems, as disclosed for example in WO 91/05 029. These composite systems typically use an electrical field substantially perpendicular to the composite layer.

LCDs are used for direct view displays, as well as for projection type displays. Besides these applications LCDs, especially LCDs comprising composite systems like PDLCs and in particular so called holographic PDLC (HPDLC) systems are used in practical applications. HPDLCs are described e.g. in Date, Takeuchi, Tanaka, and Kato, Journal of the SID 7/1 (1999), p. 17 to 22, which is incorporated by reference. These HPDLC displays are generating three bright colours, preferably primary colors, utilizing Bragg reflection. This technique results in excellent bright colours, as it does neither need polarizers, nor color filters. A single layer of the periodic structure of polymer and liquid crystal controls the reflection of one particular colour. To realise three primary colors consequently three layers, one for each colour are required. Each of the three layers has to be addressed independently. This requires three sets of HPDLC films, each with corresponding electrodes. This large number of layers and corresponding electrodes, which is difficult to realize with a good yield in mass production, can beneficiously be reduced when the "two-frequency" drive method is applied.

For composite systems a high $\Delta n$ of the liquid crystal used is required in order to achieve an efficiently scattering state and to realize a good contrast. Though there have been proposed PDLC-systems with liquid crystal mixtures with low $\Delta n$ to improve the so called off axis haze, the predominant problem in most cases is to achieve sufficient contrast in the first place. This is especially the case for PDLC-systems, which are disclosed e.g. in Date, Takeuchi, Tanaka, and Kanto, Journal of the SID 7/1 (1999), p. 17-22. The liquid crystals available typically are characterized by $\Delta n$ values of up to 0.280 or even up to 0.29. This upper limit, however, is still insufficiently low for many applications. Further it has so far only been achieved accepting various compromises with respect to the other properties of the liquid crystal mixtures used. The most typical undesired trade-offs are an insufficiently high clearing point, an unfavourably narrow nematic phase range, a rather high temperature for the lower end of the stability of the nematic phase, too low dielectric anisotropy and hence too high operating voltages, unfavourable elastic constants and last not least too high viscosity values or combinations thereof.

Good compatibility with the precursors of the polymers of the composite systems and easy phase separation during the formation of the composite systems are obvious prerequisites for liquid crystals for such applications.

Another promising electro-optical mode used in LCDs is the optically compensated bent (OCB) mode. This mode is described e.g. in Yamaguchi et al., "Wide-Viewing-Angle Display Mode for the Active-Matrix LCD Using Bend-Alignment Liquid-Crystal Cell", SID 93, Digest, p. 277 (1993).

This mode is very promising. It is particularly well suited for direct view applications, as it is characterised by a favourable viewing angle dependence. Also the response times are quite short. However for video rate response for the display of changing grey shades the response time still needs to be improved. Compared to a conventional TN display, in an OCB display the amount of deformation of the director is much smaller. Whereas in a TN display the director is oriented almost parallel to the substrates in the non-powered state and changes its direction to almost perpendicular to the substrates upon application of the driving voltage, in an OCB display the director orientation changes to the same final orientation, but it does start from an already almost homeotropic bent starting configuration. Thus, a higher birefringence of the liquid crystal media used is required.

Recently light controlling elements and displays using mesogenic modulation media which are in an optically isotropic state at the temperature of operation of the light modulation elements and to respective modulation elements and display have been described. DE 102 17 273 A1 as well as DE 102 41 301.0, DE 102 53 325.3 and DE 102 52 250.2, all yet to be laid open except the first one, describe light controlling elements using modulation media which are in the isotropic state at the operation temperature of the elements, whereas DE 103 13 979.6, also yet to be laid open, describes elements using modulation media which are in the optically isotropic blue phase, when operated. This type of light modulation elements is characterised by very fast response times and by an excellent contrast with minimal viewing angle dependence. However, especially in this novel type of light modulation elements and displays the temperature range of operation has not been sufficiently wide so far and the temperature dependence of the operation voltages still is quite high and has to be reduced in order to allow easier addressing over a wider range of temperatures.

The compounds should be suitable for use in mesogenic media in electro-optical displays, in particular as control media of these displays. For this purpose they should be soluble in base media with a mesogenic phase, e.g. a nematic, cholesteric, smectic or even a medium having an optically isotropic phase, e.g. a blue phase. Preferably they even should exhibit one or more of these phases as single compounds.

These compounds should lead to a decrease of the operation voltages of the corresponding electro-optical displays and of its temperature dependency. Further they should not reduce the voltage holding ratio of the media too much, in order to allow for addressing of the displays by a matrix of active elements with a non-linear electric response characteristic, i.e. in an active matrix display.

Liquid crystalline or mesogenic compounds with very high values of the dielectric anisotropy so far have mostly (with only very few exceptions) been realised by incorporation of strongly polar terminal groups especially such as a cyano (—CN) group or also a isothiocyanato (—NCS) group as e.g. in EP 01 101 157. Use of compounds of these types, however, leads to mesogenic media, especially for use in TN type displays, with rather low specific resistivity, which in turn do not match the demanding requirements for the voltage holding ratio of the media in displays driven by an active matrix, as e.g. The respective functional or modulation media used for the displays are disclosed in DE 102 17 273 A1.

In contrast, mesogenic media consisting predominantly or even entirely of mesogenic compounds with a terminal fluorine substitution or with a fluorinated terminal group, so far, do not provide a dielectric anisotropy, which is high enough to realise low operation voltages, especially if they are used in light modulation media for the displays disclosed in DE 102 17 273 which are most demanding in this respect.

Mesogenic compounds with two lateral alkoxy groups like e.g.

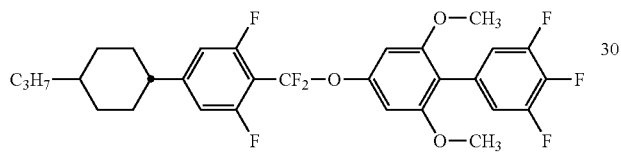

have been hinted at in U.S. Pat. No. 6,177,154. The compounds realised so far, however, do not show the extremely high values for the dielectric anisotropy and/or the optical anisotropy required here. These compounds further are not particularly reliable and neither are readily available (i.e. rather difficult to prepare), nor particularly well soluble. Thus, there is a significant need for liquid crystal media with suitable properties for practical applications such as a very high dielectric anisotropy, a suitably wide nematic phase range or at least sufficient mesogenity for use in practical media, low viscosities, appropriate optical anisotropy $\Delta n$ according to the display mode used, which also are readily accessible.

Further the media used so far for the displays disclosed in DE 102 17 273 A1 and in DE 103 13 979.6 all tend to lead to rather pronounced temperature dependence of the characteristic voltages.

Present Invention

Surprisingly, it now has been found that mesogenic media with high $\Delta\epsilon$ especially useful for displays disclosed in DE 102.17 273 A1 and in particular in DE 103 13 979.6 can be realised, which do not exhibit the drawbacks of the materials of the prior art, or at least do exhibit them to a significantly lesser degree.

Last not least, the compounds of the instant invention are particularly well suited for use in light modulation elements and displays using a modulation medium which is in an optically isotropic state, preferably in the blue phase, as disclosed in DE 103 13 979.6. In these displays the inventive compounds do lead to a significant decrease of the temperature dependence of the characteristic voltages and hence of the operation voltages and/or to a significant increase of the temperature range over which the temperature dependence is rather small.

These improved liquid crystal media according to the instant application are realized by using at least two components: a first liquid crystal component (called component A) comprising compounds of formula I, which are strongly dielectrically positive compounds with very high values of $\Delta\epsilon$ and also $\Delta n$ $$R^{11}+A^{11}-Z^{11}+_a+A^{12}-Z^{12}+_b \underset{L^{14}}{\overset{L^{13}}{\bigotimes}}\underset{L^{12}}{\overset{L^{11}}{}}+Z^{13}-A^{13}+_c+Z^{14}-A^{14}+_d X^{11}$$

I wherein a, b, c and d are independently of each other 0, 1 or 2, whereby a+b+c+d≦4;

$R^{11}$ is hydrogen, an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen; or aryl, aryloxy, alkylaryl, alkylaryloxy, alkylarylalkyl, alkylarylalkoxy, cycloalkyl, cycloalkyloxy, cycloalkylalkenyloxy, alkylcycloalkyl, alkylcycloalkyloxy or alkylcycloalkylalkenyloxy, each with up to 15 carbon atoms, wherin said in radicals being unsubstituted or mono-substituted with a —CN group or mono- or poly-substituted with halogen one ore more =CH— groups may be replaced independently of each other by =N— and/or one more —CH$_2$— groups may be replaced independently of each other by —O—, —S—, —SiR$^x$R$^y$—, —CH=CH—, —C≡C—, —CO—O— and/or —O—CO— such that nitrogen and oxygen and/or sulfur atoms are not linked directly to each other;

$L^{11}$, $L^{12}$, $L^{13}$ and $L^{14}$ are, independently of each other, hydrogen, an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen; or aryl, aryloxy, alkylaryl, alkylaryloxy, alkylarylalkyl, alkylarylalkoxy, cycloalkyl, cycloalkyloxy, cycloalkylalkenyloxy, alkylcycloalkyl, alkylcycloalkyloxy or alkylcycloalkylalkenyloxy, each with up to 15 carbon atoms, wherin said in radicals being unsubstituted or mono-substituted with a —CN group or mono- or poly-substituted with halogen one ore more =CH— groups may be replaced independently of each other by =N— and/or one more —CH$_2$— groups may be replaced independently of each other by —O—, —S—, —SiR$^x$R$^y$—, —CH=CH—, —C≡C—, —CO—O— and/or —O—CO— such that nitrogen and oxygen and/or sulfur atoms are not linked directly to each other, whereby preferably L$^{13}$ and L$^{14}$ are hydrogen, if at least one of L$^{11}$ and L$^{12}$ is not hydrogen;

L$^{11}$ and L$^{12}$ are hydrogen, if at least one of L$^{13}$ and L$^{14}$ is not hydrogen;

at least one of L$^{11}$, L$^{12}$, L$^{13}$ and L$^{14}$ is not hydrogen; and

L$^{11}$ and L$^{12}$ are not halogen at the same time;

X$^{11}$ is H, halogen, —CN, —NCS, —SF$_5$, —S—R$^z$, —SO$_2$—R$^z$, an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen; or aryl, aryloxy, alkylaryl, alkylaryloxy, alkylarylalkyl, alkylarylalkoxy, cycloalkyl, cycloalkyloxy, cycloalkylalkenyloxy, alkylcycloalkyl, alkylcycloalkyloxy or alkylcycloalkylalkenyloxy, each with up to 15 carbon atoms, wherin said in radicals being unsubstituted or mono-substituted with a —CN group or mono- or poly-substituted with halogen one ore more =CH— groups may be replaced independently of each other by =N— and/or one more —CH$_2$— groups may be replaced independently of each other by —O—, —S—, —SiR$^x$R$^y$—, —CH=CH—, —C≡C—, —CO—O— and/or —O—CO— such that nitrogen and oxygen and/or sulfur atoms are not linked directly to each other;

R$^x$ and R$^y$ are independently of each other hydrogen or an alkyl radical having from 1 to 7 carbon atoms;

R$^z$ is an alkyl radical having from 1 to 7 carbon atoms, said alkyl radical being unsubstituted or mono- or poly-substituted with halogen;

A$^{11}$, A$^{12}$, A$^{13}$ and A14 are independently of each other a ring of one of the following formulas:

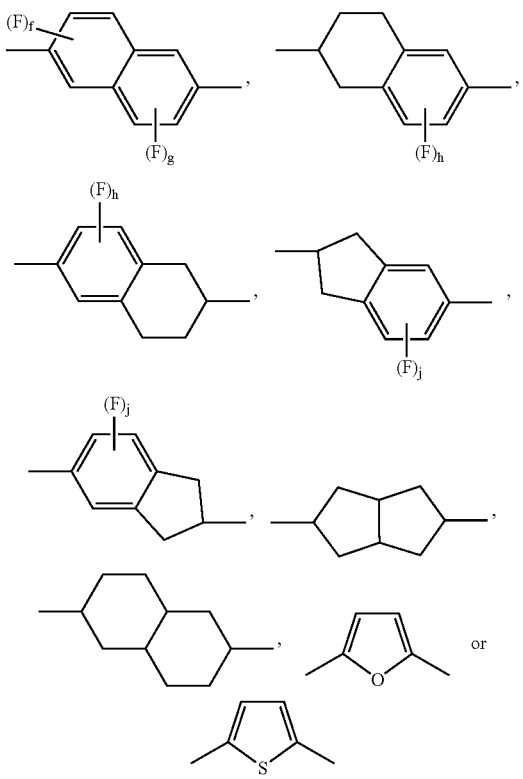

whereby each of A$^{11}$, A$^{12}$, A$^{13}$ and A$^{14}$ may be the same ring or two different rings if present more than once;

Y$^{11}$, Y$^{12}$, Y$^{13}$ and Y$^{14}$ are independently of each other hydrogen, halogen, an alkyl or alkoxy radical having from 1 to 15 carbon atoms wherein one or more methylene groups of said alkyl or alkoxy radical may be replaced independently of each other by —O—, —S—, —SiR$^x$R$^y$—, —CH=CH—, —C≡C—, —CO—O— and/or —O—CO— such that oxygen and/or sulfur atoms are not linked directly to each other, said alkyl or alkoxy radical being unsubstituted or mono- or poly-substituted with halogen; or aryl, aryloxy, alkylaryl, alkylaryloxy, alkylarylalkyl, alkylarylalkoxy, cycloalkyl, cycloalkyloxy, cycloalkylalkenyloxy, alkylcycloalkyl, alkylcycloalkyloxy or alkylcycloalkylalkenyloxy, each with up to 15 carbon atoms, wherin said in radicals being unsubstituted or mono-substituted with a —CN group or mono- or poly-substituted with halogen one ore more =CH— groups may be replaced independently of each other by =N— and/or one more —CH$_2$— groups may be replaced independently of each other by —O—, —S—, —SiR$^x$R$^y$—, —CH=CH—, —C≡C—, —CO—O— and/or —O—CO— such that nitrogen and oxygen and/or sulfur atoms are not linked directly to each other;

f, g, h and j are independently of each other 0, 1, 2 or 3;

Z$^{11}$, Z$^{12}$, Z$^{13}$ and Z$^{14}$ are independently of each other a single bond, —CH$_2$CH$_2$—, (—CH$_2$CH$_2$—)$_2$, —CF$_2$—CF$_2$—, —CF$_2$—CH$_2$—, —CH$_2$—CF$_2$—, —CH=CH—, —CF=CF—, —CF=CH—, —CH=CF—, —C≡C—, —CH$_2$O—, —OCH$_2$—, —CF$_2$O—, —OCF$_2$—, —CO—

O— or —O—CO— whereby each of $Z^{11}$, $Z^{12}$, $Z^{13}$ and $Z^{14}$ may have the same or a different meaning if present more than once, and preferably of its sub-formula I-1

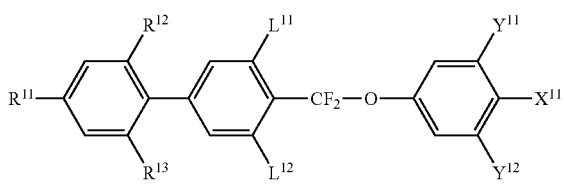

Wherein the parameters are as defined above and preferably
$R^{11}$, $R^{12}$ and $R^{13}$, independently of each other, are n-alkyl or n-alkoxy with 1 to 20, preferably 1 to 10, preferably 1 to 8, preferably 2 to 8, preferably 2 to 6 C-atoms, alkenyl, alkenyloxy or alkoxyalkyl with 2 to 20, preferably 2 to 8, preferably 2 to 6, preferably 2 to 5 C-atoms or CN, NCS, halogen, preferably F, Cl, halogenated alkyl, alkenyl or alkoxy, preferably mono-, di- or oligo-fluorinated alkyl, alkenyl or alkoxy, especially preferred $CF_3$ $OCF_2H$ or $OCF_3$, preferably $R^{11}$, $R^{12}$ and $R^{13}$ are alkoxy, preferably with 1 to 10 C-atoms, $L^{11}$, $L^{12}$, $Y^{11}$ and $Y^{12}$, independently of each other, are H, halogen, preferably F or Cl, CN, NCS, unsubstituted or halogenated alkyl, alkenyl, alkoxy, aryl, aryloxy, alkylaryl, alkylaryloxy, alkylarylalkyl, alkylarylalkoxy, cycloalkyl, cycloalkyloxy, cycloalkylalkenyloxy, alkylcycloalkyl, alkylcycloalkyloxy or alkylcycloalkylalkenyloxy, each with up to 15 carbon atoms, wherin said in radicals being unsubstituted or mono-substituted with a —CN group or mono- or poly-substituted with halogen one ore more =CH— groups may be replaced independently of each other by =N— and/or one more —$CH_2$— groups may be replaced independently of each other by —O—, —S—, —$SiR^xR^y$—, —CH=CH—, —C≡C—, —CO—O— and/or —O—CO— such that nitrogen and oxygen and/or sulfur atoms are not linked directly to each other, preferably mono-, di- or oligo-fluorinated alkyl, alkenyl or alkoxy, especially preferred $CF_3$, $OCF_2H$ or $OCF_3$, preferably F or Cl, halogenated alkyl, alkenyl or alkoxy, preferably mono-, di- or oligo-fluorinated alkyl, alkenyl or alkoxy, especially preferred $CF_3$, $OCF_2H$ or $OCF_3$, preferably at least one of $L^{11}$ and $R^{12}$ is, most preferably both are F and $Y^{11}$ and $Y^{12}$, independently of each other, preferably H or F and $X^{11}$ is H, halogen, preferably F or Cl, CN, NCS, $SF_5$, —$SCF_3$, —$SO_2CF_3$, —$SO_2C_2F_5$, —$SO_2C_4F_9$, unsubstituted or halogenated alkyl, alkenyl, alkoxy, aryl, aryloxy, alkylaryl, alkylaryloxy, alkylarylalkyl, alkylarylalkoxy, cycloalkyl, cycloalkyloxy, cycloalkylalkenyloxy, alkylcycloalkyl, alkylcycloalkyloxy or alkylcycloalkylalkenyloxy, each with up to 15 carbon atoms, wherin said in radicals being unsubstituted or mono-substituted with a —CN group or mono- or poly-substituted with halogen one ore more =CH— groups may be replaced independently of each other by =N— and/or one more —$CH_2$— groups may be replaced independently of each other by —O—, —S—, —$SiR^xR^y$—, —CH=CH—, —C≡C—, —CO—O— and/or —O—CO— such that nitrogen and oxygen and/or sulfur atoms are not linked directly to each other, preferably mono-, di- or oligo-fluorinated alkyl, alkenyl or alkoxy, preferably F or Cl, CN, unsubstituted or halogenated alkyl, alkenyl or alkoxy, preferably mono-, di- or oligo-fluorinated alkyl, alkenyl or alkoxy, especially preferred F, $CF_3$ or $OCF_3$.

In a preferred embodiment of the present invention, one or more of the groups $R^{11}$, $L^{11}$, $L^{12}$, $L^{13}$, $L^{14}$, $Y^{11}$, $Y^{12}$, $Y^{13}$, $Y^{14}$ and $X^{11}$, which are present in the compounds of formula I, is/are a chiral group, which preferably is a group of formula I*

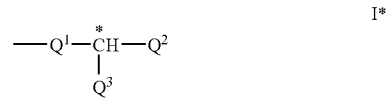

wherein $Q^1$ is an alkylene or alkylene-oxy group with 1 to 9 C atoms or a single bond, $Q^2$ is an alkyl or alkoxy group with 1 to 10 C atoms which may be unsubstituted, mono- or polysubstituted by F, Cl, Br or CN, it being also possible for one or more non-adjacent $CH_2$ groups to be replaced, in each case independently from one another, by —C≡C—, —O—, —S—, —NH—, —N($CH_3$)—, —CO—, —COO—, —OCO—, —OCO—O—, —S—CO— or —CO—S— in such a manner that oxygen atoms are not linked directly to one another, $Q^3$ is F, Cl, Br, CN or an alkyl or alkoxy group as defined for $Q^2$ but being different from $Q^2$.

In case $Q^1$ in formula I* is an alkylene-oxy group, the O atom is preferably adjacent to the chiral C atom.

Preferred chiral groups of formula I* are 2-alkyl, 2-alkoxy, 2-methylalkyl, 2-methylalkoxy, 2-fluoroalkyl, 2-fluoroalkoxy, 2-(2-ethin)-alkyl, 2-(2-ethin)-alkoxy, 1,1,1-trifluoro-2-alkyl and 1,1,1-trifluoro-2-alkoxy.

Particularly preferred chiral groups I* are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

In addition, compounds containing an achiral branched alkyl group may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methyl-propoxy and 3-methylbutoxy.

In a further preferred embodiment, which may be different or identical to the previously described embodiments, at least one and preferably one of the rings $A^{11}$, $A^{12}$, $A^{13}$ and $A^{14}$, which are present in the compound of formula 1 is a chiral moiety, preferably selected from the group of cholesterine-diyl, pinimenthol-diyl and tetrahydropyrane-diyl and most preferably tetrahydropyrane-diyl.

In a further preferred embodiment of the present invention, which may be different or identical to the previously described embodiments, one or more of the groups $R^{11}$, $L^{11}$, $L^{12}$, $L^{13}$, $L^{14}$, $Y^{11}$, $Y^{12}$, $Y^{13}$, $Y^{14}$ and $X^{11}$, which are present in the compounds of formula I, is/are PG-SG wherein SG is a spacer group and PG is a polymerisable or reactive group.

The polymerisable or reactive group PG is preferably selected from $CH_2=CW^1-COO-$,

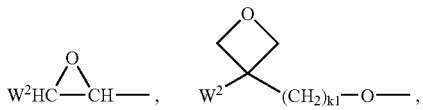

$CH_2=CW^2-(O)_{k1}-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}-Phe-(O)_{k2}-$, $Phe-CH=CH-$, $HOOC-$, $OCN-$, and $W^4W^5W^6Si-$, with $W^1$ being H, Cl, CN, phenyl or alkyl with 1 to 5 C-atoms, in particular H, $C_1$ or $CH_3$, $W^2$ and $W^3$ being independently of each other H or alkyl with 1 to 5 C-atoms, in particular methyl, ethyl or n-propyl, $W^4$, $W^5$ and $W^6$ being independently of each other Cl, oxaalkyl or oxacarbonylalkyl with 1 to 5 C-atoms, Phe being 1,4-phenylene and $k_1$ and $k_2$ being independently of each other 0 or 1.

Especially preferably PG is a vinyl group, an acrylate group, a methacrylate group, an oxetane group or an epoxy group, especially preferably an acrylate or methacrylate group.

As for the spacer group SG all groups can be used that are known for this purpose to those skilled in the art. The spacer group SG is preferably of formula SG'-X, such that PG-SG- is PG-SG'-X—, wherein SG' is alkylene with up to 20 C atoms which may be unsubstituted, mono- or poly-substituted by F, Cl, Br, I or CN, it being also possible for one or more non-adjacent $CH_2$ groups to be replaced, in each case independently from one another, by $-O-$, $-S-$, $-NH-$, $-NR^{01}-$, $-SiR^{01}R^{02}-$, $-CO-$, $-COO-$, $-OCO-$, $-OCO-O-$, $-S-$, $-CO-$, $-CO-S-$, $-CH=CH-$ or $-C\equiv C-$ in such a manner that O and/or S atoms are not linked directly to one another, X is $-O-$, $-S-$, $-CO-$, $-COO-$, $-OCO-$, $-O-COO-$, $-CO-NR^{01}-$, $-NR^{01}-CO-$, $-OCH_2-$, $-CH_2O-$, $-SCH_2-$, $-CH_2S-$, $-CF_2O-$, $-OCF_2-$, $-CF_2S-$, $-SCF_2-$, $-CF_2CH_2-$, $-CH_2CF_2-$, $-CF_2CF_2-$, $-CH=N-$, $-N=CH-$, $-N=N-$, $-CH=CR^{01}-$, $-CY^{01}=CY^{02}-$, $-C\equiv C-$, $-CH=CH-COO-$, $-OCO-$, $-CH=CH-$ or a single bond, and $R^{01}$, $R^{02}$, $Y^{01}$ and $Y^{02}$ have one of the respective meanings given above.

X is preferably $-O-$, $-S-$, $-OCH_2-$, $-CH_2O-$, $-SCH_2-$, $-CH_2S-$, $-CF_2O-$, $-OCF_2-$, $-CF_2S-$, $-SCF_2-$, $-CH_2CH_2-$, $-CF_2CH_2-$, $-CH_2CF_2-$, $-CF_2CF_2-$, $-CH=N-$, $-N=CH-$, $-N=N-$, $-CH=CR^0-$, $-CY^{02}=CY^{02}-$, $-C\equiv C-$ or a single bond, in particular $-O-$, $-S-$, $-C\equiv C-$, $-CY^{01}=CY^{02}-$ or a single bond, very preferably a group that is able to from a conjugated system, such as $-C\equiv C-$ or $-Cy^{01}=CY^{02}-$, or a single bond.

Typical groups SG' are, for example, $-(CH_2)_p-$, $-(CH_2CH_2O)_q-CH_2CH_2-$, $-CH_2CH_2-S-CH_2CH_2-$ or $-CH_2CH_2-NH-CH_2CH_2-$ or $-(SiR^0R^{00}-O)_p-$, with p being an integer from 2 to 12, q being an integer from 1 to 3 and $R^0$, $R^{00}$ and the other parameters having the meanings given above.

Preferred groups SG' are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene, 1-methylalkylene, ethenylene, propenylene and butenylene for example.

In another preferred embodiment SG' is a chiral group of formula I*':

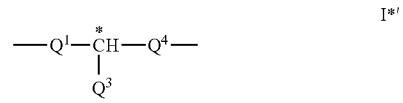

wherein $Q^1$ and $Q^3$ have the meanings given in formula I*, and $Q^4$ is an alkylene or alkylene-oxy group with 1 to 10 C atoms or a single bond, being different from $Q^1$, with $Q^1$ being linked to the polymerisable group PG.

Further preferred are compounds with one or two groups PG-SG- wherein SG is a single bond.

In case of compounds with two groups PG-SG, each of the two polymerisable groups PG and the two spacer groups SG can be identical or different.

In a preferred embodiment of the instant are compounds of formula I wherein at one or more, preferably two, three or more, of the radicals $R^{11}$, $L^{11}$, $L^{12}$, $L^{13}$, $L^{14}$, $Y^{11}$, $Y^{12}$, $Y^{13}$, $Y^{14}$ and $X^{11}$, which are resent, is/are aryl, aryloxy, alkylaryl, alkylaryloxy, alkylarylalkyl, alkylarylalkoxy, cycloalkyl, cycloalkyloxy, cycloalkylalkenyloxy, alkylcycloalkyl, alkylcycloalkyloxy or alkylcycloalkylalkenyloxy, preferably aryloxy, alkylaryloxy, cycloalkyloxy, cycloalkylalkenyloxy, alkylcycloalkyloxy or alkylcycloalkylalkenyloxy, each with up to 15 carbon atoms, wherin said in radicals being unsubstituted or mono-substituted with a $-CN$ group or mono- or poly-substituted with halogen one ore more $=CH-$ groups may be replaced independently of each other by $=N-$ and/or one more $-CH_2-$ groups may be replaced independently of each other by $-O-$, $-S-$, $-SiR^xR^y-$, $-CH=CH-$, $-C\equiv C-$, $-CO-O-$ and/or $-O-CO-$ such that nitrogen and oxygen and/or sulfur atoms are not linked directly to each other.

Preferably one or more, preferably two, three or more, of the radicals $R^{11}$, $L^{11}$, $L^{12}$, $L^{13}$, $L^{14}$, $Y^{11}$, $Y^{12}$, $Y^{13}$, $Y^{14}$ and $X^{11}$, which are present, is/are selected from the group of radicals:

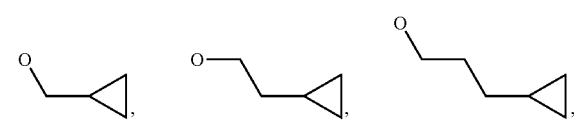

-continued

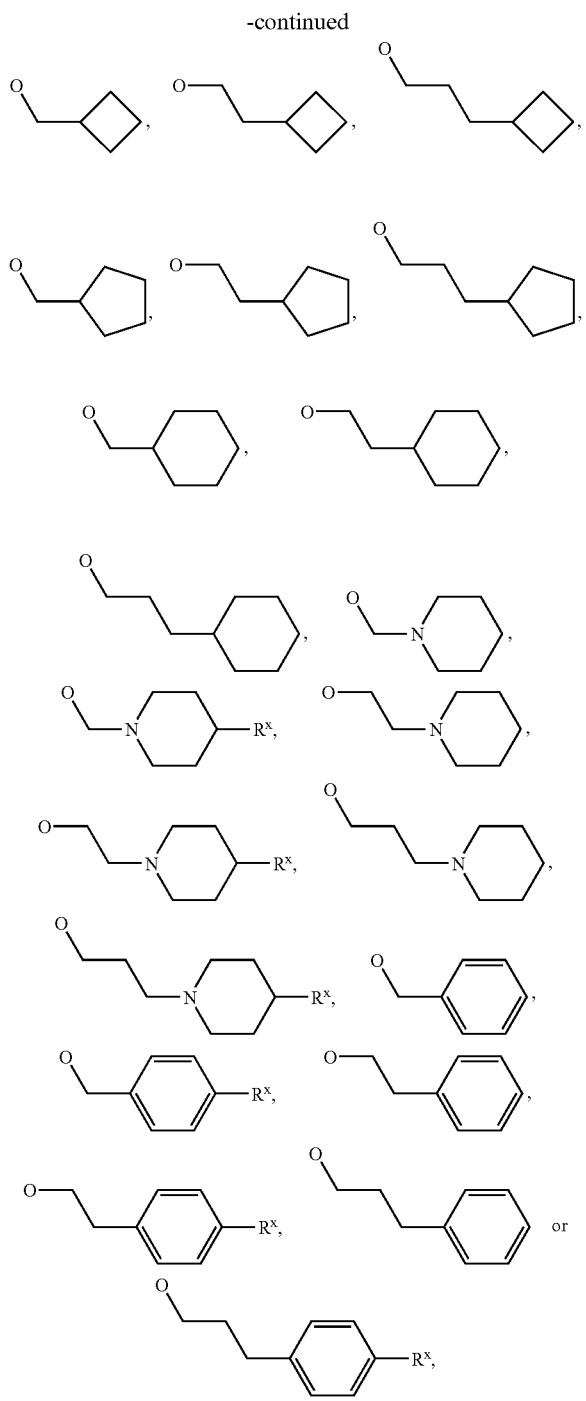

and wherein

R^x has the meaning given above and preferably is n-alkyl and most preferably methyl.

Preferably the mesogenic media according to the present invention simultaneously comprise a second mesogenic, liquid crystalline component (called component B), which is a dielectrically positive component comprising, and preferably consisting of terminally polar substituted bi- or terphenyl compounds, which or some of which optionally are laterally fluorinated, preferably of formula II

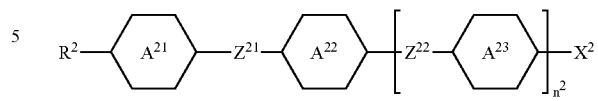

wherein $n^2$ is 0, 1, 2 or 3, $R^2$ has the meaning given for $R^{11}$ under formula I, preferably under formula I-1 above, but preferably is alkyl or alkenyl, $Z^{21}$ and $Z^{22}$, independently of each other, are a single bond, —CH$_2$CH$_2$—, (—CH$_2$CH$_2$—)$_2$, —CF$_2$—CF$_2$, —CF$_2$—CH$_2$—, —CH$_2$—CF$_2$—, —CH=CH—, —CF=CF—, —CF=CH—, —CH=CF—, —C≡C—, —CH$_2$O—, —OCH$_2$—, —CF$_2$O—, —OCF$_2$—, —CO—O— or —O—CO— (whereby each of $Z^{22}$ may have the same or a different meaning if present more than once), preferably a single bond, —C≡C—, —CF$_2$O— or —CO—O—, especially a single bond,

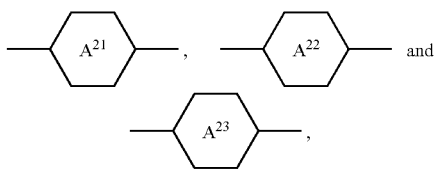

each, independently of each other, are

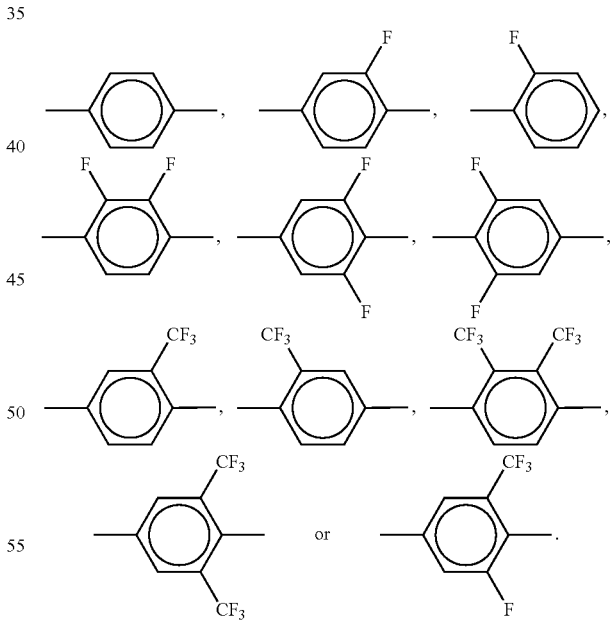

whereby

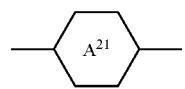

also may be

and $X^2$ is CN, $SF_5$, $SO_2CF_3$, NCS, $CF_3$, $OCF_3$, F or Cl, preferably CN, NCS or Cl, most preferably CN or NCS.

Preferably the mesogenic media according to the instant invention contain a component A comprising, preferably predominantly consisting of and most preferably entirely consisting of compounds of formula I.

The compounds of formula I, wherein at least one of $L^{11}$ and $L^{12}$ is F and/or wherein at least one of $Y^{11}$ and $Y^{12}$ is F are preferred Liquid crystal compounds in this application embrace compounds with a liquid crystalline phase by themselves as well as compounds, which are compatible with mesogenic phases, especially with the nematic phase, without decreasing the clearing point unacceptably. The latter compounds have a mesogenic structure and are also called mesogenic compounds.

The compounds of formula I can be prepared according to the following reaction schemes, Scheme 1 to 4, or variants thereof which will be easily recognized by the person skilled in the art.

Scheme 1

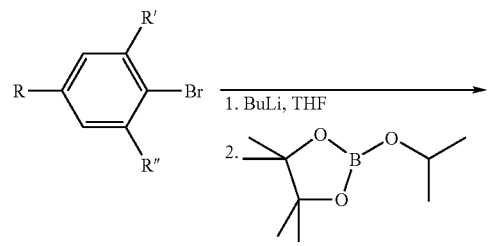

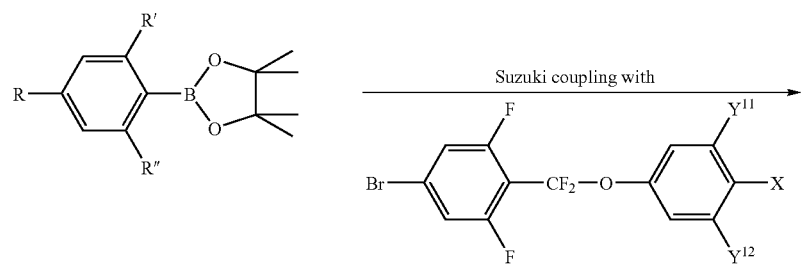

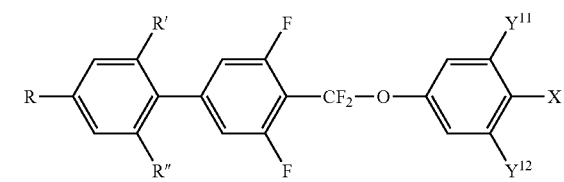

wherein
R, R' and R", independently from each other, are alkyl, alkoxy, alkenyl, alkenyloxy or oxaalkyl, preferably alkoxy, preferably R' and R" and most preferably R, R' and R" are identical to each other, and
$Y^{11}$ and $Y^{12}$, independently of each other, are as defined hereinbefore.
Scheme 2
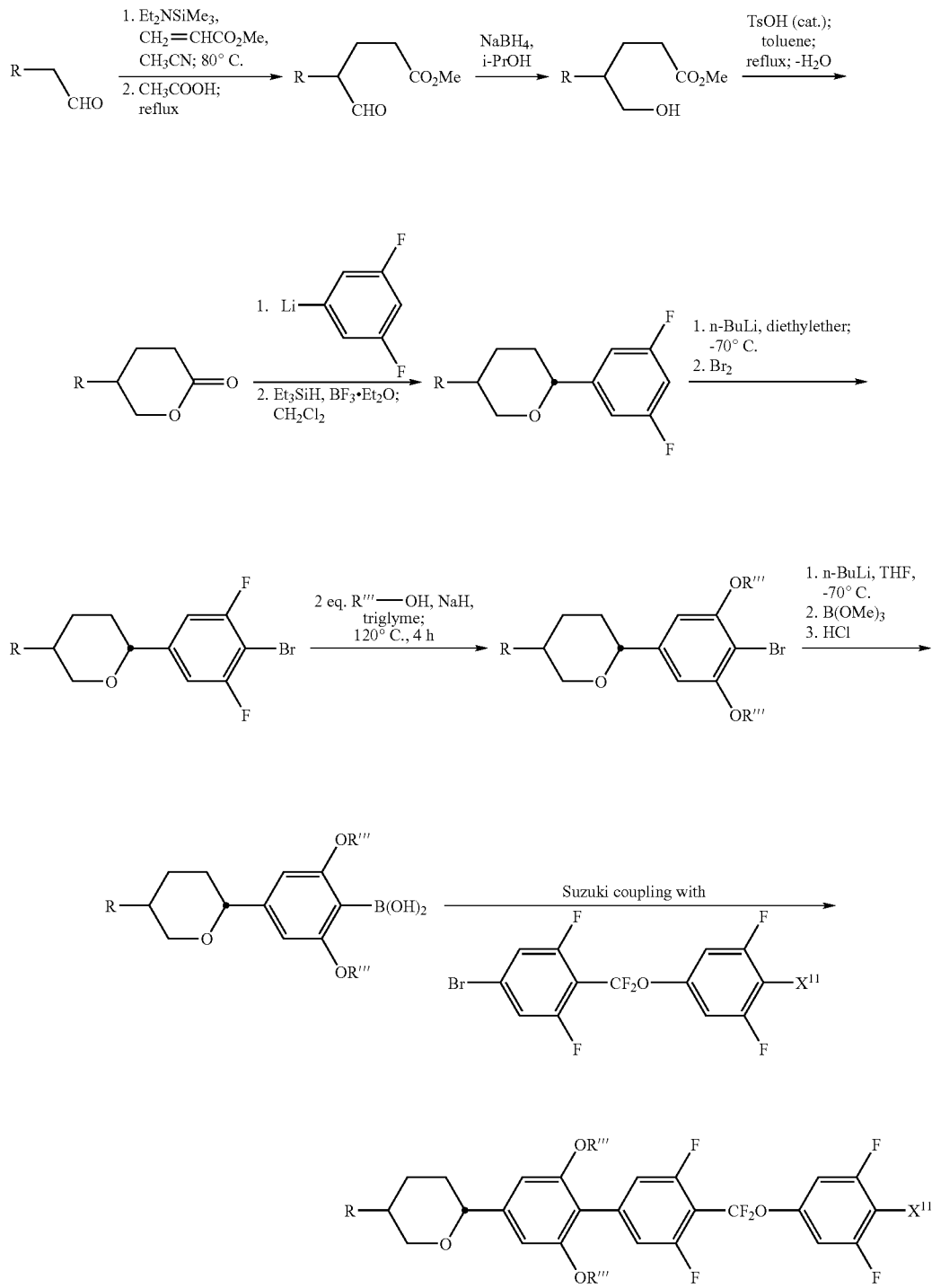

wherein R and $X^{11}$ is as defined above and R''' is other, alkyl, alkenyl, alkenyloxy, oxaalkenyl or oxaalkyl. It should be noted that —OR''' radicals having different meanings for R''' can easily be introduced by stepwise reaction of

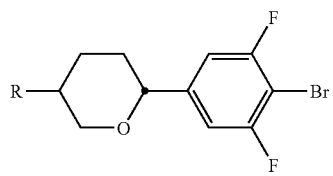

with (1) 1 equivalent of an alcohol $R'''^{a}$—OH in the presence of NaH at a reaction temperature of about 80° C. and (2)1 equivalent of an alcohol $R'''^{b}$—OH in the presence of NaH at a reaction temperature of about 120° C.

Scheme 3

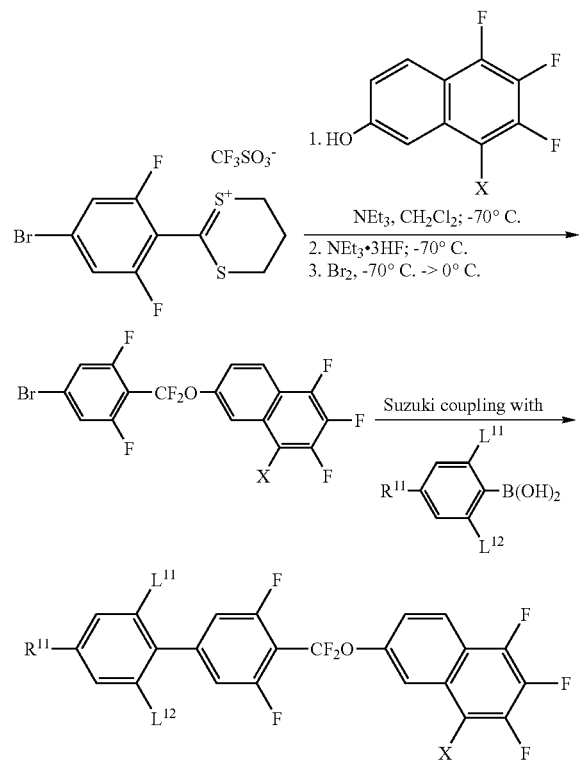

wherein $R^{11}$, $L^{11}$ and $L^{12}$ are as defined hereinbefore and X is H or F.

Scheme 4

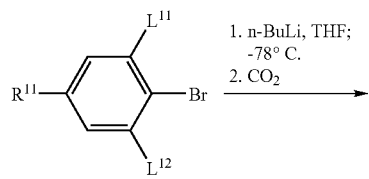

-continued

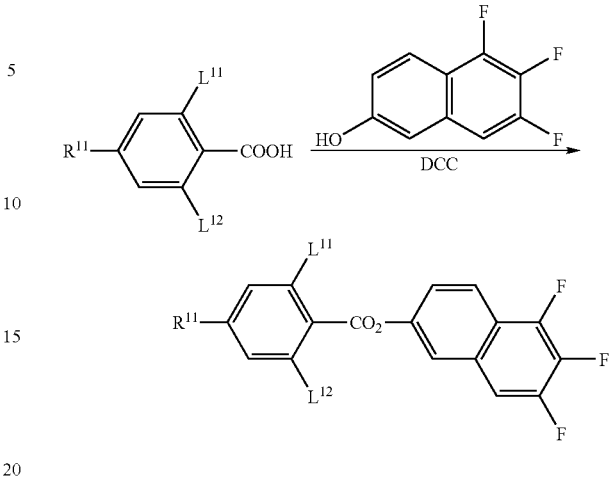

wherein $R^{11}$, $L^{11}$, $L^{12}$ have the same meaning as given above for general formula I.

Comprising in this application means in the context of compositions that the entity referred to, e.g. the medium or the component, contains the compound or compounds in question, preferably in a total concentration of 10% or more and most preferably of 20% or more.

Predominantly consisting, in this context, means that the entity referred to contains 80% or more, preferably 90% or more and most preferably 95% or more of the compound or compounds in question.

Entirely consisting, in this context, means that the entity referred to contains 98% or more, preferably 99% or more and most preferably 100.0% of the compound or compounds in question.

The compounds of formula I are preferably selected from the group of sub-formulae I-1.1 to I-1.15, especially I-1.1, I-1.2, I-1.3, I-1.4 and/or I-1.5:

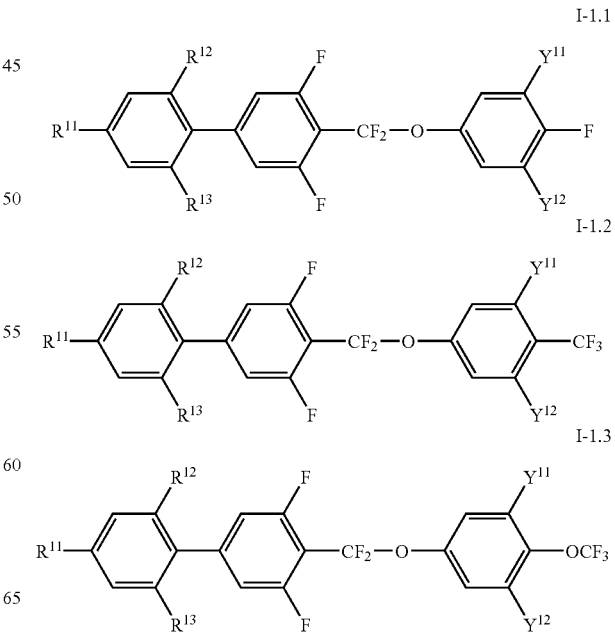

-continued

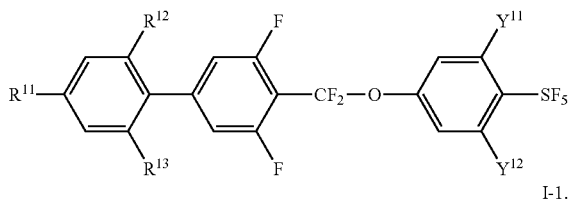
I-1.4

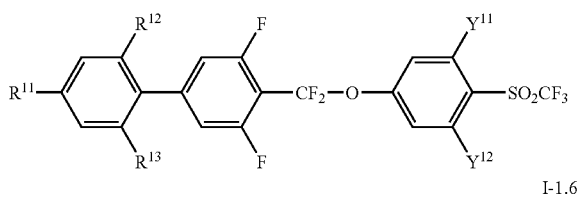
I-1.5

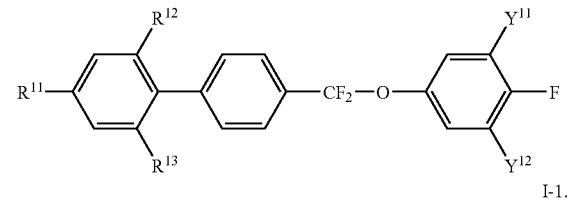
I-1.6

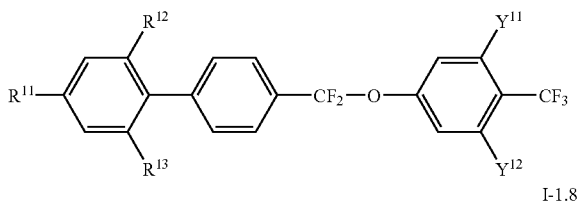
I-1.7

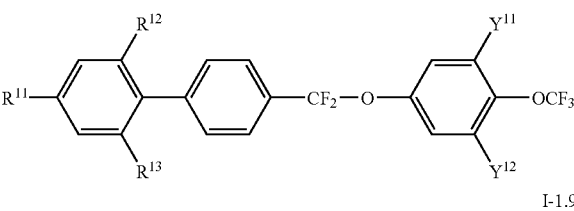
I-1.8

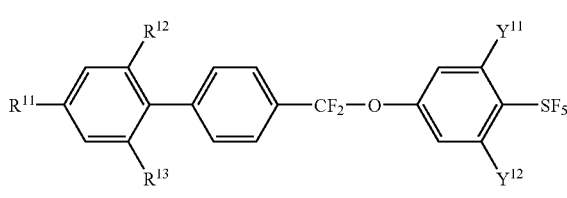
I-1.9

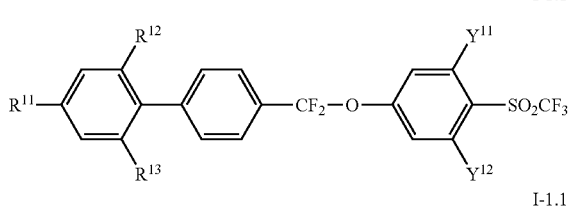
I-1.10

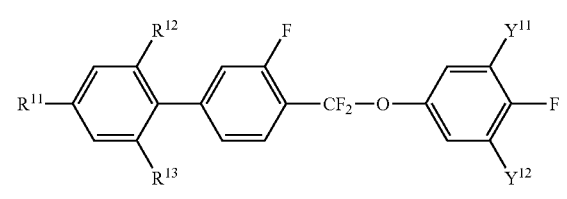
I-1.11

-continued

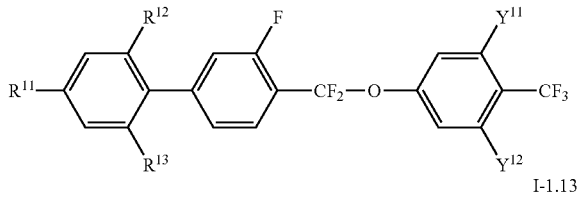
I-1.12

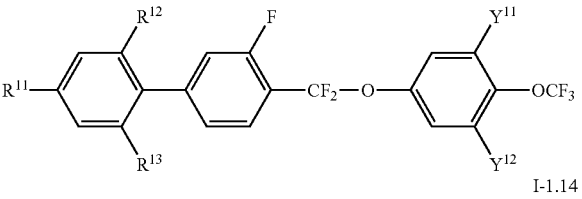
I-1.13

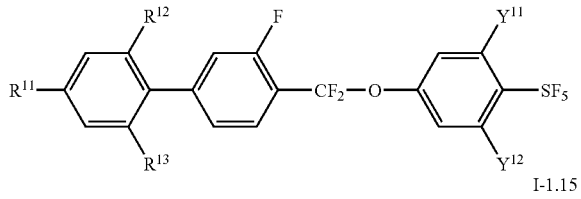
I-1.14

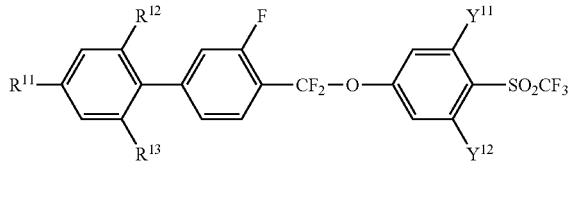
I-1.15 wherein the parameters have the respective meanings given under formula I above and preferably $R^{11}$ to $R^{13}$ are identical to each other and preferably are alkoxy, alkenyloxy, halogenated alkoxy or oxaalkoxy, and $Y^{11}$ and $Y^{12}$ are independently of each other H, $CF_3$ or F.

The compounds of formulae I-1.1 to I-1.5 preferably are selected from the group of compounds of formula I-1A

I-1A

[structure of formula I-1A]

wherein

R, R', R" X, $Y^{11}$ and $Y^{12}$ are as defined above, preferably

X is F, $CF_3$, $SF_5$, $SO_2CF_3$, $OCF_3$ or CN and $Y^{11}$ and $Y^{12}$ are independently of each other H, $CF_3$ or F.

Likewise compounds of formula I-1A having only one or no F substituent at the middle phenyl ring are preferred as well.

In a preferred embodiment the liquid crystalline media according to the instant invention contains a component B comprising, preferably predominantly consisting of compounds of formula II as defined herein before.

Preferably in these compounds of formula II
R$^2$ is alkyl or alkoxy, wherein one or more methylene groups of said alkyl may be replaced —C≡C—, and for sub-formulae IIb and IIc preferably alkyl.

Additionally the media according to the present invention may contain a component C. This component C may be dielectrically neutral or dielectrically negative, depending upon the relative amounts of compounds with positive and negative dielectrical anisotropy contained therein.

Component C is used in a concentration of 0 to 40%, preferably 0 to 20% and most preferably from 0 to 10% of the total mixture.

Optionally the inventive liquid crystal medium contains a further component D, which is a dielectrically neutral component and preferably comprises and more preferably consists of dielectrically neutral compounds.

Component D is used to adjust especially the phase range and the optical anisotropy of the inventive liquid crystal media.

The concentration of component D in the liquid crystal medium according to the present invention is preferably 0% to 40%, more preferably 0% to 25%, most preferably 0% to 15% and in particular 3 to 10%.

Optionally the inventive liquid crystal medium contains a further component E, which is a chiral component and preferably comprises and more preferably consists of chiral compounds. It is preferred that the liquid crystal medium according to the invention contains that further chiral component E.

Optionally, the inventive media can comprise further liquid crystal compounds in order to adjust the physical properties. Such compounds are known to the expert. Their concentration in the media according to the instant invention is preferably 0 to 30%, more preferably 0 to 20% and most preferably 5 to 15%.

Preferably the liquid crystal medium contains 50% to 100%, more preferably 70% to 100% and most preferably 80% to 100% and in particular 90% to 100% totally of components A and B which contain, preferably predominantly consist of and most preferably entirely consist of one or more of compounds of formulae I and II, respectively.

In the present application the term dielectrically positive compounds describes compounds with $\Delta\epsilon > 1,5$, dielectrically neutral compounds are compounds with $-1,5 \leq \Delta\epsilon \leq 1,5$ and dielectrically negative compounds are compounds with $\Delta\epsilon < -1,5$. The same holds for components. $\Delta\epsilon$ is determined at 1 kHz and 20° C. The dielectrical anisotropies of the compounds is determined from the results of a solution of 10% of the individual compounds in a nematic host mixture. The capacities of these test mixtures are determined both in a cell with homeotropic and with homogeneous alignment. The cell gap of both types of cells is approximately 10 µm. The voltage applied is a rectangular wave with a frequency of 1 kHz and a root mean square value typically of 0.1V or 0.5 V to 1.0 V, however, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest and are extrapolated to a concentration of the compounds of interest of 100%.

Components having a nematic phase at the measurement temperature of 20° C. are measured as such, all others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$, also called Freedericks-threshold $V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy ($\Delta n$) is determined at a wavelength of 589.3 nm. The dielectric anisotropy ($\Delta\epsilon$) is determined at a frequency of 1 kHz. The threshold voltages, as well as all other electro-optical properties have been determined with test cells prepared at Merck KGaA, Germany. The test cells for the determination of $\Delta\epsilon$ had a cell gap of 22 µm. The electrode was a circular ITO electrode with an area of 1.13 cm$^2$ and a guard ring. The orientation layers were lecithin for homeotropic orientation ($\epsilon\|$) and polyimide AL-1054 from Japan Synthetic Rubber for homogeneuous orientation ($\epsilon\perp$). The capacities were determined with a frequency response analyser Solatron 1260 using a sine wave with a voltage of 0.3 $V_{rms}$. The light used in the electro-optical measurements was white light. The set up used was a commercially available equipment of Otsuka, Japan. The characteristic voltages have been determined under perpendicular observation. The threshold ($V_{10}$)- mid grey ($V_{50}$)- and saturation ($V_{90}$) voltages have been determined for 10%, 50% and 90% relative contrast, respectively.

The liquid crystal media according to the present invention may contain further additives and chiral dopants. It is especially preferred that they contain chiral dopants. The total concentration of these further constituents is in the range of 0% to 20%, preferably 0.1% to 15%, more preferably 1 to 15%, especially 1 to 6%, based in the total mixture. The concentrations of the individual compounds used each are preferably in the range of 0.1 to 3%. The concentration of these and of similar additives is not taken into consideration for the values and ranges of the concentrations of the liquid crystal components and compounds of the liquid crystal media in this application.

The inventive liquid crystal media according to the present invention consist of several compounds, preferably of 3 to 30, more preferably of 5 to 20 and most preferably of 6 to 14 compounds. These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle-systems, the constituents of which are ready to use mixtures themselves.

By addition of suitable additives, the liquid crystal media according to the instant invention can be modified in such a way, that they are usable in all known types of liquid crystal displays, either using the liquid crystal media as such, like TN-, TN-AMD, ECB-, VAN-AMD and in particular in composite systems, like PDLC-, NCAP- and PN-LCDs and especially in HPDLCs. The LC media of the present invention are especially suitable for use in light modulation elements and displays using a modulation (or controlling) medium which is in an optically isotropic state, preferably in the blue phase.

The melting point T(C,N) or T(C;I), the transition from the smectic (S) to the nematic (N) phase T(S,N) and the clearing point T(N,I) of the liquid crystals are given in degrees centigrade.

In the present application and especially in the following examples, the structures of the liquid crystal compounds are represented by abbreviations also called acronyms. The transformation of the abbreviations into the corresponding structures is straight forward according to the following two tables A and B. All groups $C_nH_{2n+1}$ and $C_mH_{2m+1}$ are straight chain alkyl groups with n respectively m C-atoms. The interpretation of table B is self-evident. Table A only lists the abbreviations for the cores of the structures. The individual compounds are denoted by the abbreviation of the core followed by a hyphen and a code specifying the substituents $R^1$, $R^2$, $L^1$ and $L^2$ follows:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO•m | $OC_nH_{2n+1}$ | $C_mH_{2m+1}$ | H | H |
| n | $C_nH_{2n+1}$ | CN | H | H |
| nN•F | $C_nH_{2n+1}$ | CN | H | F |
| nN•F•F | $C_nH_{2n+1}$ | CN | F | F |
| nF | $C_nH_{2n+1}$ | F | H | H |
| nF•F | $C_nH_{2n+1}$ | F | H | F |
| nF•F•F | $C_nH_{2n+1}$ | F | F | F |
| nOF | $OC_nH_{2n+1}$ | F | H | H |
| nCl | $C_nH_{2n+1}$ | Cl | H | H |
| nCl•F | $C_nH_{2n+1}$ | Cl | H | F |
| nCl•F•F | $C_nH_{2n+1}$ | Cl | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_3$•F | $C_nH_{2n+1}$ | OCF$_3$ | H | F |
| nOCF$_3$•F•F | $C_nH_{2n+1}$ | OCF$_3$ | F | F |
| nOCF$_2$ | $C_nH_{2n+1}$ | OCHF$_2$ | H | H |
| nOCF$_2$•F | $C_nH_{2n+1}$ | OCHF$_2$ | H | F |
| nOCF$_2$•F•F | $C_nH_{2n+1}$ | OCHF$_2$ | F | F |
| nS | $C_nH_{2n+1}$ | NCS | H | H |
| nS•F | $C_nH_{2n+1}$ | NCS | H | F |
| nS•F•F | $C_nH_{2n+1}$ | NCS | F | F |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | $COOC_mH_{2m+1}$ | H | H |
| nF•Cl | $C_nH_{2n+1}$ | Cl | H | F |

TABLE A

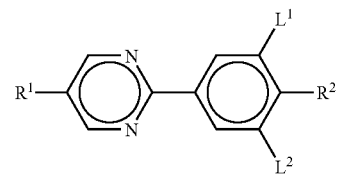

PYP

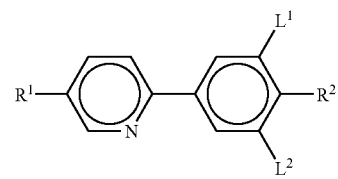

PYRP

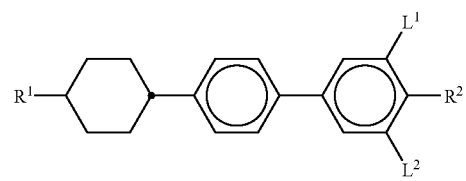

BCH

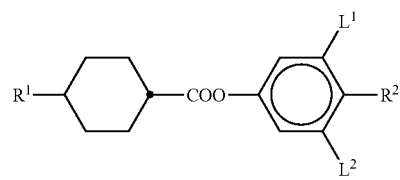

D

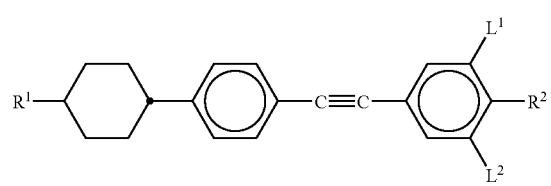

CPTP

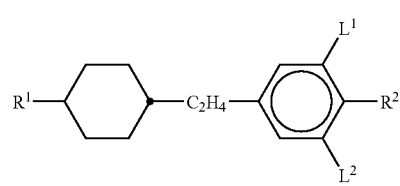

EPCH

TABLE A-continued
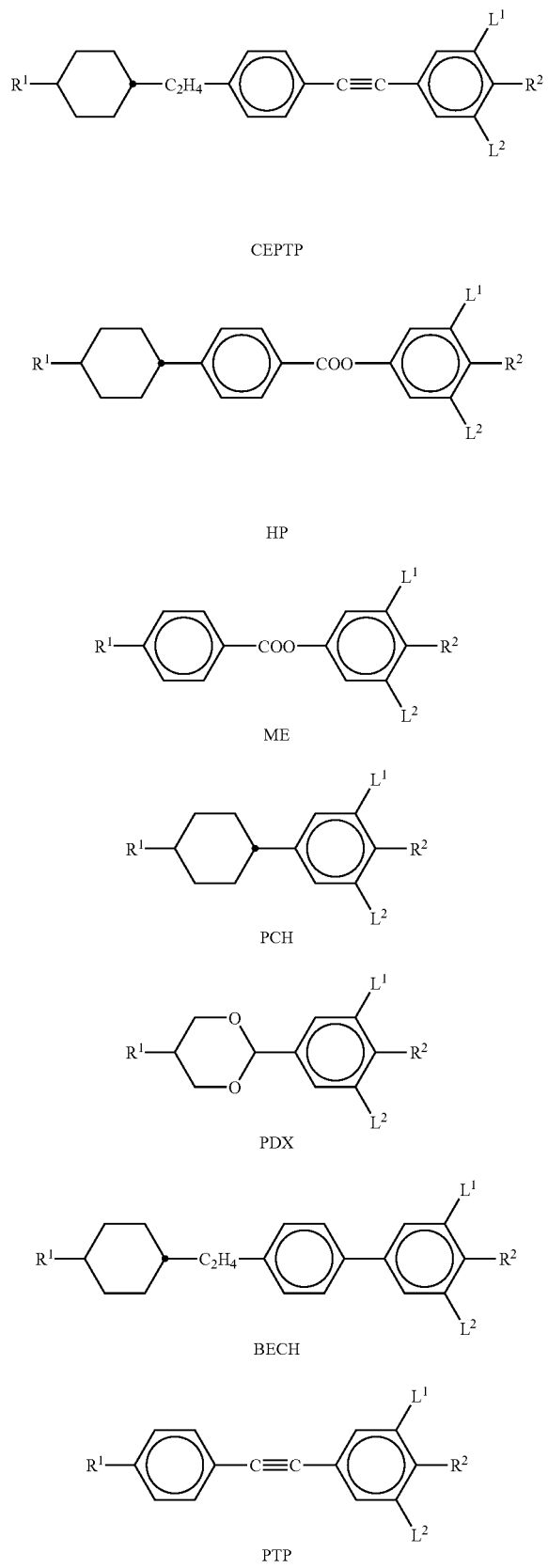
CEPTP
HP
ME
PCH
PDX
BECH
PTP
TABLE A-continued
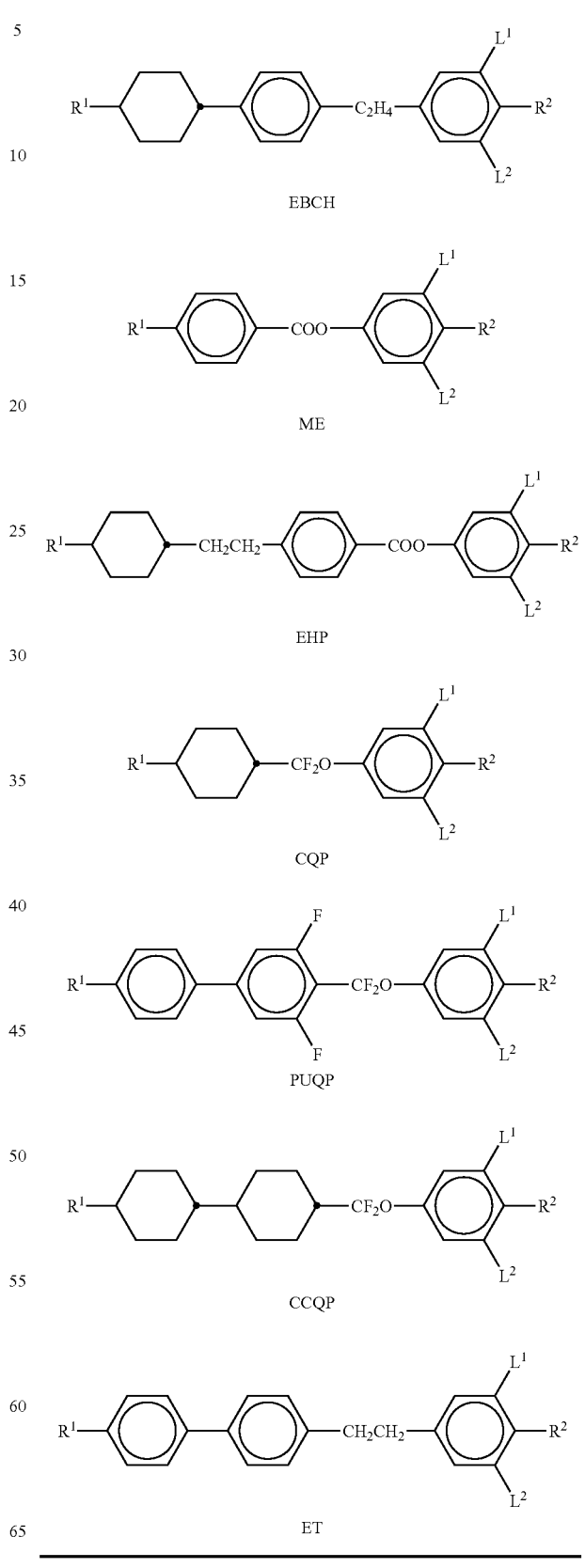
EBCH
ME
EHP
CQP
PUQP
CCQP
ET TABLE B
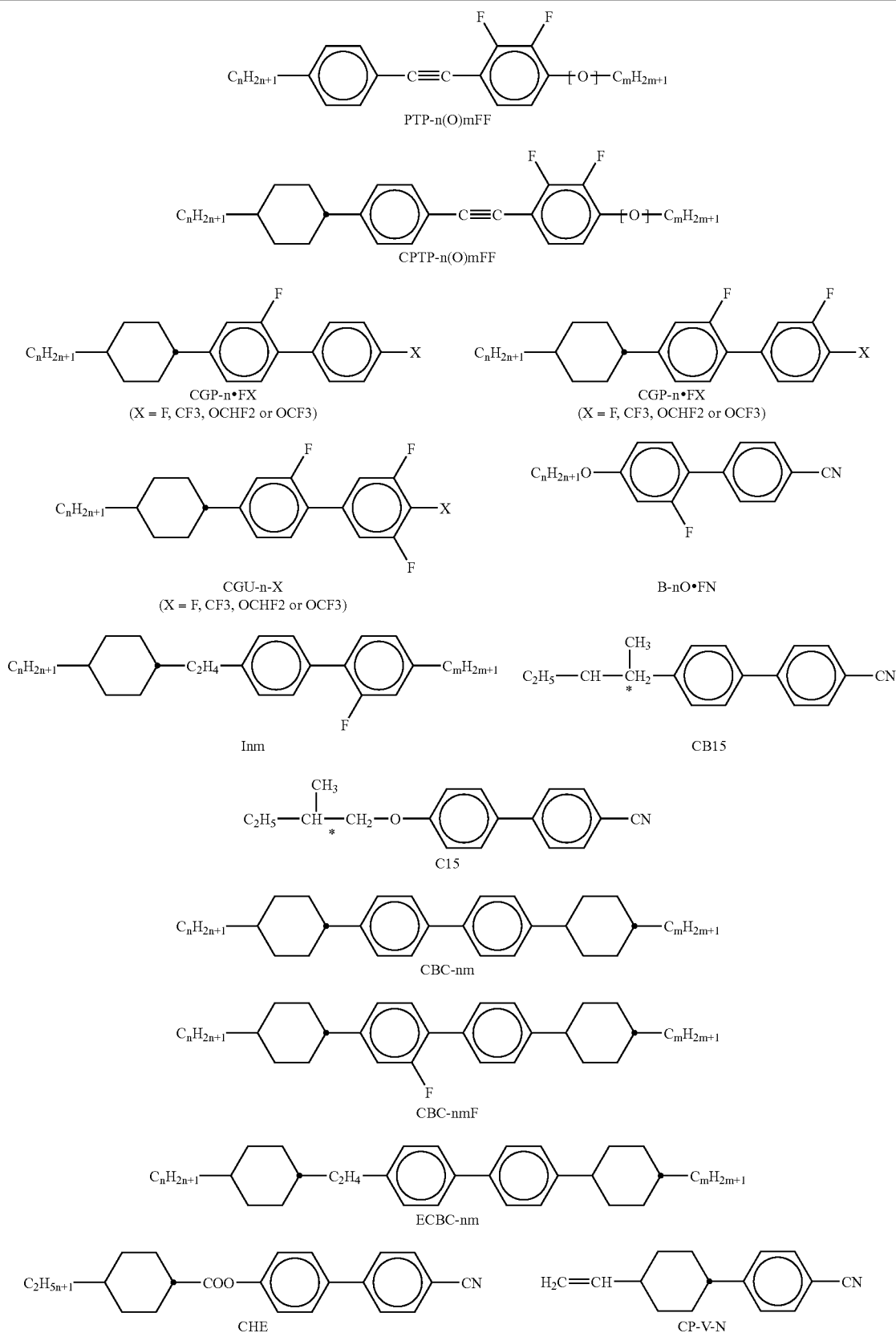

TABLE B-continued
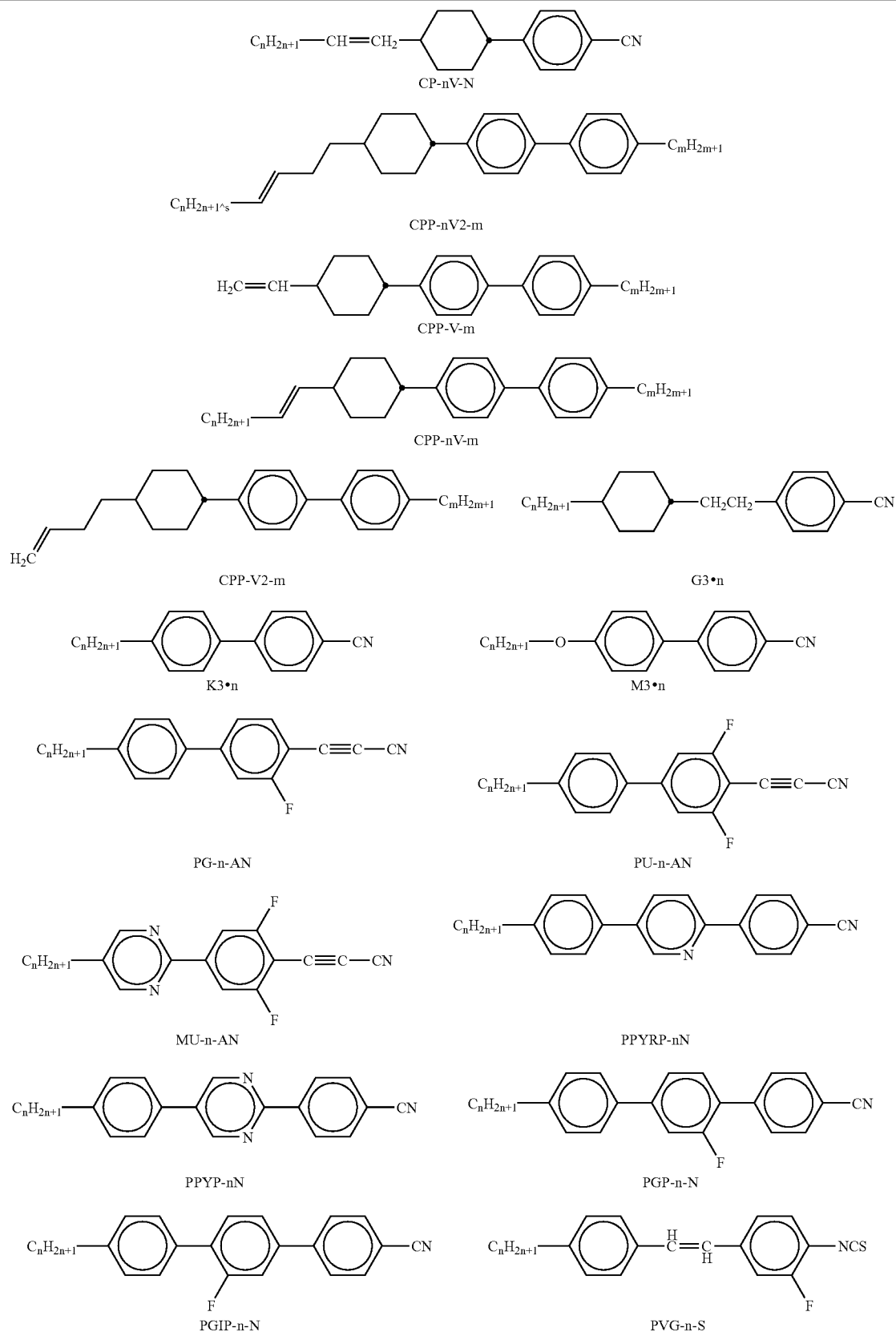

TABLE B-continued
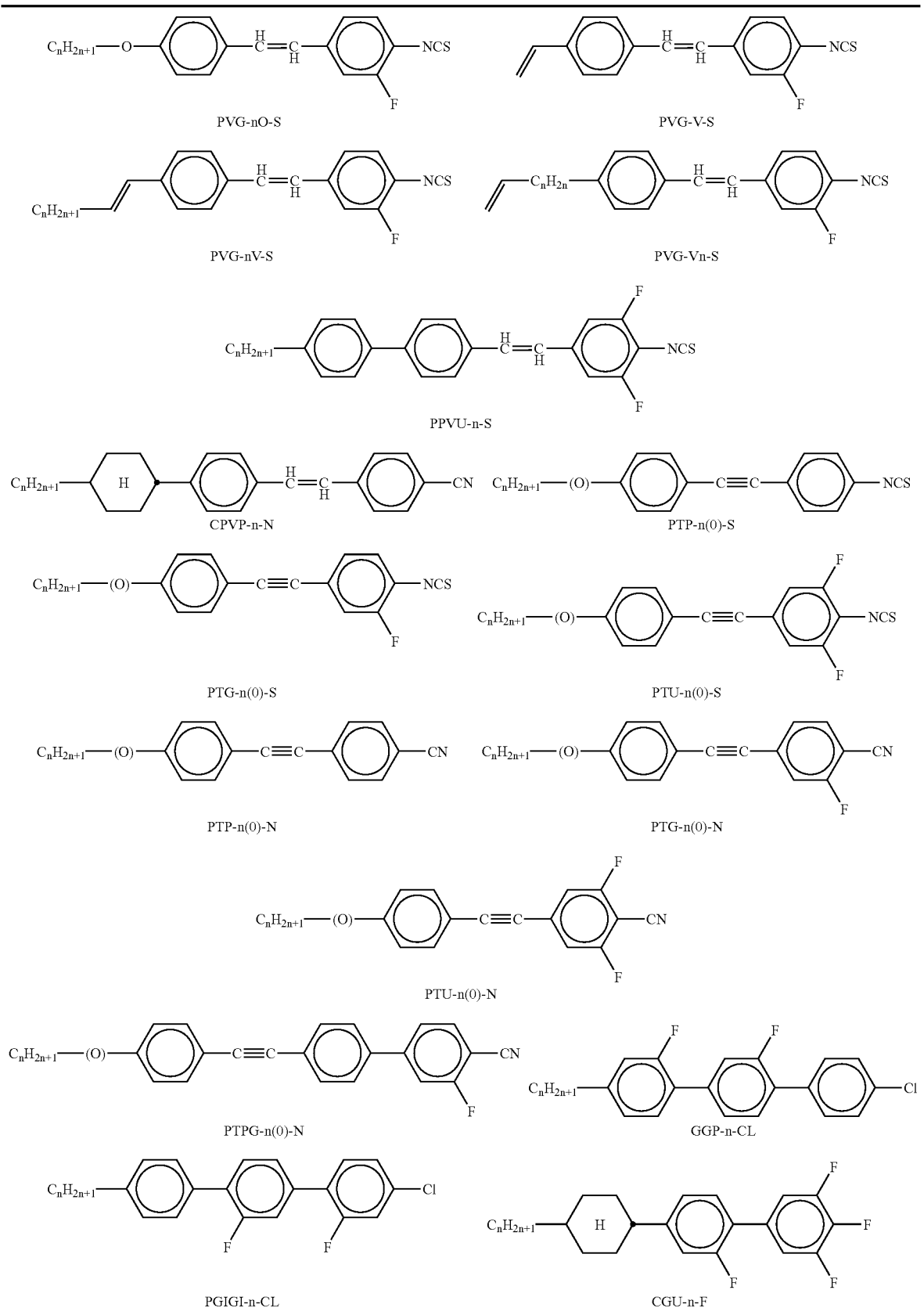

TABLE B-continued
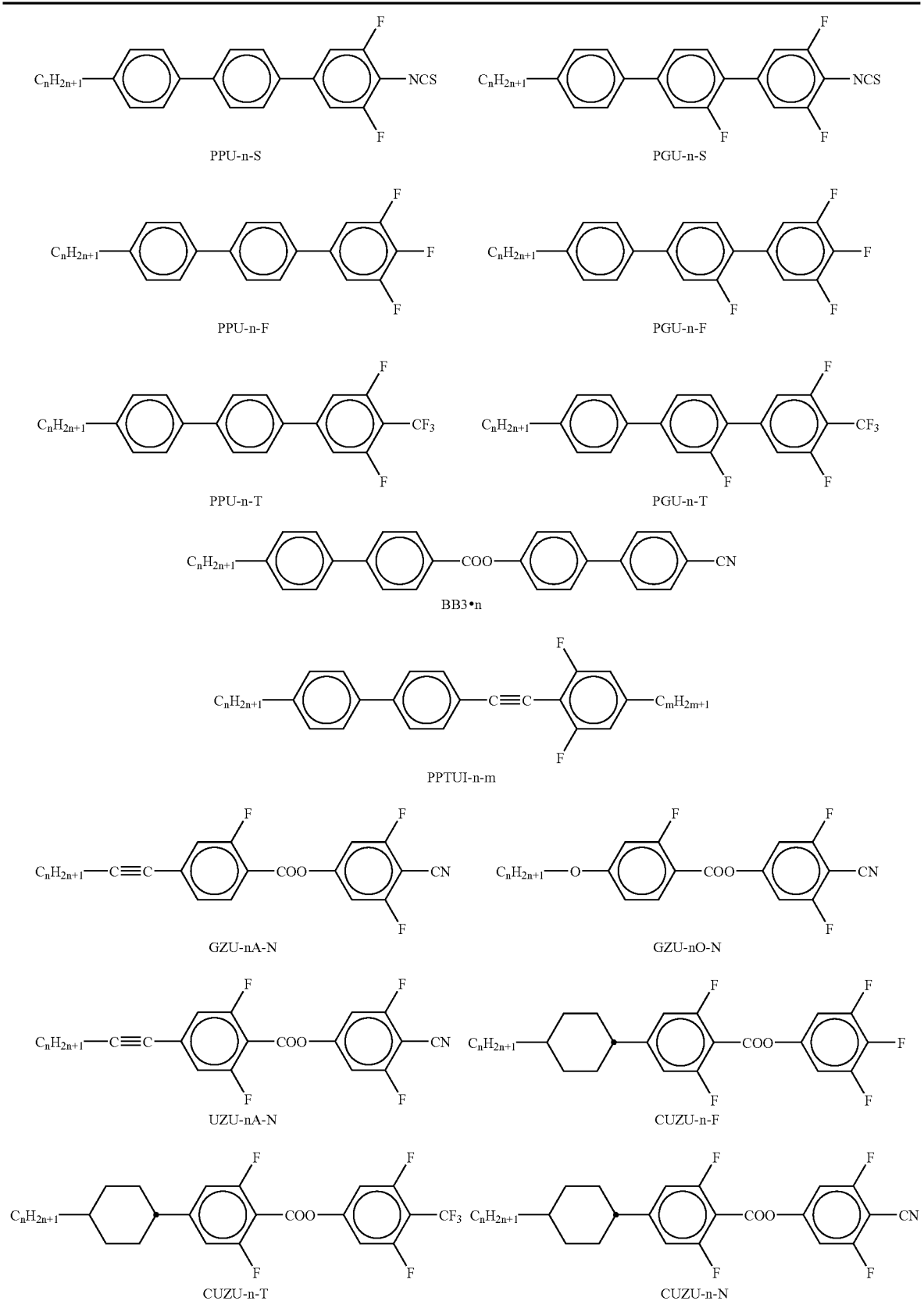

TABLE B-continued
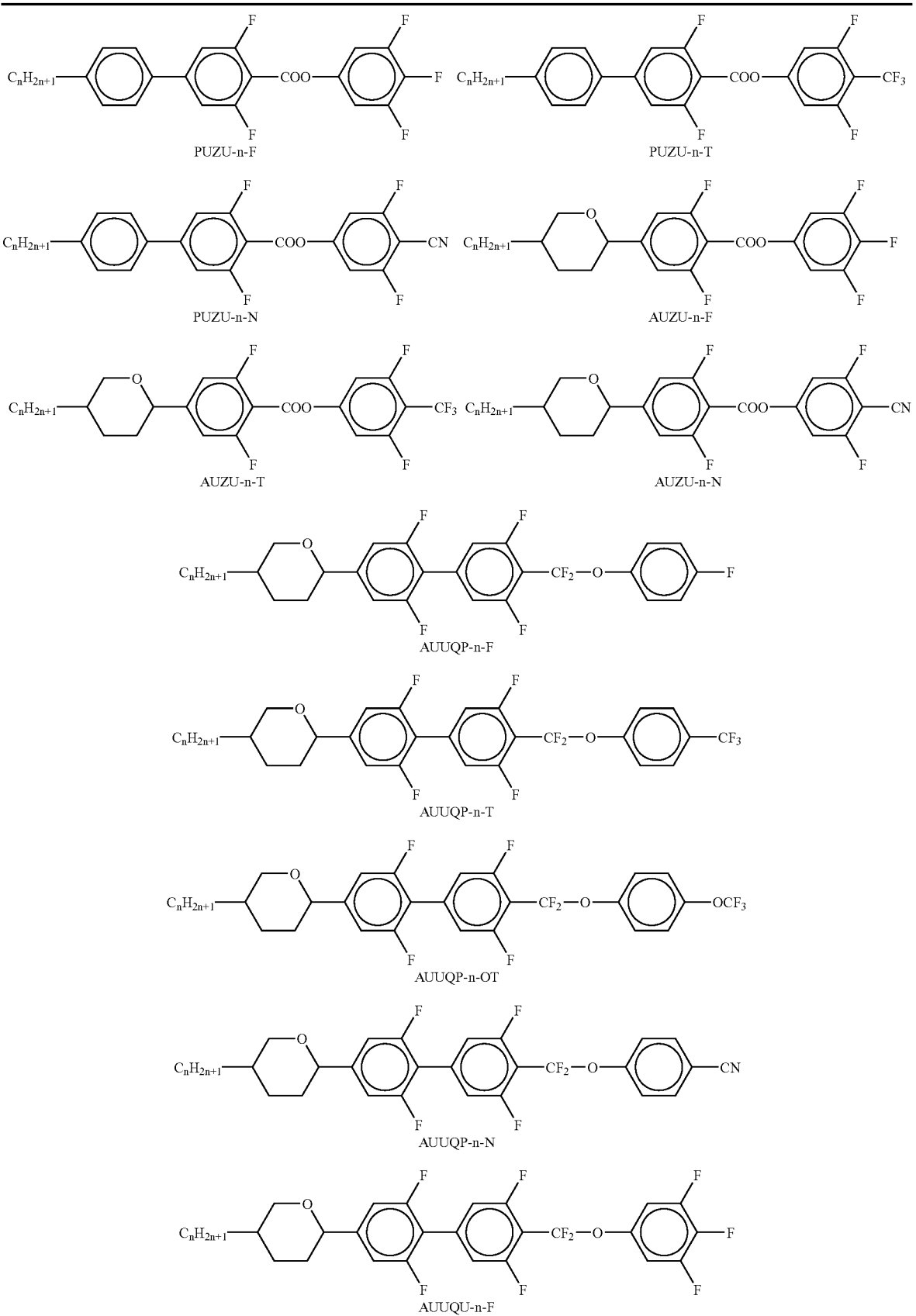

TABLE B-continued
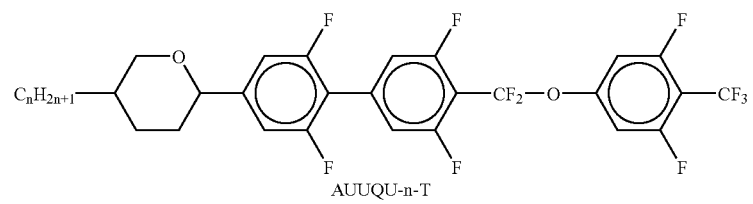
AUUQU-n-T
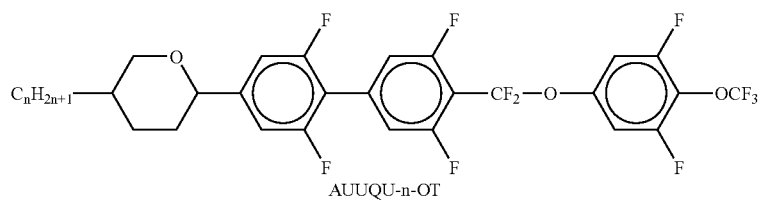
AUUQU-n-OT
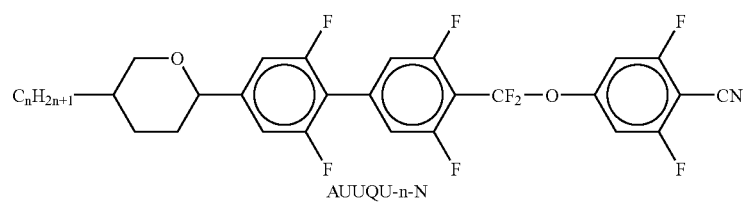
AUUQU-n-N
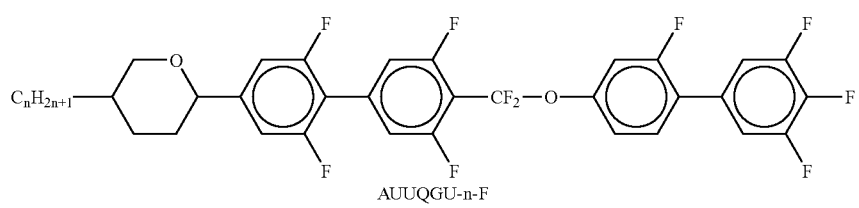
AUUQGU-n-F
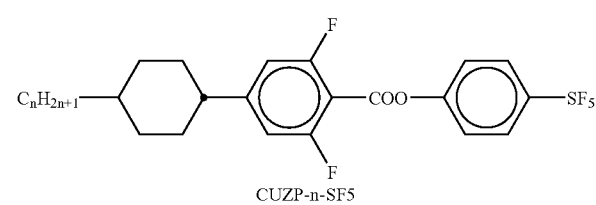
CUZP-n-SF5
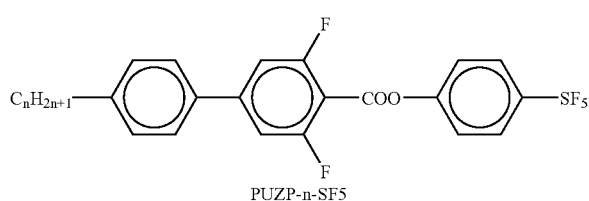
PUZP-n-SF5
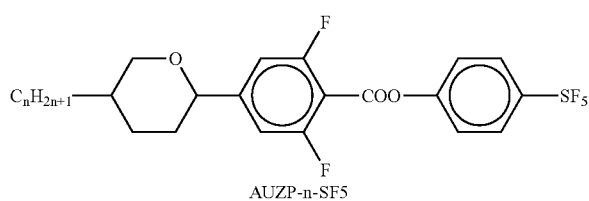
AUZP-n-SF5
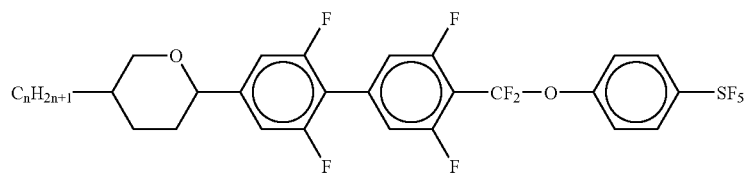

TABLE B-continued
AUUQP-n-SF5
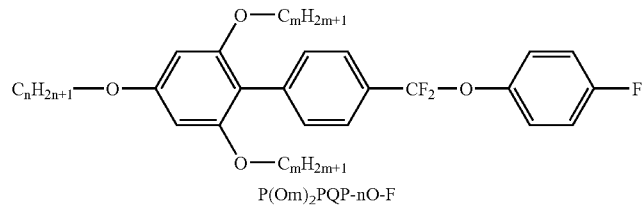
P(Om)₂PQP-nO-F
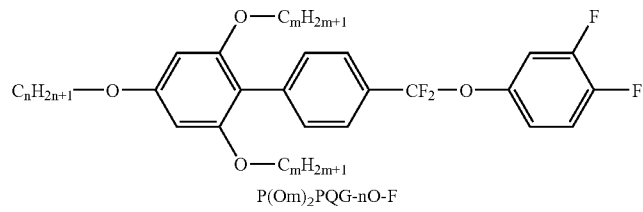
P(Om)₂PQG-nO-F
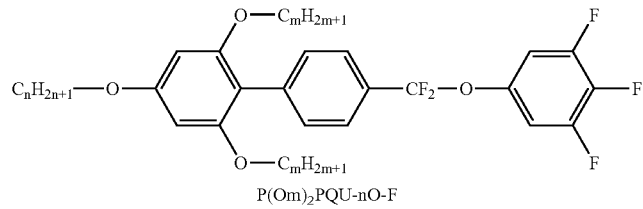
P(Om)₂PQU-nO-F
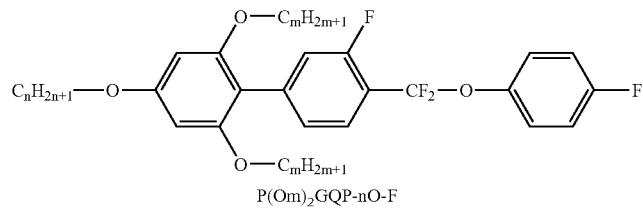
P(Om)₂GQP-nO-F
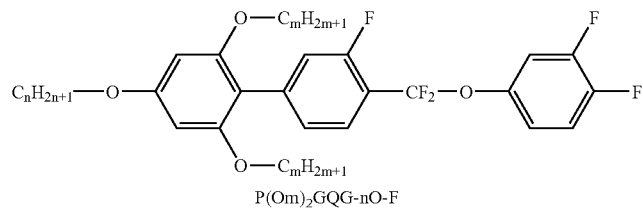
P(Om)₂GQG-nO-F
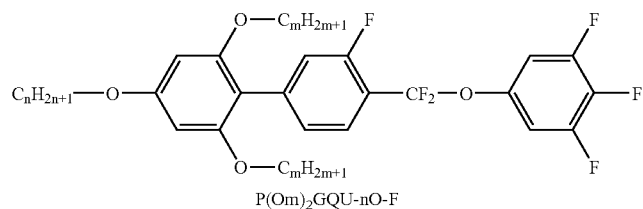
P(Om)₂GQU-nO-F
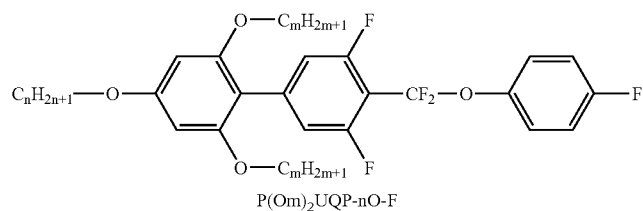
P(Om)₂UQP-nO-F TABLE B-continued
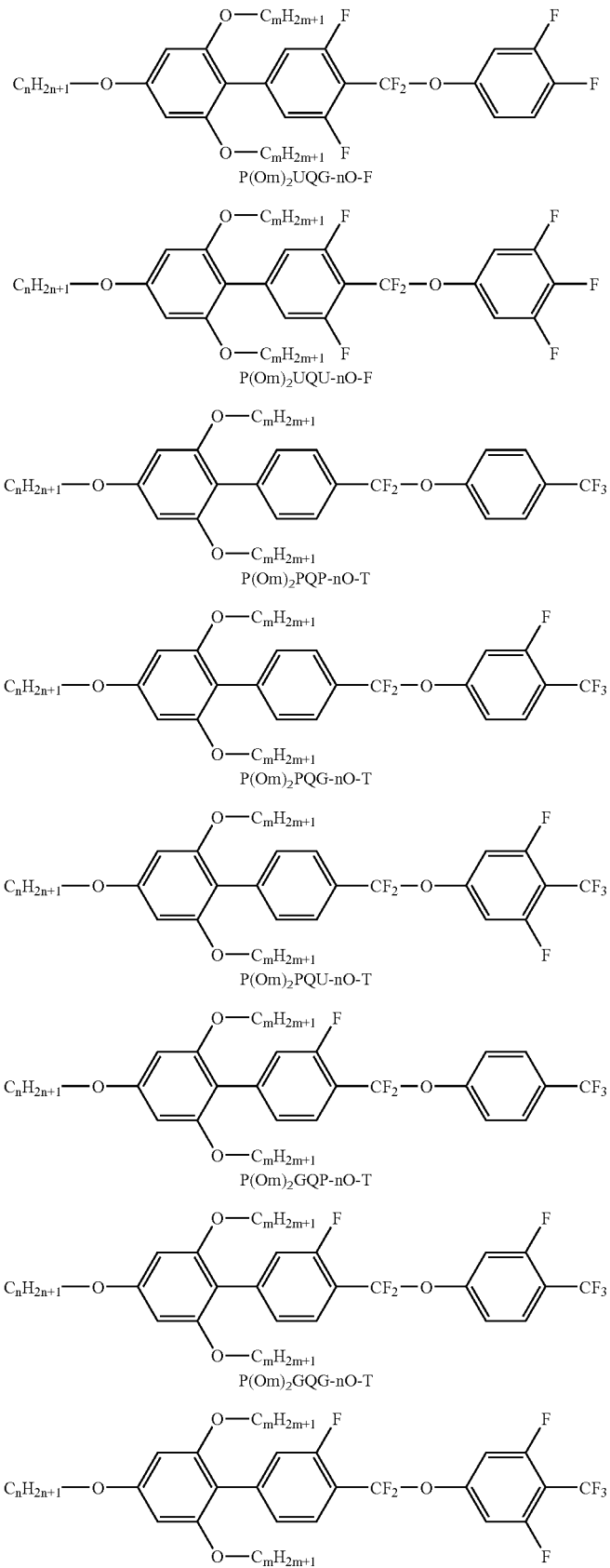

TABLE B-continued
P(Om)₂GQU-nO-T
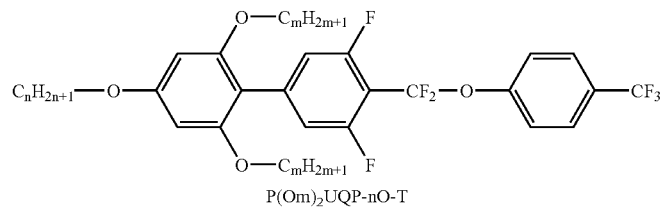
P(Om)₂UQP-nO-T
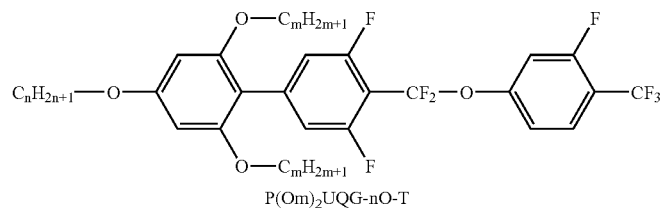
P(Om)₂UQG-nO-T
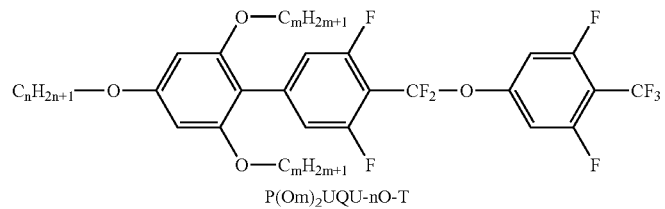
P(Om)₂UQU-nO-T
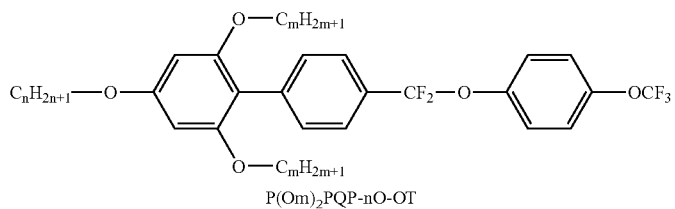
P(Om)₂PQP-nO-OT
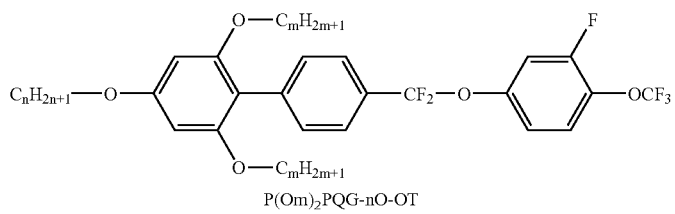
P(Om)₂PQG-nO-OT
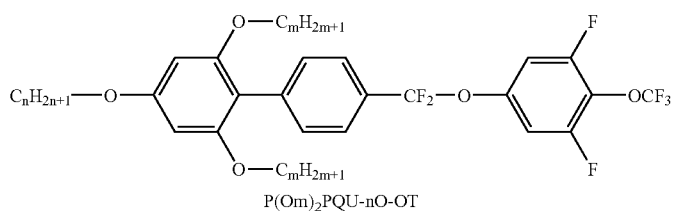
P(Om)₂PQU-nO-OT
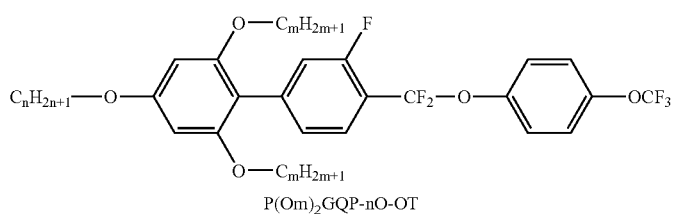
P(Om)₂GQP-nO-OT TABLE B-continued
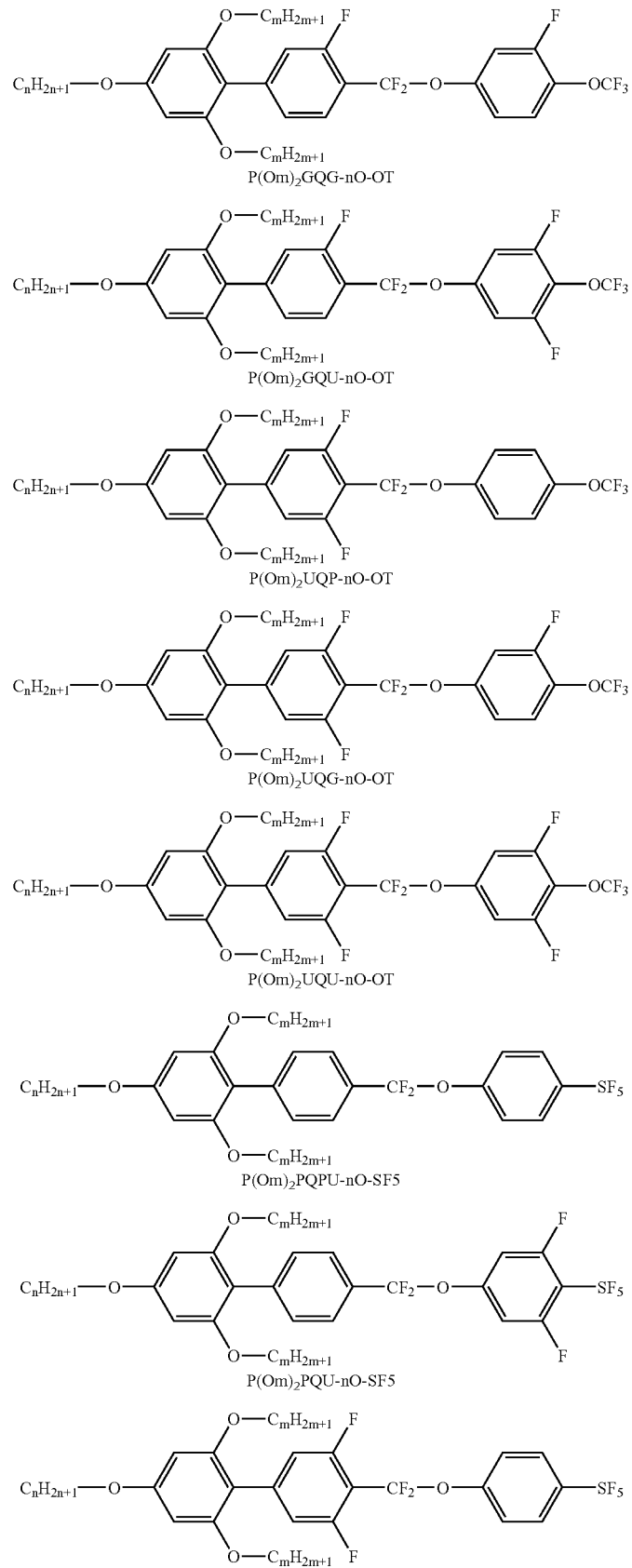

TABLE B-continued
P(Om)₂UQU-nO-SF5
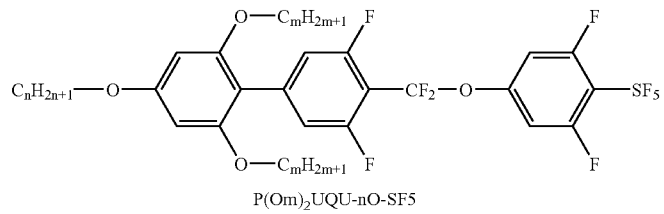
P(Om)₂UQU-nO-SF5
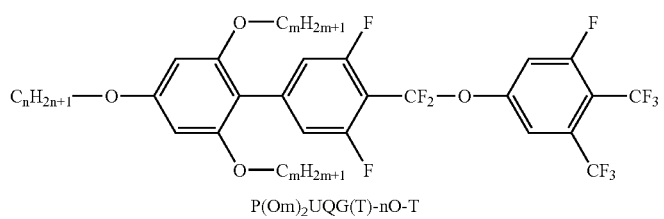
P(Om)₂UQG(T)-nO-T
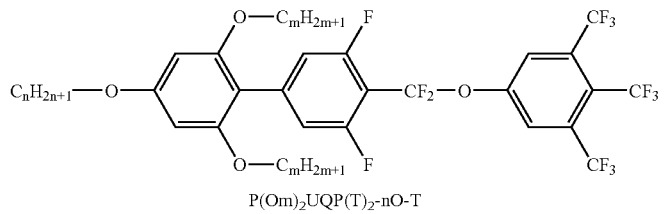
P(Om)₂UQP(T)₂-nO-T
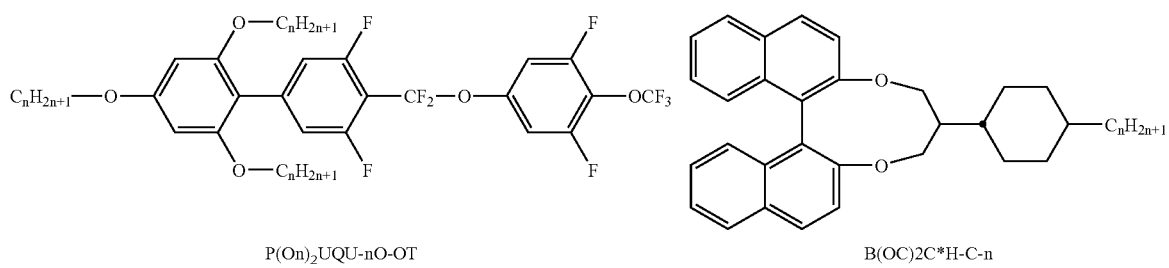
P(On)₂UQU-nO-OT        B(OC)2C*H-C-n
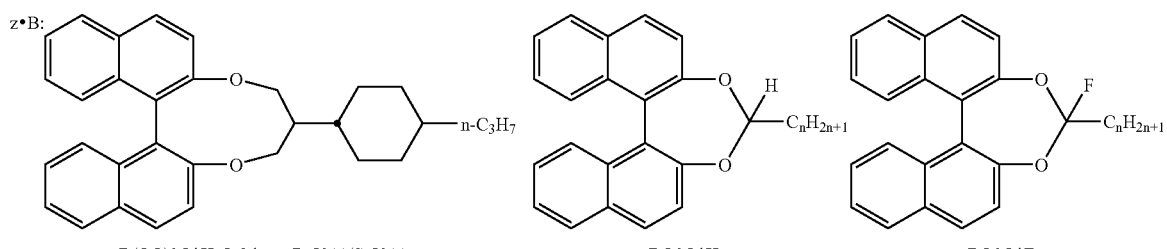
B(OC)2C*H-C-3 bzw, R-5011/S-5011        BO2C*H-n        BO2C*F-n
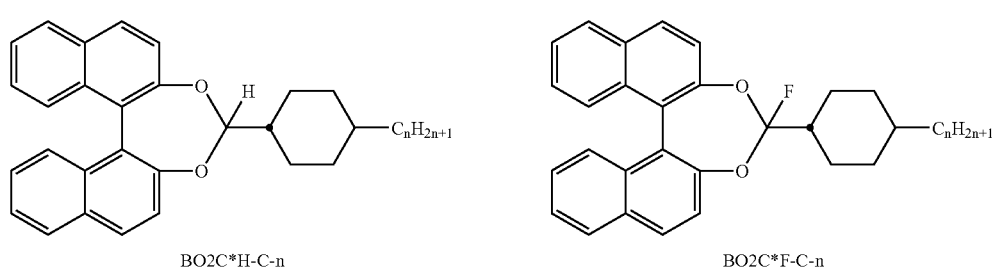
BO2C*H-C-n        BO2C*F-C-n TABLE B-continued
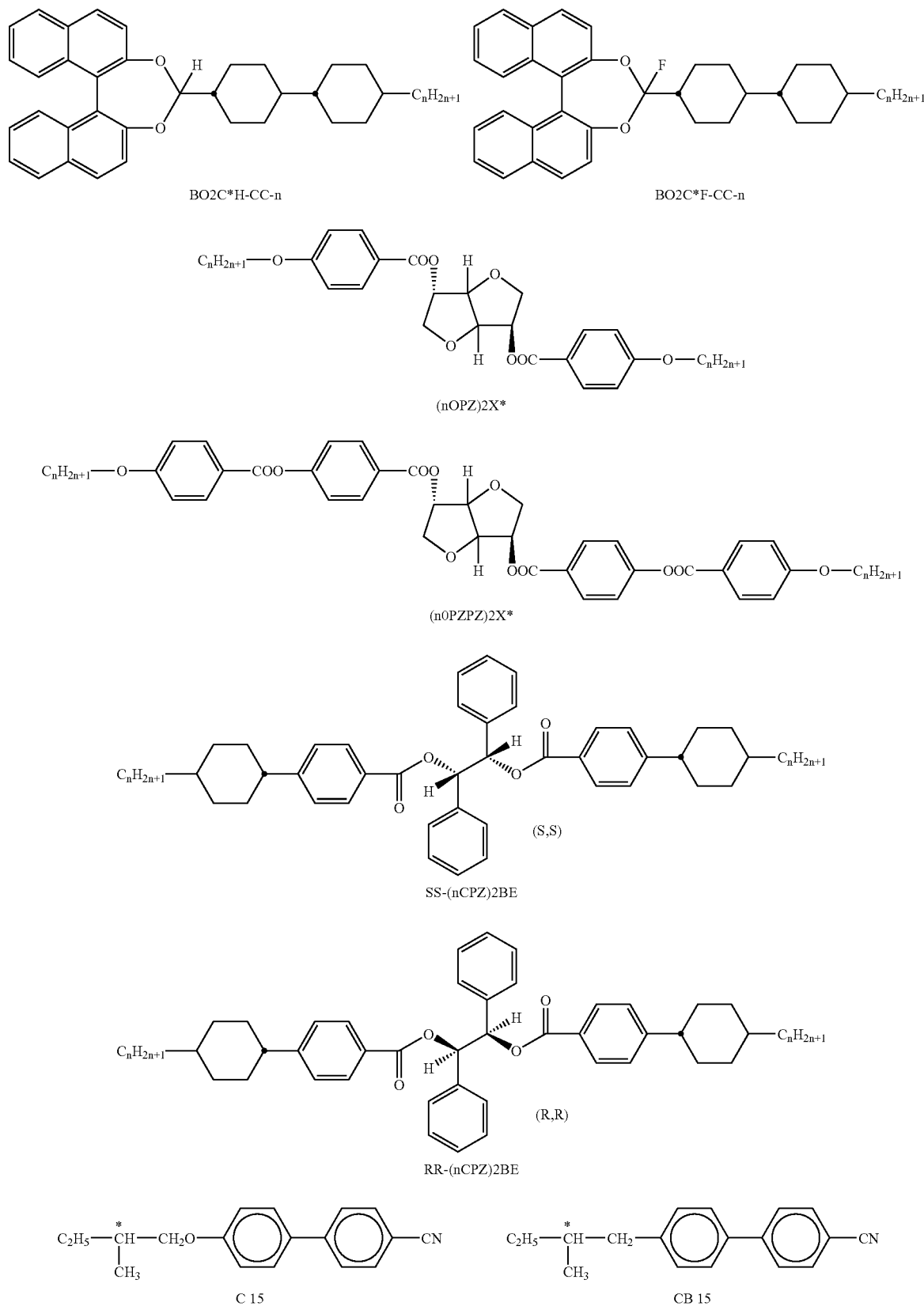

TABLE B-continued
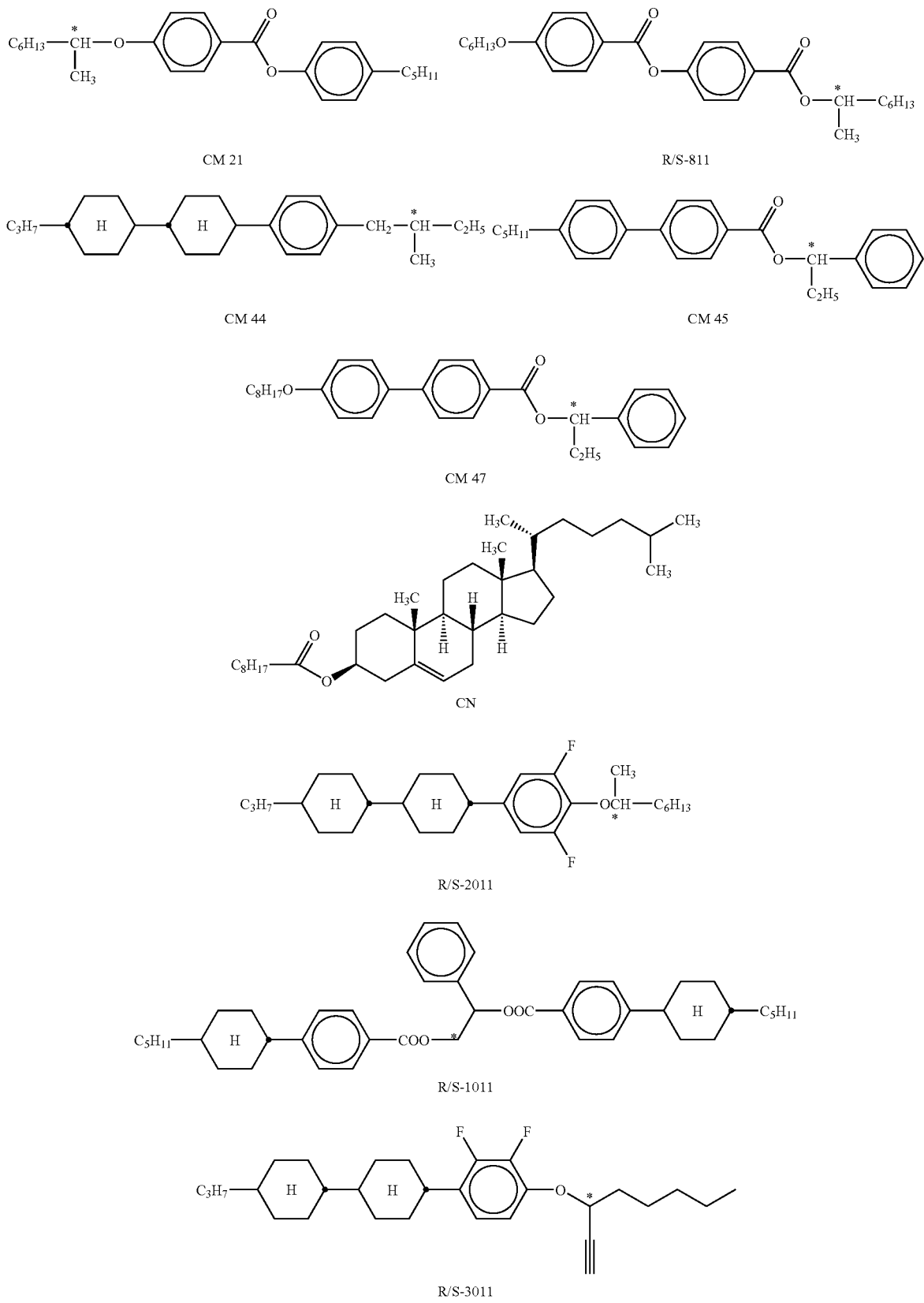

TABLE B-continued

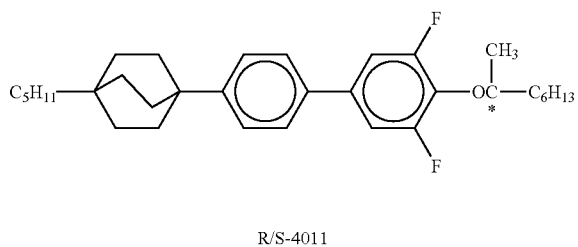

R/S-4011

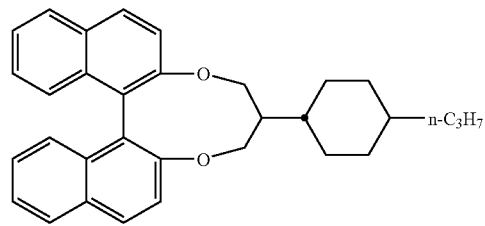

R-5011/S-5011

The liquid crystal media according to the instant invention do contain preferably

- four or more compounds selected from the group of compounds of tables A and B and/or
- five or more compounds selected from the group of compounds of table B and/or
- two or more compounds selected from the group of compounds of table A.

EXAMPLES

The examples given in the following are illustrating the present invention without limiting it in any way.

However, the physical data especially of the compounds illustrate to the expert which properties can be achieved in which ranges. Especially the combination of the various properties, which can be preferably achieved, is thus well defined.

Example 1

1-[2,6-difluoro-(4-(2,4,6-tri-n-propoxyphenyl)phenyl)difluoromethoxy]-3,4,5-trifluorobenzene

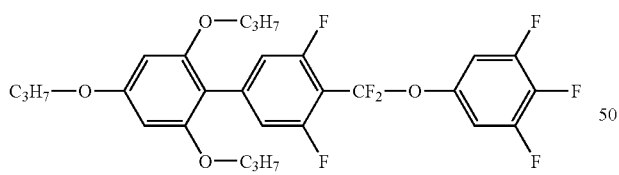

is prepared according to Scheme I. It has a melting point of 70° C., a melting enthalpy of 6.8 kcal/mol and a glass transition temperature of −27° C. It is melting from the crystalline phase into the isotropic phase.

Example 2

Analogously to example 1 the corresponding compound with three n-butyloxy groups 1-[2,6-difluoro-(4-(2,4,6-tri-n-butoxyphenyl)phenyl)-difluoromethoxy]-3,4,5-trifluorobenzene

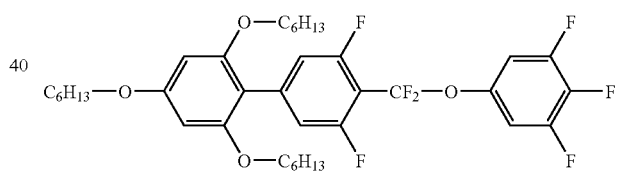

is prepared. It has a melting point of 51° C., a melting enthalpy of 7.9 kcal/mol and, like the compound of example 1, is melting from the crystalline phase to the isotropic phase.

Example 3

Analogously to example 1 the corresponding compound with three n-hexyloxy groups 1-[2,6-difluoro-(4-(2,4,6-tri-n-hexoxyphenyl)phenyl)-difluoromethoxy]-3,4,5-trifluorobenzene is prepared. It has a melting point of −53° C. and is melting from the glass phase to the isotropic phase.

Examples 4 to 45

Analogously to Example 1 the following compounds are prepared:

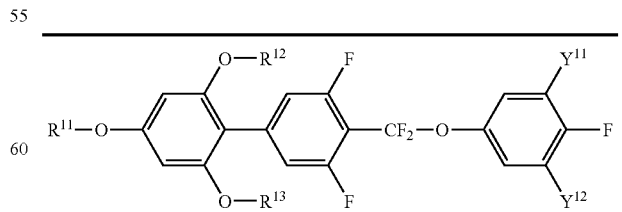

| No. | $R^{11}$ to $R^{13}$ | $Y^{11}$ | $Y^{12}$ | Phases (T/° C.) |
|---|---|---|---|---|
| 4 | $CH_3$ | H | H | |
| 5 | $C_2H_5$ | H | H | |

-continued

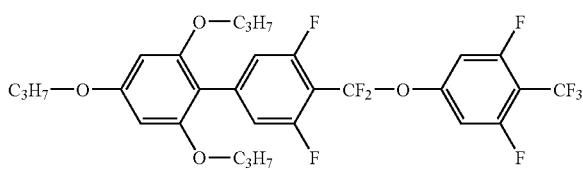

| No. | R¹¹ to R¹³ | Y¹¹ | Y¹² | Phases (T/° C.) |
|---|---|---|---|---|
| 6 | n-C$_3$H$_7$ | H | H | |
| 7 | n-C$_4$H$_9$ | H | H | |
| 8 | n-C$_5$H$_{11}$ | H | H | |
| 9 | n-C$_6$H$_{13}$ | H | H | |
| 10 | n-C$_7$H$_{15}$ | H | H | |
| 11 | n-C$_8$H$_{17}$ | H | H | |
| 12 | n-C$_9$H$_{19}$ | H | H | |
| 13 | CH$_2$=CH | H | H | |
| 14 | CH$_2$=CH—CH$_2$ | H | H | |
| 15 | E-CH$_3$—CH$_2$=CH | H | H | |
| 16 | CH$_2$=CH—(CH$_2$)$_2$ | H | H | |
| 17 | E-CH$_3$—CH$_2$=CH—CH$_2$ | H | H | |
| 18 | E-CH$_3$—CH$_2$—CH$_2$=CH | H | H | |
| 19 | CH$_3$ | F | H | |
| 20 | C$_2$H$_5$ | F | H | |
| 21 | n-C$_3$H$_7$ | F | H | |
| 22 | n-C$_4$H$_9$ | F | H | |
| 23 | n-C$_5$H$_{11}$ | F | H | |
| 24 | n-C$_6$H$_{13}$ | F | H | |
| 25 | n-C$_7$H$_{15}$ | F | H | |
| 26 | n-C$_8$H$_{17}$ | F | H | |
| 27 | n-C$_9$H$_{19}$ | F | H | |
| 28 | CH$_2$=CH | F | H | |
| 29 | CH$_2$=CH—CH$_2$ | F | H | |
| 30 | E-CH$_3$—CH$_2$=CH | F | H | |
| 31 | CH$_2$=CH—(CH$_2$)$_2$ | F | H | |
| 32 | E-CH$_3$—CH$_2$=CH—CH$_2$ | F | H | |
| 33 | E-CH$_3$—CH$_2$—CH$_2$=CH | F | H | |
| 34 | CH$_3$ | F | F | |
| 35 | C$_2$H$_5$ | F | F | C 76° C. I, T$_g$ = −14° C. |
| 1 | n-C$_3$H$_7$ | F | F | C 70° C. I, T$_g$ = −53° C. |
| 2 | n-C$_4$H$_9$ | F | F | C 51° C. I |
| 36 | n-C$_5$H$_{11}$ | F | F | T$_g$ = −52° C. |
| 3 | n-C$_6$H$_{13}$ | F | F | T$_g$ = −53° C. |
| 37 | n-C$_7$H$_{15}$ | F | F | T$_g$ = −62° C. |
| 38 | n-C$_8$H$_{17}$ | F | F | T$_g$ = −59° C. |
| 39 | n-C$_9$H$_{19}$ | F | F | |
| 40 | CH$_2$=CH | F | F | |
| 41 | CH$_2$=CH—CH$_2$ | F | F | |
| 42 | E-CH$_3$—CH$_2$=CH | F | F | |
| 43 | CH$_2$=CH—(CH$_2$)$_2$ | F | F | |
| 44 | E-CH$_3$—CH$_2$=CH—CH$_2$ | F | F | |
| 45 | E-CH$_3$—CH$_2$—CH$_2$=CH | F | F | |

Example 46

1-[2,6-difluoro-(4-(2,4,6-tri-n-propoxyphenyl)phenyl)difluoromethoxy]-4-trifluoromethylbenzene

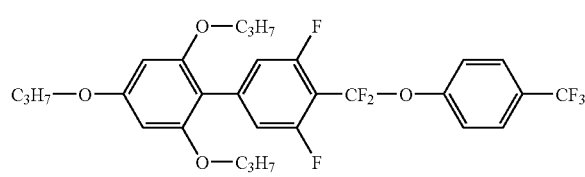

is prepared analogously to example 1. The compound has a melting point of 66° C. and a melting enthalpy of 7.5 kcal/mol. It is melting from the crystalline glass phase into the isotropic phase.

Example 47

1-[2,6-difluoro-(4-(2,4,6-tri-n-propoxyphenyl)phenyl)difluoromethoxy]-3,5-difluoro-4-trifluoromethylbenzene

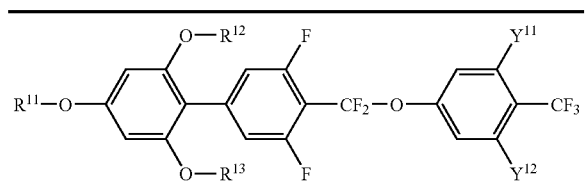

I is prepared analogously to example 1. The compound has a glass transition temperature of −23° C., a melting point of 50° C. and a melting enthalpy of 6.8 kcal/mol. It is melting from the glass phase into the isotropic phase.

Examples 48 to 90

Analogously to Example 47 the following compounds are prepared:

| No. | R¹¹ to R¹³ | Y¹¹ | Y¹² | Phases (T/° C.) |
|---|---|---|---|---|
| 48 | CH$_3$ | H | H | |
| 49 | C$_2$H$_5$ | H | H | |
| 46 | n-C$_3$H$_7$ | H | H | C 66° C. I |
| 50 | n-C$_4$H$_9$ | H | H | |
| 51 | n-C$_5$H$_{11}$ | H | H | |
| 52 | n-C$_6$H$_{13}$ | H | H | |
| 53 | n-C$_7$H$_{15}$ | H | H | |
| 54 | n-C$_8$H$_{17}$ | H | H | |
| 55 | n-C$_9$H$_{19}$ | H | H | |
| 56 | CH$_2$=CH | H | H | |
| 57 | CH$_2$=CH—CH$_2$ | H | H | |
| 58 | E-CH$_3$—CH$_2$=CH | H | H | |
| 59 | CH$_2$=CH—(CH$_2$)$_2$ | H | H | |
| 60 | E-CH$_3$—CH$_2$=CH—CH$_2$ | H | H | |
| 61 | E-CH$_3$—CH$_2$—CH$_2$=CH | H | H | |
| 62 | CH$_3$ | F | H | |
| 63 | C$_2$H$_5$ | F | H | |
| 64 | n-C$_3$H$_7$ | F | H | |
| 65 | n-C$_4$H$_9$ | F | H | |
| 66 | n-C$_5$H$_{11}$ | F | H | |
| 67 | n-C$_6$H$_{13}$ | F | H | |
| 68 | n-C$_7$H$_{15}$ | F | H | |
| 69 | n-C$_8$H$_{17}$ | F | H | |
| 70 | n-C$_9$H$_{19}$ | F | H | |
| 71 | CH$_2$=CH | F | H | |
| 72 | CH$_2$=CH—CH$_2$ | F | H | |
| 73 | E-CH$_3$—CH$_2$=CH | F | H | |
| 74 | CH$_2$=CH—(CH$_2$)$_2$ | F | H | |
| 75 | E-CH$_3$—CH$_2$=CH—CH$_2$ | F | H | |

-continued

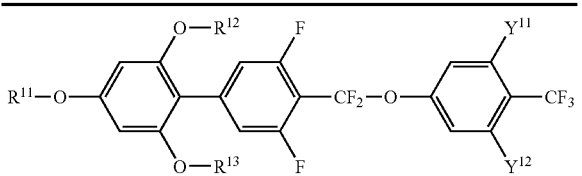

| No. | R$^{11}$ to R$^{13}$ | Y$^{11}$ | Y$^{12}$ | Phases (T/° C.) |
|---|---|---|---|---|
| 76 | E-CH$_3$—CH$_2$—CH$_2$=CH | F | H | |
| 77 | CH$_3$ | F | F | |
| 78 | C$_2$H$_5$ | F | F | |
| 47 | n-C$_3$H$_7$ | F | F | T$_g$ = −23° C., C 50° C. I |
| 79 | n-C$_4$H$_9$ | F | F | |
| 80 | n-C$_5$H$_{11}$ | F | F | |
| 81 | n-C$_6$H$_{13}$ | F | F | T$_g$ = −50° C., C ° C. I |
| 82 | n-C$_7$H$_{15}$ | F | F | |
| 83 | n-C$_8$H$_{17}$ | F | F | |
| 84 | n-C$_9$H$_{19}$ | F | F | |
| 85 | CH$_2$=CH | F | F | |
| 86 | CH$_2$=CH—CH$_2$ | F | F | |
| 87 | E-CH$_3$—CH$_2$=CH | F | F | |
| 88 | CH$_2$=CH—(CH$_2$)$_2$ | F | F | |
| 89 | E-CH$_3$—CH$_2$=CH—CH$_2$ | F | F | |
| 90 | E-CH$_3$—CH$_2$—CH$_2$=CH | F | F | |

Examples 91 to 135

Analogously to Example 47 the following compounds are prepared:

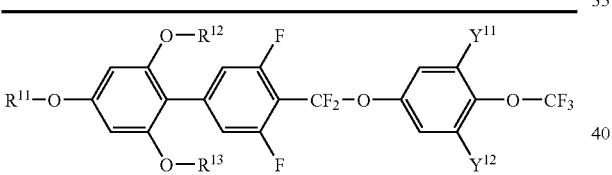

| No. | R$^{11}$ to R$^{13}$ | Y$^{11}$ | Y$^{12}$ | Phases (T/° C.) |
|---|---|---|---|---|
| 91 | CH$_3$ | H | H | |
| 92 | C$_2$H$_5$ | H | H | |
| 93 | n-C$_3$H$_7$ | H | H | |
| 94 | n-C$_4$H$_9$ | H | H | |
| 95 | n-C$_5$H$_{11}$ | H | H | |
| 96 | n-C$_6$H$_{13}$ | H | H | |
| 97 | n-C$_7$H$_{15}$ | H | H | |
| 98 | n-C$_8$H$_{17}$ | H | H | |
| 99 | n-C$_9$H$_{19}$ | H. | H | |
| 100 | CH$_2$=CH | H | H | |
| 101 | CH$_2$=CH—CH$_2$ | H | H | |
| 102 | E-CH$_3$—CH$_2$=CH | H | H | |
| 103 | CH$_2$=CH—(CH$_2$)$_2$ | H | H | |
| 104 | E-CH$_3$—CH$_2$=CH—CH$_2$ | H | H | |
| 105 | E-CH$_3$—CH$_2$—CH$_2$=CH | H | H | |
| 106 | CH$_3$ | F | H | |
| 107 | C$_2$H$_5$ | F | H | |
| 108 | n-C$_3$H$_7$ | F | H | |
| 109 | n-C$_4$H$_9$ | F | H | |
| 110 | n-C$_5$H$_{11}$ | F | H | |
| 111 | n-C$_6$H$_{13}$ | F | H | |
| 112 | n-C$_7$H$_{15}$ | F | H | |
| 113 | n-C$_8$H$_{17}$ | F | H | |
| 114 | n-C$_9$H$_{19}$ | F | H | |
| 115 | CH$_2$=CH | F | H | |
| 116 | CH$_2$=CH—CH$_2$ | F | H | |
| 117 | E-CH$_3$—CH$_2$=CH | F | H | |
| 118 | CH$_2$=CH—(CH$_2$)$_2$ | F | H | |

-continued

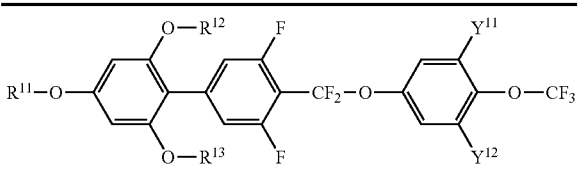

| No. | R$^{11}$ to R$^{13}$ | Y$^{11}$ | Y$^{12}$ | Phases (T/° C.) |
|---|---|---|---|---|
| 119 | E-CH$_3$—CH$_2$=CH—CH$_2$ | F | H | |
| 120 | E-CH$_3$—CH$_2$—CH$_2$=CH | F | H | |
| 121 | CH$_3$ | F | F | |
| 122 | C$_2$H$_5$ | F | F | |
| 123 | n-C$_3$H$_7$ | F | F | |
| 124 | n-C$_4$H$_9$ | F | F | |
| 125 | n-C$_5$H$_{11}$ | F | F | |
| 126 | n-C$_6$H$_{13}$ | F | F | |
| 127 | n-C$_7$H$_{15}$ | F | F | |
| 128 | n-C$_8$H$_{17}$ | F | F | |
| 129 | n-C$_9$H$_{19}$ | F | F | |
| 130 | CH$_2$=CH | F | F | |
| 131 | CH$_2$=CH—CH$_2$ | F | F | |
| 132 | E-CH$_3$—CH$_2$=CH | F | F | |
| 133 | CH$_2$=CH—(CH$_2$)$_2$ | F | F | |
| 134 | E-CH$_3$—CH$_2$=CH—CH$_2$ | F | F | |
| 135 | E-CH$_3$—CH$_2$—CH$_2$=CH | F | F | |

Example 136

Analogously to example 1

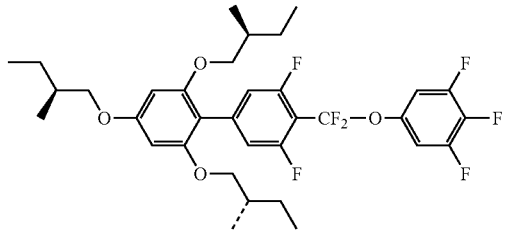

is prepared. The compound has a glass transition temperature of −31° C. It is melting from the glass phase into the isotropic phase.

Example 137

Analogously to example 1 1-[2,6-difluoro-(4-(2,4,6-tri-n-docecoxyphenyl)-phenyl)difluoromethoxy]-3,4,5-trifluorobenzene

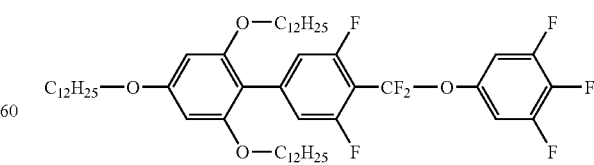

is prepared. The compound has a melting point of 16° C., a melting enthalpy of 11.0 kcal/mol and an enthalpy of crystallisation of 3.7 kcal/mol.

It is melting from the crystalline phase into the isotropic phase.

Example 138

Analogously to example 1 1-[2,6-difluoro-(4-(2,4,6-tri-n-propxyphenyl)-phenyl)difluoromethoxy]-3,5-difluoro-4-cyano-benzene

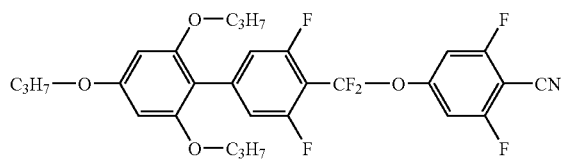

is prepared. The compound has a glass transition temperature of −14° C. and a melting point of 89° C. It is melting from the glass phase into the isotropic phase.

Example 139 to 168

Analogously to Example 1 the following compounds are prepared:

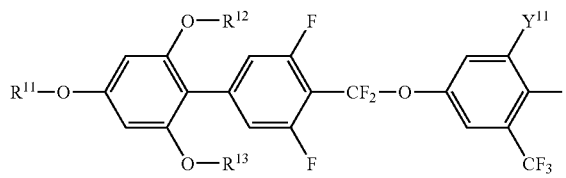

| No. | $R^{11}$ to $R^{13}$ | $Y^{11}$ | Phases (T/° C.) |
|---|---|---|---|
| 139 | $CH_3$ | H | |
| 140 | $C_2H_5$ | H | |
| 141 | $n\text{-}C_3H_7$ | H | |
| 142 | $n\text{-}C_4H_9$ | H | |
| 143 | $n\text{-}C_5H_{11}$ | H | |
| 144 | $n\text{-}C_6H_{13}$ | H | |
| 145 | $n\text{-}C_7H_{15}$ | H | |
| 146 | $n\text{-}C_8H_{17}$ | H | |
| 147 | $n\text{-}C_9H_{19}$ | H | |
| 148 | $CH_2=CH$ | H | |
| 149 | $CH_2=CH-CH_2$ | H | |
| 150 | $E\text{-}CH_3-CH_2=CH$ | H | |
| 151 | $CH_2=CH-(CH_2)_2$ | H | |
| 152 | $E\text{-}CH_3-CH_2-CH=CH-CH_2$ | H | |
| 153 | $E\text{-}CH_3-CH_2-CH_2=CH$ | H | |
| 154 | $CH_3$ | F | |
| 155 | $C_2H_5$ | F | |
| 156 | $n\text{-}C_3H_7$ | F | |
| 157 | $n\text{-}C_4H_9$ | F | |
| 158 | $n\text{-}C_5H_{11}$ | F | |
| 159 | $n\text{-}C_6H_{13}$ | F | |
| 160 | $n\text{-}C_7H_{15}$ | F | |
| 161 | $n\text{-}C_8H_{17}$ | F | |
| 162 | $n\text{-}C_9H_{19}$ | F | |
| 163 | $CH_2=CH$ | F | |
| 164 | $CH_2=CH-CH_2$ | F | |
| 165 | $E\text{-}CH_3-CH_2=CH$ | F | |
| 166 | $CH_2=CH-(CH_2)_2$ | F | |
| 167 | $E\text{-}CH_3-CH_2-CH=CH-CH_2$ | F | |
| 168 | $E\text{-}CH_3-CH_2-CH_2=CH$ | F | |

Example 169 to 258

Analogously to Example 1 the following compounds are prepared:

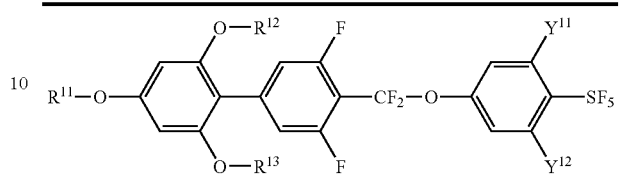

| No. | $R^{11}$ to $R^{13}$ | $Y^{11}$ | $Y^{12}$ | Phases (T/° C.) |
|---|---|---|---|---|
| 169 | $CH_3$ | H | H | |
| 170 | $C_2H_5$ | H | H | |
| 171 | $n\text{-}C_3H_7$ | H | H | C 76° C. I |
| 172 | $n\text{-}C_4H_9$ | H | H | |
| 173 | $n\text{-}C_5H_{11}$ | H | H | |
| 174 | $n\text{-}C_6H_{13}$ | H | H | |
| 175 | $n\text{-}C_7H_{15}$ | H | H | |
| 176 | $n\text{-}C_8H_{17}$ | H | H | |
| 177 | $n\text{-}C_9H_{19}$ | H | H | |
| 178 | $CH_2=CH$ | H | H | |
| 179 | $CH_2=CH-CH_2$ | H | H | |
| 180 | $E\text{-}CH_3-CH_2=CH$ | H | H | |
| 181 | $CH_2=CH-(CH_2)_2$ | H | H | |
| 182 | $E\text{-}CH_3-CH_2-CH=CH-CH_2$ | H | H | |
| 183 | $E\text{-}CH_3-CH_2-CH_2=CH$ | H | H | |
| 184 | $CH_3$ | F | H | |
| 185 | $C_2H_5$ | F | H | |
| 186 | $n\text{-}C_3H_7$ | F | H | |
| 187 | $n\text{-}C_4H_9$ | F | H | |
| 188 | $n\text{-}C_5H_{11}$ | F | H | |
| 189 | $n\text{-}C_6H_{13}$ | F | H | |
| 190 | $n\text{-}C_7H_{15}$ | F | H | |
| 191 | $n\text{-}C_8H_{17}$ | F | H | |
| 192 | $n\text{-}C_9H_{19}$ | F | H | |
| 193 | $CH_2=CH$ | F | H | |
| 194 | $CH_2=CH-CH_2$ | F | H | |
| 195 | $E\text{-}CH_3-CH_2=CH$ | F | H | |
| 196 | $CH_2=CH-(CH_2)_2$ | F | H | |
| 197 | $E\text{-}CH_3-CH_2-CH=CH-CH_2$ | F | H | |
| 198 | $E\text{-}CH_3-CH_2-CH_2=CH$ | F | H | |
| 199 | $CH_3$ | $CF_3$ | H | |
| 200 | $C_2H_5$ | $CF_3$ | H | |
| 201 | $n\text{-}C_3H_7$ | $CF_3$ | H | |
| 202 | $n\text{-}C_4H_9$ | $CF_3$ | H | |
| 203 | $n\text{-}C_5H_{11}$ | $CF_3$ | H | |
| 204 | $n\text{-}C_6H_{13}$ | $CF_3$ | H | |
| 205 | $n\text{-}C_7H_{15}$ | $CF_3$ | H | |
| 206 | $n\text{-}C_8H_{17}$ | $CF_3$ | H | |
| 207 | $n\text{-}C_9H_{19}$ | $CF_3$ | H | |
| 208 | $CH_2=CH$ | $CF_3$ | H | |
| 209 | $CH_2=CH-CH_2$ | $CF_3$ | H | |
| 210 | $E\text{-}CH_3-CH_2=CH$ | $CF_3$ | H | |
| 211 | $CH_2=CH-(CH_2)_2$ | $CF_3$ | H | |
| 212 | $E\text{-}CH_3-CH_2-CH=CH-CH_2$ | $CF_3$ | H | |
| 213 | $E\text{-}CH_3-CH_2-CH_2=CH$ | $CF_3$ | H | |
| 214 | $CH_3$ | F | F | |
| 215 | $C_2H_5$ | F | F | |
| 216 | $n\text{-}C_3H_7$ | F | F | |
| 217 | $n\text{-}C_4H_9$ | F | F | |
| 218 | $n\text{-}C_5H_{11}$ | F | F | |
| 219 | $n\text{-}C_6H_{13}$ | F | F | |
| 220 | $n\text{-}C_7H_{15}$ | F | F | |
| 221 | $n\text{-}C_8H_{17}$ | F | F | |
| 222 | $n\text{-}C_9H_{19}$ | F | F | |
| 223 | $CH_2=CH$ | F | F | |
| 224 | $CH_2=CH-CH_2$ | F | F | |
| 225 | $E\text{-}CH_3-CH_2=CH$ | F | F | |
| 226 | $CH_2=CH-(CH_2)_2$ | F | F | |
| 227 | $E\text{-}CH_3-CH_2-CH=CH-CH_2$ | F | F | |
| 228 | $E\text{-}CH_3-CH_2-CH_2=CH$ | F | F | |
| 229 | $CH_3$ | $CF_3$ | F | |
| 230 | $C_2H_5$ | $CF_3$ | F | |
| 231 | $n\text{-}C_3H_7$ | $CF_3$ | F | |

-continued

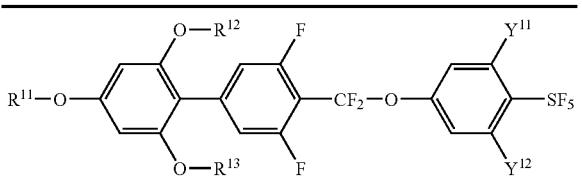

| No. | R¹¹ to R¹³ | Y¹¹ | Y¹² | Phases (T/° C.) |
|---|---|---|---|---|
| 232 | n-$C_4H_9$ | $CF_3$ | F | |
| 233 | n-$C_5H_{11}$ | $CF_3$ | F | |
| 234 | n-$C_6H_{13}$ | $CF_3$ | F | |
| 235 | n-$C_7H_{15}$ | $CF_3$ | F | |
| 236 | n-$C_8H_{17}$ | $CF_3$ | F | |
| 237 | n-$C_9H_{19}$ | $CF_3$ | F | |
| 238 | $CH_2$=CH | $CF_3$ | F | |
| 239 | $CH_2$=CH—$CH_2$ | $CF_3$ | F | |
| 240 | E-$CH_3$—$CH_2$=CH | $CF_3$ | F | |
| 241 | $CH_2$=CH—$(CH_2)_2$ | $CF_3$ | F | |
| 242 | E-$CH_3$—$CH_2$=CH—$CH_2$ | $CF_3$ | F | |
| 243 | E-$CH_3$—$CH_2$—$CH_2$=CH | $CF_3$ | F | |
| 244 | $CH_3$ | $CF_3$ | $CF_3$ | |
| 245 | $C_2H_5$ | $CF_3$ | $CF_3$ | |
| 246 | n-$C_3H_7$ | $CF_3$ | $CF_3$ | |
| 247 | n-$C_4H_9$ | $CF_3$ | $CF_3$ | |
| 248 | n-$C_5H_{11}$ | $CF_3$ | $CF_3$ | |
| 249 | n-$C_6H_{13}$ | $CF_3$ | $CF_3$ | |
| 250 | n-$C_7H_{15}$ | $CF_3$ | $CF_3$ | |
| 251 | n-$C_8H_{17}$ | $CF_3$ | $CF_3$ | |
| 252 | n-$C_9H_{19}$ | $CF_3$ | $CF_3$ | |
| 253 | $CH_2$=CH | $CF_3$ | $CF_3$ | |
| 254 | $CH_2$=CH—$CH_2$ | $CF_3$ | $CF_3$ | |
| 255 | E-$CH_3$—$CH_2$=CH | $CF_3$ | $CF_3$ | |
| 256 | $CH_2$=CH—$(CH_2)_2$ | $CF_3$ | $CF_3$ | |
| 257 | E-$CH_3$—$CH_2$=CH—$CH_2$ | $CF_3$ | $CF_3$ | |
| 258 | E-$CH_3$—$CH_2$—$CH_2$=CH | $CF_3$ | $CF_3$ | |

Example 259 to 348

Analogously to Example 1 the following compounds are prepared:

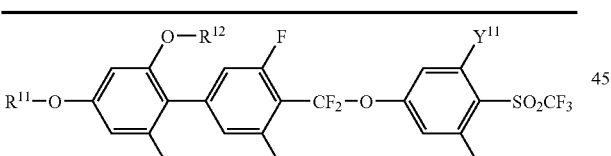

| No. | R¹¹ to R¹³ | Y¹¹ | Y¹² | Phases (T/° C.) |
|---|---|---|---|---|
| 259 | $CH_3$ | H | H | |
| 260 | $C_2H_5$ | H | H | |
| 261 | n-$C_3H_7$ | H | H | $T_g$ −5° C. C 79° C. I |
| 262 | n-$C_4H_9$ | H | H | |
| 263 | n-$C_5H_{11}$ | H | H | |
| 264 | n-$C_6H_{13}$ | H | H | |
| 265 | n-$C_7H_{15}$ | H | H | |
| 266 | n-$C_8H_{17}$ | H | H | |
| 267 | n-$C_9H_{19}$ | H | H | |
| 268 | $CH_2$=CH | H | H | |
| 269 | $CH_2$=CH—$CH_2$ | H | H | |
| 270 | E-$CH_3$—$CH_2$=CH | H | H | |
| 271 | $CH_2$=CH—$(CH_2)_2$ | H | H | |
| 272 | E-$CH_3$—$CH_2$=CH—$CH_2$ | H | H | |
| 273 | E-$CH_3$—$CH_2$—$CH_2$=CH | H | H | |
| 274 | $CH_3$ | F | H | |
| 275 | $C_2H_5$ | F | H | |
| 276 | n-$C_3H_7$ | F | H | |
| 277 | n-$C_4H_9$ | F | H | |

-continued

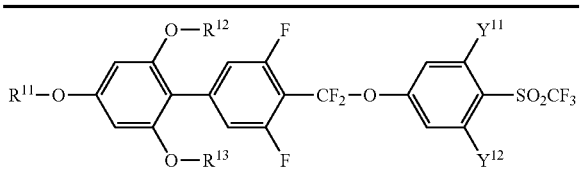

| No. | R¹¹ to R¹³ | Y¹¹ | Y¹² | Phases (T/° C.) |
|---|---|---|---|---|
| 278 | n-$C_5H_{11}$ | F | H | |
| 279 | n-$C_6H_{13}$ | F | H | |
| 280 | n-$C_7H_{15}$ | F | H | |
| 281 | n-$C_8H_{17}$ | F | H | |
| 282 | n-$C_9H_{19}$ | F | H | |
| 283 | $CH_2$=CH | F | H | |
| 284 | $CH_2$=CH—$CH_2$ | F | H | |
| 285 | E-$CH_3$—$CH_2$=CH | F | H | |
| 286 | $CH_2$=CH—$(CH_2)_2$ | F | H | |
| 287 | E-$CH_3$—$CH_2$=CH—$CH_2$ | F | H | |
| 288 | E-$CH_3$—$CH_2$—$CH_2$=CH | F | H | |
| 289 | $CH_3$ | $CF_3$ | H | |
| 290 | $C_2H_5$ | $CF_3$ | H | |
| 291 | n-$C_3H_7$ | $CF_3$ | H | |
| 292 | n-$C_4H_9$ | $CF_3$ | H | |
| 293 | n-$C_5H_{11}$ | $CF_3$ | H | |
| 294 | n-$C_6H_{13}$ | $CF_3$ | H | |
| 295 | n-$C_7H_{15}$ | $CF_3$ | H | |
| 296 | n-$C_8H_{17}$ | $CF_3$ | H | |
| 297 | n-$C_9H_{19}$ | $CF_3$ | H | |
| 298 | $CH_2$=CH | $CF_3$ | H | |
| 299 | $CH_2$=CH—$CH_2$ | $CF_3$ | H | |
| 300 | E-$CH_3$—$CH_2$=CH | $CF_3$ | H | |
| 301 | $CH_2$=CH—$(CH_2)_2$ | $CF_3$ | H | |
| 302 | E-$CH_3$—$CH_2$=CH—$CH_2$ | $CF_3$ | H | |
| 303 | E-$CH_3$—$CH_2$—$CH_2$=CH | $CF_3$ | H | |
| 304 | $CH_3$ | F | F | |
| 305 | $C_2H_5$ | F | F | |
| 306 | n-$C_3H_7$ | F | F | $T_g$ −22° C. I |
| 307 | n-$C_4H_9$ | F | F | |
| 308 | n-$C_5H_{11}$ | F | F | |
| 309 | n-$C_6H_{13}$ | F | F | |
| 310 | n-$C_7H_{15}$ | F | F | |
| 311 | n-$C_8H_{17}$ | F | F | |
| 312 | n-$C_9H_{19}$ | F | F | |
| 313 | $CH_2$=CH | F | F | |
| 314 | $CH_2$=CH—$CH_2$ | F | F | |
| 315 | E-$CH_3$—$CH_2$=CH | F | F | |
| 316 | $CH_2$=CH—$(CH_2)_2$ | F | F | |
| 317 | E-$CH_3$—$CH_2$=CH—$CH_2$ | F | F | |
| 318 | E-$CH_3$—$CH_2$—$CH_2$=CH | F | F | |
| 319 | $CH_3$ | $CF_3$ | F | |
| 320 | $C_2H_5$ | $CF_3$ | F | |
| 321 | n-$C_3H_7$ | $CF_3$ | F | |
| 322 | n-$C_4H_9$ | $CF_3$ | F | |
| 323 | n-$C_5H_{11}$ | $CF_3$ | F | |
| 324 | n-$C_6H_{13}$ | $CF_3$ | F | |
| 325 | n-$C_7H_{15}$ | $CF_3$ | F | |
| 326 | n-$C_8H_{17}$ | $CF_3$ | F | |
| 327 | n-$C_9H_{19}$ | $CF_3$ | F | |
| 328 | $CH_2$=CH | $CF_3$ | F | |
| 329 | $CH_2$=CH—$CH_2$ | $CF_3$ | F | |
| 330 | E-$CH_3$—$CH_2$=CH | $CF_3$ | F | |
| 331 | $CH_2$=CH—$(CH_2)_2$ | $CF_3$ | F | |
| 332 | E-$CH_3$—$CH_2$=CH—$CH_2$ | $CF_3$ | F | |
| 333 | E-$CH_3$—$CH_2$—$CH_2$=CH | $CF_3$ | F | |
| 334 | $CH_3$ | $CF_3$ | $CF_3$ | |
| 335 | $C_2H_5$ | $CF_3$ | $CF_3$ | |
| 336 | n-$C_3H_7$ | $CF_3$ | $CF_3$ | |
| 337 | n-$C_4H_9$ | $CF_3$ | $CF_3$ | |
| 338 | n-$C_5H_{11}$ | $CF_3$ | $CF_3$ | |
| 339 | n-$C_6H_{13}$ | $CF_3$ | $CF_3$ | |
| 340 | n-$C_7H_{15}$ | $CF_3$ | $CF_3$ | |
| 341 | n-$C_8H_{17}$ | $CF_3$ | $CF_3$ | |
| 342 | n-$C_9H_{19}$ | $CF_3$ | $CF_3$ | |
| 343 | $CH_2$=CH | $CF_3$ | $CF_3$ | |
| 344 | $CH_2$=CH—$CH_2$ | $CF_3$ | $CF_3$ | |
| 345 | E-$CH_3$—$CH_2$=CH | $CF_3$ | $CF_3$ | |

-continued

[Structure: biphenyl with R11-O, O-R12, O-R13, two F, CF2-O linker to phenyl with Y11, Y12, SO2CF3]

| No. | R11 to R13 | Y11 | Y12 | Phases (T/° C.) |
|---|---|---|---|---|
| 346 | CH2=CH—(CH2)2 | CF3 | CF3 | |
| 347 | E-CH3—CH2=CH—CH2 | CF3 | CF3 | |
| 348 | E-CH3—CH2—CH2=CH | CF3 | CF3 | |

Example 349 to 393

Analogously to Example 1 the following compounds are prepared:

[Structure: biphenyl with R11-O, O-R12, O-R13, two F, CF2-O linker to phenyl with Y11, CF3, Y12]

| No. | R11 to R13 | Y11 | Y12 | Phases (T/° C.) |
|---|---|---|---|---|
| 349 | CH3 | CF3 | H | |
| 350 | C2H5 | CF3 | H | |
| 351 | n-C3H7 | CF3 | H | |
| 352 | n-C4H9 | CF3 | H | |
| 353 | n-C5H11 | CF3 | H | |
| 354 | n-C6H13 | CF3 | H | |
| 355 | n-C7H15 | CF3 | H | |
| 356 | n-C8H17 | CF3 | H | |
| 357 | n-C9H19 | CF3 | H | |
| 358 | CH2=CH | CF3 | H | |
| 359 | CH2=CH—CH2 | CF3 | H | |
| 360 | E-CH3—CH2=CH | CF3 | H | |
| 361 | CH2=CH—(CH2)2 | CF3 | H | |

-continued

[Structure: biphenyl with R11-O, O-R12, O-R13, two F, CF2-O linker to phenyl with Y11, CF3, Y12]

| No. | R11 to R13 | Y11 | Y12 | Phases (T/° C.) |
|---|---|---|---|---|
| 362 | E-CH3—CH2=CH—CH2 | CF3 | H | |
| 363 | E-CH3—CH2—CH2=CH | CF3 | H | |
| 364 | CH3 | CF3 | F | |
| 365 | C2H5 | CF3 | F | |
| 366 | n-C3H7 | CF3 | F | |
| 367 | n-C4H9 | CF3 | F | |
| 368 | n-C5H11 | CF3 | F | |
| 369 | n-C6H13 | CF3 | F | |
| 370 | n-C7H15 | CF3 | F | |
| 371 | n-C8H17 | CF3 | F | |
| 372 | n-C9H19 | CF3 | F | |
| 373 | CH2=CH | CF3 | F | |
| 374 | CH2=CH—CH2 | CF3 | F | |
| 375 | E-CH3—CH2=CH | CF3 | F | |
| 376 | CH2=CH—(CH2)2 | CF3 | F | |
| 377 | E-CH3—CH2=CH—CH2 | CF3 | F | |
| 378 | E-CH3—CH2—CH2=CH | CF3 | F | |
| 379 | CH3 | CF3 | CF3 | |
| 380 | C2H5 | CF3 | CF3 | |
| 381 | n-C3H7 | CF3 | CF3 | |
| 382 | n-C4H9 | CF3 | CF3 | |
| 383 | n-C5H11 | CF3 | CF3 | |
| 384 | n-C6H13 | CF3 | CF3 | |
| 385 | n-C7H15 | CF3 | CF3 | |
| 386 | n-C8H17 | CF3 | CF3 | |
| 387 | n-C9H19 | CF3 | CF3 | |
| 388 | CH2=CH | CF3 | CF3 | |
| 389 | CH2=CH—CH2 | CF3 | CF3 | |
| 390 | E-CH3—CH2=CH | CF3 | CF3 | |
| 391 | CH2=CH—(CH2)2 | CF3 | CF3 | |
| 392 | E-CH3—CH2=CH—CH2 | CF3 | CF3 | |
| 393 | E-CH3—CH2—CH2=CH | CF3 | CF3 | |

Examples 394 to 471

Analogously to example 1 the following compounds were prepared:

| Ex. # | Structure of Compound | Properties |
|---|---|---|
| 394 | [Structure: biphenyl with OC3H7 groups, F substituents, CF2-O linker to tetrafluoronaphthalene] | M.P. = 79° C.; |
| 395 | [Structure: biphenyl with OC3H7 groups, F substituents, CO2 linker to difluorophenyl with SO2CF3] | Tg = 12° C., M.P. = 76° C.; |

| Ex. # | Structure of Compound | Properties |
|---|---|---|
| 396 | (structure) | M.P. = 114° C.; |
| 397 | (structure) | Tg = −11° C., M.P. = 78° C.; |
| 398 | (structure) | Tg = 6° C., M.P. = 73° C.; |
| 399 | (structure) | Tg = −9° C., M.P. = 81° C.; |
| 400 | (structure) | M.P. = 53° C., Δn = −0.082, Δε = 7.3, |
| 401 | (structure) | Tg = −3° C., M.P. = 109° C.; |
| 402 | (structure) | M.P. = 111° C., Δn = 0.045, Δε = 14.4; |
| 403 | (structure) | M.P. = 40° C.; |

-continued

| Ex. # | Structure of Compound | Properties |
|---|---|---|
| 404 | C3H7O–[2,4-di(OC3H7),6-OC3H7-phenyl]–[3,5-diF-phenyl]–CO–O–[3,5-diF,4-CF3-phenyl] | Tg = −5° C., M.P. = 74° C.; |
| 405 | C3H7O–[2,4-di(OC3H7),6-OC3H7-phenyl]–[phenyl]–CF2–O–[4-OC5H11-phenyl] | M.P. = 54° C.; |
| 406 | C3H7O–[2,4,6-tri(OC3H7)-phenyl]–[phenyl]–CF2–O–[3,5-di(CF3)-phenyl] | M.P. = 98° C.; |
| 407 | C3H7O–[2,4,6-tri(OC3H7)-phenyl]–[phenyl]–CF2–O–[2,4,6-triF-phenyl] | Tg = −17° C., M.P. = 69° C.; |
| 408 | C3H7O–[2,4,6-tri(OC3H7)-phenyl]–[phenyl]–CF2–O–[3,4,5-triF-phenyl] | Tg = −25° C., M.P. = 63° C., |
| 409 | C6H13O–[2,4,6-tri(OC6H13)-phenyl]–[phenyl]–CF2–O–[3,4,5-triF-phenyl] | Δn = 0.006, Δε = 12.4, Tg = −53° C.; |
| 410 | [2,6-di(OC3H7)-phenyl]–[3,5-diF-phenyl]–CF2–O–[3,4,5-triF-phenyl] | M.P. = 34° C.; |
| 411 | H3C–[2,6-di(OC3H7)-4-methyl-phenyl]–[3,5-diF-phenyl]–CF2–O–[3,4,5-triF-phenyl] | Δn = −0.026, Δε = 15.2, Tg = −30° C.; |

-continued

| Ex. # | Structure of Compound | Properties |
|---|---|---|
| 412 | (structure) | |
| 413 | (structure) | Tg = −58° C.; |
| 414 | (structure) | Δn = −0.033, Δε = 2.9; |
| 415 | (structure) | Tg = −65° C., M.P. = 31° C.; |
| 416 | (structure) | Tg = −35° C., M.P. = 65° C.; |
| 417 | (structure) | M.P. = 83° C.; |

-continued

| Ex. # | Structure of Compound | Properties |
|---|---|---|
| 418 | | |
| 419 | | |
| 420 | | Δn = 0.057, Δε = 12.9, Tg = −37, M.P. = 43° C.; |
| 421 | | Δn = 0.135, Δε = 32.4; |
| 422 | | Δn = 0.057, Δε = 16.7, Tg = −31, M.P. = 47° C.; |
| 423 | | Δn = 0.103, Δε = 15.2, Tg = −18, M.P. = 65° C.; |
| 424 | | Δn = 0.074, Δε = 21.3, M.P. = −7° C.; |

| Ex. # | Structure of Compound | Properties |
|---|---|---|
| 425 | | M.P. = 94° C.; |
| 426 | | M.P. = 82° C.; |
| 427 | | Tg = −5° C., M.P. = 87° C.; |
| 428 | | Tg = −11° C.; |
| 429 | | |
| 430 | | |

| Ex. # | Structure of Compound | Properties |
|---|---|---|
| 431 | | HTP = +3.5 μm⁻¹, Tg = −61° C.; |
| 432 | | HTP = +3.4 μm⁻¹, Tg = −54° C.; |
| 433 | | Tg = −19° C., M.P. = 78° C.; |
| 434 | | Δn = 0.047, Δε = 27.5, M.P. = 79° C.; |

| Ex. # | Structure of Compound | Properties |
|---|---|---|
| 435 | | Δn = 0.046, Δε = 21.3, M.P. = 63° C.; |
| 436 | | Tg = −16° C., M.P. = 67° C.; |
| 437 | | Δn = 0.034, Δε = 19.0, Tg = −15° C., M.P. = 87° C.; |
| 438 | | M.P. = 124° C.; |
| 439 | | Tg = −1° C., M.P. = 120° C.; |

-continued

| Ex. # | Structure of Compound | Properties |
|---|---|---|
| 440 | | Δn = −0.024, Δε = 14.7; |
| 441 | | Δn = 0.032, Δε = 26.1; |
| 442 | | Tg = −26° C., M.P. = 64° C.; |
| 443 | | Tg = −33° C., M.P. = 69° C.; |
| 444 | | HTP = −22.8 μm$^{-1}$ M.P. = 95° C.; |

-continued
| Ex. # | Structure of Compound | Properties |
|---|---|---|
| 445 | 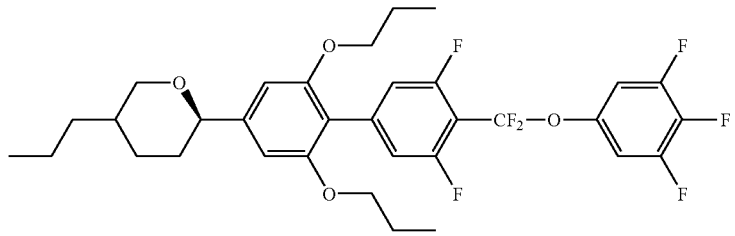 | HTP = +22.7 μm$^{-1}$<br>M.P. = 95° C.; |
| 446 | 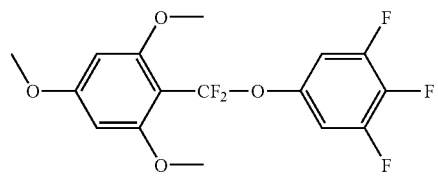 | |
| 447 | 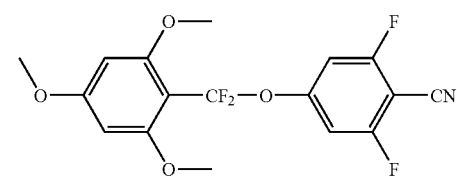 | |
| 448 | 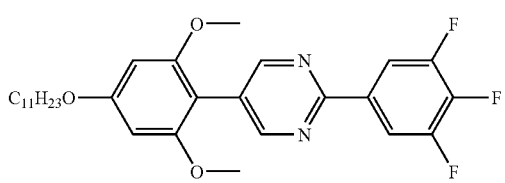 | |
| 449 | 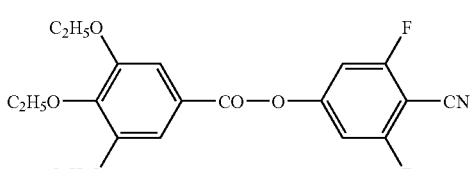 | M.P. = 137; |
| 450 | 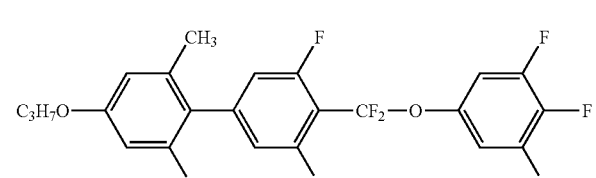 | Δn = 0.039,<br>Δε = 11.8,<br>M.P. = 76° C.; |
| 451 | 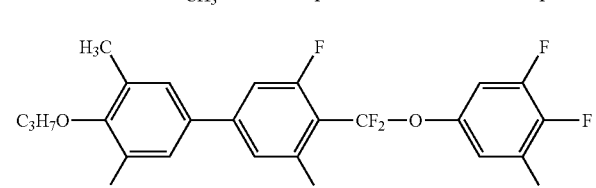 | Δn = 0.086,<br>Δε = 14.9,<br>M.P. = 72° C.; |
| 452 | 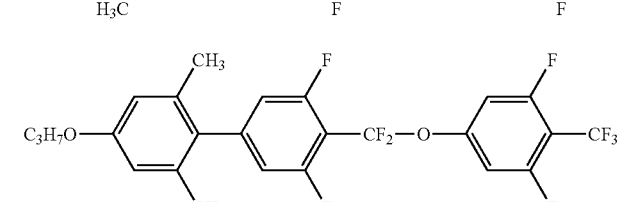 | Δn = 0.037,<br>Δε = 17.1; |

-continued

| Ex. # | Structure of Compound | Properties |
|---|---|---|
| 453 | | Δn = 0.081,<br>Δε = 21.3,<br>M.P. = 74° C.; |
| 454 | | |
| 455 | | Δn = 0.079,<br>Δε = 31.8,<br>Tg = −24° C.,<br>M.P. = 69° C.; |
| 456 | | M.P. = 123° C.; |
| 457 | | |
| 458 | | M.P. = 62° C.; |
| 459 | | Δn = 0.000,<br>Δε = 3.0,<br>Tg = −51° C.; |

-continued
| Ex. # | Structure of Compound | Properties |
|---|---|---|
| 460 | 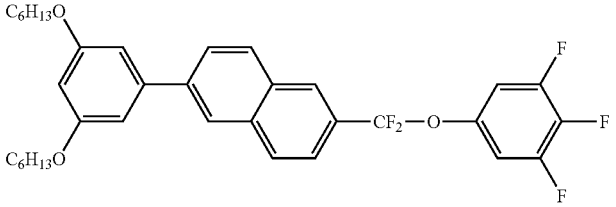 | Δn = 0.049, Δε = 6.0, Tg = −36° C., M.P. = 44° C.; |
| 461 | 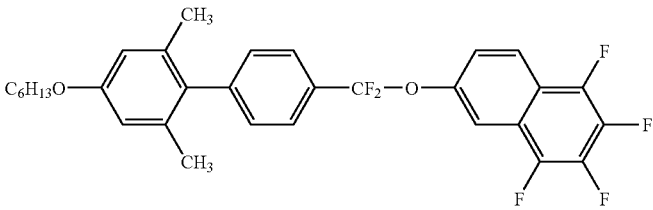 | Δn = 0.121, Δε = 9.3, Tg = −23° C., T(K,S$_x$) = 90° C., M.P. = (−5)° C.; |
| 462 | 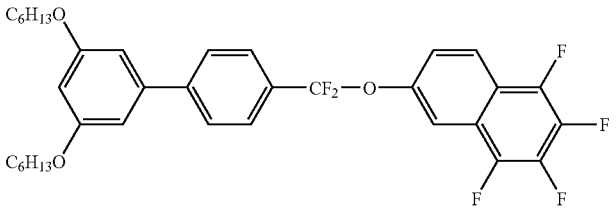 | Δn = 0.046, Δε = 4.9, Tg = −35° C.; |
| 463 | 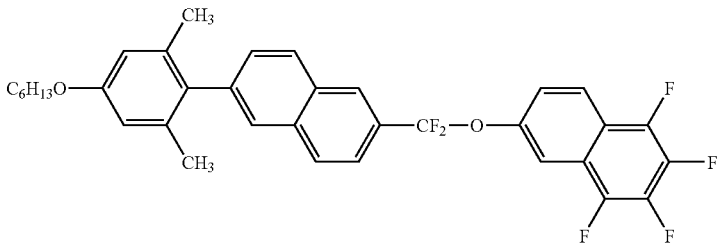 | Δn = 0.168, Δε = 9.3, Tg = −9° C., T(K,N) = 104° C., T(N,I) = 41.9° C.; |
| 464 | 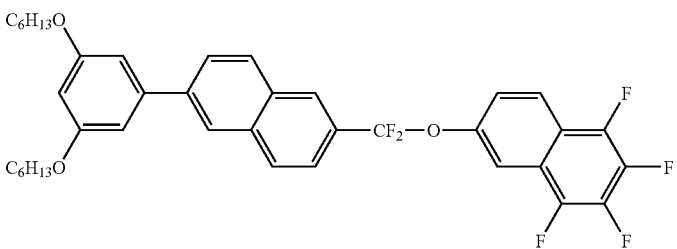 | Δn = 0.090, Δε = 6.6, Tg = −319 C., M.P. = 67° C.; |

| Ex. # | Structure of Compound | Properties |
|---|---|---|
| 465 | | Δn = −050, Δε = 10.8; |
| 466 | | Tg = −15° C.; |
| 467 | | M.P. = 34° C.; |
| 468 | | Δn = 0.137, Δε = 15.2; M.P. = 120° C.; |
| 469 | | Δn = 0.074, Δε = 21.3, M.P. = −7° C.; |

| Ex. # | Structure of Compound | Properties |
|---|---|---|
| 470 | 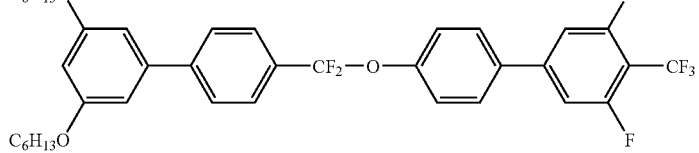 | Δn = 0.074, Δε = 13.2, Tg = −27° C. M.P. = 54° C. |
| 471 | 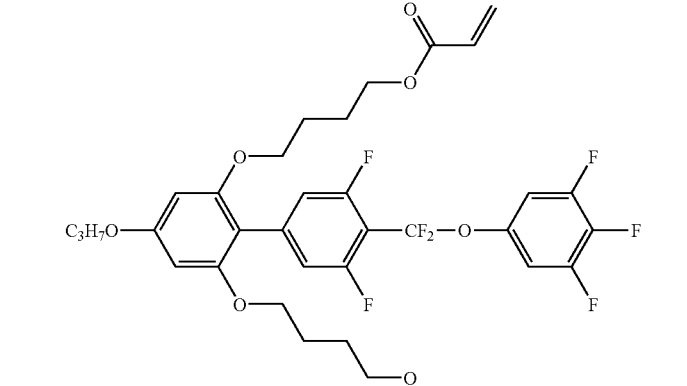 | Tg = −36° C., M.P. = 39° C.; |

Remarks: Δn and Δε extrapolated from 10% solution in ZLI-4792 and HTP in MLC-6260, both mixtures from Merck KGaA, all data except transition temperatures given at 20° C.

USE-EXAMPLES

Use-Example 1

A liquid crystal mixture, host mixture A, is realised consisting of:

| Mixture A | |
|---|---|
| Compound Abbreviation | Concentration/ mass-% |
| GZU-3A-N | 15.0 |
| GZU-4A-N | 15.0 |
| GZU-4O-N | 15.0 |
| UZU-3A-N | 8.0 |
| CUZU-2-N | 9.0 |
| CUZU-3-N | 9.0 |
| CUZU-4-N | 9.0 |
| HP-3N•F | 6.0 |
| HP-4N•F | 6.0 |
| HP-5N•F | 8.0 |
| Σ | 100.0 |

This mixture has the following properties:

Clearing point (T(N,I))/° C.: 56.8

To 85.0% of this mixture 5% of the chiral dopant R-5011 and 10% of the compound of interest are added and the properties of the resulting mixture are determined.

The data are compiled in table 1.

$T_g$, T (K,I) and T(g,I) given in Tables 1a, 1b below are determined by means of DSC (differential scanning calorimetry) and microscopy.

Further electro-optical data given in the tables below are measured in a test cell as described hereinafter: This test cell is an electro-optical cell with interdigital electrodes having a distance of electrodes of 10 μm, a width of electrodes of 10 μm, and a cell thickness of 10 μm. The height of the electrodes—that are made out of chromium and without a polyimid layer—can be ignored in comparison to the cell thickness. Experimental values are determined by using the standard apparatus as used in DE 102 41 301.0.

$T_{trans}$ is the characteristic temperature which is defined as follows:

If the characteristic voltage as a function of temperature has a minimum, the temperature at this minimum is denoted as characteristic temperature;

If the characteristic voltage as a function of temperature has no minimum and if the controlling medium has one or more blue phases, the transistion temperature to the blue phase is denoted as characteristic temperature; in case there are more than one blue phase, the lowest transition temperature to a blue phase is denoted as characteristic temperature;

If the characteristic voltage as a function of temperature has no minimum and if the controlling medium has no blue phase, the transistion temperature to the isotropic phase is denoted as characteristic temperature.

In this context the term "characteristic voltage" refers to a specific voltage, e.g. the threshold voltage $V_{10}$ at which a light transmission of 10% is observed or the saturation voltage $V_{90}$ at which a transmission of 90% is observed.

$$\frac{dV^*}{dT} := \frac{\frac{dV}{dT}(T_{trans}+2)}{V(T_{trans}+2)}$$

In each case 10% of the respective compound of interest have been dissolved together with 5% of the chiral dopant R-5011 in the host mixture A, both available from Merck KGaA, Germany.

The results are shown in the following tables (Tables 1a to 1w).

TABLE 1a

| | Use example | | | |
|---|---|---|---|---|
| | 1.1 | 1.2 | 1.3 | 1.4 |
| | Compound of example | | | |
| | 1 | 2 | 3 | 47 |
| $T_g/°$ C. | — | — | −53 | −23 |
| T(K, I)/° C. | 69 | 51 | | 48 |
| T(g, I)/° C. | — | — | −53 | — |
| $T_{trans}/°$ C. | −2 | −2 | 1 | 1 |
| T trans. − Iso/deg. | 9 | 9 | 12 | 12 |
| ΔT/deg. | 11 | 11 | 11 | 11 |
| $V_{100}$(T trans. + 2)/V | 43 | 39 | 36 | 33 |
| dV/dT(T trans. + 2)/V/deg. | 1.0 | 1.0 | 1.0 | 1.0 |
| dV*/dT(T trans. + 2)/deg.$^{-1}$ | 0.02 | 0.03 | 0.03 | 0.03 |

TABLE 1b

| | Use example | | | |
|---|---|---|---|---|
| | 1.5 | 1.6 | 1.7 | 1.8 |
| | Compound of example | | | |
| | 46 | 137 | 136 | 138 |
| $T_g/°$ C. | — | — | −31 | −14 |
| T(K, I)/° C. | 66 | 16 | — | 89 |
| T(g, I)/° C. | — | — | — | — |
| T trans/° C. | 1.0 | 10.5 | 11.0 | 6.0 |
| T trans − Iso/deg. | 13 | 19.5 | n.d. | 15.5 |
| ΔT/deg. | 12 | 9 | n.d. | 9.5 |
| $V_{100}$(T trans. + 2)/V | 38 | 40 | n.d. | 36 |
| dV/dT(T trans. + 2)/V/deg. | 1.0 | 1.5 | n.d. | 1.5 |
| dV*/dT(T trans. + 2)/deg.$^{-1}$ | 0.03 | 0.03 | n.d. | 0.04 |

TABLE 1c

| | Use example | | | |
|---|---|---|---|---|
| | 1.9 | 1.10 | 1.11 | 1.12 |
| | Compound of example | | | |
| | 35 | 36 | 37 | 38 |
| $T_{trans}/°$ C. | 7.5 | 2.5 | 4.6 | 6.2 |
| T trans. − Iso/deg. | 17.6 | 10.3 | 16.0 | 16.1 |
| ΔT/deg. | 10.1 | 7.8 | 11.4 | 9.9 |
| $V_{100}$(T trans. + 2)/V | 35 | 35 | 34.5 | 40.5 |
| dV/dT(T trans. + 2)/V/deg. | 0.05 | 0 | 2.0 | 1.8 |
| dV*/dT(T trans. + 2)/deg.$^{-1}$ | 0.001 | 0 | 0.06 | 0.05 |

TABLE 1d

| | Use example | | | |
|---|---|---|---|---|
| | 1.13 | 1.14 | 1.15 | 1.16 |
| | Compound of example | | | |
| | 171 | 261 | 306 | 394 |
| $T_{trans}/°$ C. | 0.0 | n.d. | 4.0 | 7.5 |
| T trans. − Iso/deg. | 12.0 | n.d. | 11.0 | 18.0 |
| ΔT/deg. | 12.0 | n.d. | 7.0 | 10.5 |
| $V_{100}$(T trans. + 2)/V | 36 | n.d. | 38 | 39.5 |
| dV/dT(T trans. + 2)/V/deg. | 0 | n.d. | 1.0 | 4.5 |
| dV*/dT(T trans. + 2)/deg.$^{-1}$ | 0 | n.d. | 0.03 | 0.12 |

TABLE 1e

| | Use example | | | |
|---|---|---|---|---|
| | 1.17 | 1.18 | 1.19 | 1.20 |
| | Compound of example | | | |
| | 395 | 396 | 397 | 398 |
| $T_{trans}/°$ C. | 5.0 | n.d. | 5.0 | n.d. |
| T trans. − Iso/deg. | 14.0 | n.d. | 15.5 | n.d. |
| ΔT/deg. | 9.0 | n.d. | 10.5 | n.d. |
| $V_{100}$(T trans. + 2)/V | 37 | n.d. | 37 | n.d. |
| dV/dT(T trans. + 2)/V/deg. | 1.0 | n.d. | 1.0 | n.d. |
| dV*/dT(T trans. + 2)/deg.$^{-1}$ | 0.02 | n.d. | 0.03 | n.d. |

Remarks:
n.d.: not determined.

TABLE 1f

| | Use example | | | |
|---|---|---|---|---|
| | 1.21 | 1.22 | 1.23 | 1.24 |
| | Compound of example | | | |
| | 399 | 400 | 401 | 402 |
| $T_{trans}/°$ C. | n.d. | n.d. | −5.6 | −3.1 |
| T trans. − Iso/deg. | n.d. | n.d. | 9.3 | 8.9 |
| ΔT/deg. | n.d. | n.d. | 14.8 | 12.0 |
| $V_{100}$(T trans. + 2)/V | n.d. | n.d. | 39 | 36 |
| dV/dT(T trans. + 2)/V/deg. | n.d. | n.d. | 0 | 0 |
| dV*/dT(T trans. + 2)/deg.$^{-1}$ | n.d. | n.d. | 0 | 0 |

TABLE 1g

| | Use example | | | |
|---|---|---|---|---|
| | 1.25 | 1.26 | 1.27 | 1.28 |
| | Compound of example | | | |
| | 403 | 404 | 405 | 406 |
| $T_{trans}/°$ C. | −3.0 | 4.0 | n.d. | n.d. |
| T trans. − Iso/deg. | 12.0 | 16.5 | n.d. | n.d. |
| ΔT/deg. | 15.0 | 12.5 | n.d. | n.d. |
| $V_{100}$(T trans. + 2)/V | 35 | 30 | n.d. | n.d. |
| dV/dT(T trans. + 2)/V/deg. | 1.0 | 1.0 | n.d. | n.d. |
| dV*/dT(T trans. + 2)/deg.$^{-1}$ | 0.03 | 0.03 | n.d. | n.d. |

TABLE 1h

| | Use example | | | |
|---|---|---|---|---|
| | 1.29 | 1.30 | 1.31 | 1.32 |
| | Compound of example | | | |
| | 407 | 408 | 409 | 410 |
| $T_{trans.}/°C.$ | n.d. | −5.5 | −3.0 | −0.9 |
| T trans. − Iso/deg. | n.d. | 8.5 | 12.0 | 11.4 |
| ΔT/deg. | n.d. | 14.0 | 15.0 | 12.3 |
| $V_{100}$(T trans. + 2)/V | n.d. | 37 | 35 | 39.5 |
| dV/dT(T trans. + 2)/V/deg. | n.d. | 0.5 | 1.0 | 1.15 |
| dV*/dT(T trans. + 2)/deg.$^{-1}$ | n.d. | 0.01 | 0.01 | 0.04 |

Remarks:
n.d.: not determined.

TABLE 1i

| | Use example | | | |
|---|---|---|---|---|
| | 1.33 | 1.34 | 1.35 | 1.36 |
| | Compound of example | | | |
| | 411 | 412 | 413 | 414 |
| $T_{trans.}/°C.$ | −0.8 | n.d. | 5.3 | 11.0 |
| T trans. − Iso/deg. | 12.5 | n.d. | 17.5 | 13.5 |
| ΔT/deg. | 13.3 | n.d. | 12.2 | 2.5 |
| $V_{100}$(T trans. + 2)/V | 34 | n.d. | 36 | 140 |
| dV/dT(T trans. + 2)/V/deg. | 1.3 | n.d. | 0 | 10 |
| dV*/dT(T trans. + 2)/deg.$^{-1}$ | 0.04 | n.d. | 0 | 0.08 |

TABLE 1j

| | Use example | | | |
|---|---|---|---|---|
| | 1.37 | 1.38 | 1.39 | 1.40 |
| | Compound of example | | | |
| | 415 | 416 | 417 | 418 |
| $T_{trans.}/°C.$ | 1.3 | 4.1 | 24.0 | 5.0 |
| T trans. − Iso/deg. | 12.8 | 15.3 | 30.5 | 16.5 |
| ΔT/deg. | 11.5 | 11.2 | 6.5 | 11.5 |
| $V_{100}$(T trans. + 2)/V | 37 | 35.5 | 36 | 42 |
| dV/dT(T trans. + 2)/V/deg. | 1.1 | 2.0 | 2.0 | 1 |
| dV*/dT(T trans. + 2)/deg.$^{-1}$ | 0.03 | 0.05 | 0.06 | 0.02 |

TABLE 1k

| | Use example | | | |
|---|---|---|---|---|
| | 1.41 | 1.42 | 1.43 | 1.44 |
| | Compound of example | | | |
| | 419 | 420 | 421 | 422 |
| $T_{trans.}/°C.$ | 24.0 | 7.5 | 14.0 | n.d. |
| T trans. − Iso/deg. | 30.5 | 18.7 | 23.1 | n.d. |
| ΔT/deg. | 6.5 | 11.2 | 9.1 | n.d. |
| $V_{100}$(T trans. + 2)/V | 36 | 37.5 | 32 | n.d. |
| dV/dT(T trans. + 2)/V/deg. | 2.0 | 1.35 | 2.0 | n.d. |
| dV*/dT(T trans. + 2)/deg.$^{-1}$ | 0.06 | 0.04 | 0.06 | n.d. |

Remarks:
n.d.: not determined.

TABLE 1l

| | Use example | | | |
|---|---|---|---|---|
| | 1.45 | 1.46 | 1.47 | 1.48 |
| | Compound of example | | | |
| | 423 | 424 | 425 | 426 |
| $T_{trans.}/°C.$ | 12.6 | 7.3 | 14.0 | 14.0 |
| T trans. − Iso/deg. | 21.9 | 19.4 | 22.5 | 22.0 |
| ΔT/deg. | 9.3 | 12.1 | 8.5 | 8.0 |
| $V_{100}$(T trans. + 2)/V | 39.5 | 43.5 | 36 | 36 |
| dV/dT(T trans. + 2)/V/deg. | 2.3 | 0.7 | 2.0 | 2.0 |
| dV*/dT(T trans. + 2)/deg.$^{-1}$ | 0.04 | 0.02 | 0.06 | 0.06 |

TABLE 1m

| | Use example | | | |
|---|---|---|---|---|
| | 1.49 | 1.50 | 1.51 | 1.52 |
| | Compound of example | | | |
| | 427 | 428 | 429 | 430 |
| $T_{trans.}/°C.$ | n.d. | 4.5 | 2.8 | n.d. |
| T trans. − Iso/deg. | n.d. | 16.0 | 12.0 | n.d. |
| ΔT/deg. | n.d. | 11.5 | 9.2 | n.d. |
| $V_{100}$(T trans. + 2)/V | n.d. | 38 | 35.5 | n.d. |
| dV/dT(T trans. + 2)/V/deg. | n.d. | 1.0 | 1.1 | n.d. |
| dV*/dT(T trans. + 2)/deg.$^{-1}$ | n.d. | 0.03 | 0.04 | n.d. |

TABLE 1n

| | Use example | | | |
|---|---|---|---|---|
| | 1.53 | 1.54 | 1.55 | 1.56 |
| | Compound of example | | | |
| | 431 | 432 | 433 | 434 |
| $T_{trans.}/°C.$ | n.d. | 14.5 | n.d. | n.d. |
| T trans. − Iso/deg. | n.d. | 20.7 | n.d. | n.d. |
| ΔT/deg. | n.d. | 6.2 | n.d. | n.d. |
| $V_{100}$(T trans. + 2)/V | n.d. | 111.5 | n.d. | n.d. |
| dV/dT(T trans. + 2)/V/deg. | n.d. | 9.1 | n.d. | n.d. |
| dV*/dT(T trans. + 2)/deg.$^{-1}$ | n.d. | 0.05 | n.d. | n.d. |

Remarks:
n.d.: not determined.

TABLE 1o

| | Use example | | | |
|---|---|---|---|---|
| | 1.57 | 1.58 | 1.59 | 1.60 |
| | Compound of example | | | |
| | 435 | 436 | 437 | 438 |
| $T_{trans.}/°C.$ | n.d. | 9.0 | 9.4 | n.d. |
| T trans. − Iso/deg. | n.d. | 19.3 | 19.5 | n.d. |
| ΔT/deg. | n.d. | 9.3 | 10.1 | n.d. |
| $V_{100}$(T trans. + 2)/V | n.d. | 37 | 38 | n.d. |
| dV/dT(T trans. + 2)/V/deg. | n.d. | 2.5 | 1.1 | n.d. |
| dV*/dT(T trans. + 2)/deg.$^{-1}$ | n.d. | 0.07 | 0.03 | n.d. |

TABLE 1p

| | Use example | | | |
|---|---|---|---|---|
| | 1.61 | 1.62 | 1.63 | 1.64 |
| | Compound of example | | | |
| | 439 | 440 | 441 | 442 |
| $T_{trans.}/°C.$ | 6.9 | 0.4 | 5.5 | 9.2 |
| T trans. – Iso/deg. | 18.4 | 10.2 | 15.8 | 20.3 |
| ΔT/deg. | 11.5 | 9.8 | 10.3 | 11.1 |
| $V_{100}$(T trans. + 2)/V | 35.5 | 35.5 | 38.5 | 36.5 |
| dV/dT(T trans. + 2)/V/deg. | 0.9 | 1.0 | 1.0 | 0.9 |
| dV*/dT(T trans. + 2)/deg.$^{-1}$ | 0.03 | 0.03 | 0.02 | 0.02 |

TABLE 1q

| | Use example | | | |
|---|---|---|---|---|
| | 1.65 | 1.66 | 1.67 | 1.68 |
| | Compound of example | | | |
| | 443 | 444 | 445 | 446 |
| $T_{trans.}/°C.$ | 9.8 | n.d. | n.d. | n.d. |
| T trans. – Iso/deg. | 19.8 | n.d. | n.d. | n.d. |
| ΔT/deg. | 10.0 | n.d. | n.d. | n.d. |
| $V_{100}$(T trans. + 2)/V | 38 | n.d. | n.d. | n.d. |
| dV/dT(T trans. + 2)/V/deg. | 1 | n.d. | n.d. | n.d. |
| dV*/dT(T trans. + 2)/deg.$^{-1}$ | 0.03 | n.d. | n.d. | n.d. |

Remarks:
n.d.: not determined.

TABLE 1r

| | Use example | | | |
|---|---|---|---|---|
| | 1.69 | 1.70 | 1.71 | 1.72 |
| | Compound of example | | | |
| | 447 | 448 | 449 | 450 |
| $T_{trans.}/°C.$ | 12 | 25.4 | n.d. | 6.5 |
| T trans. – Iso/deg. | 17 | 32.6 | n.d. | 17 |
| ΔT/deg. | 5 | 7.2 | n.d. | 10.5 |
| $V_{100}$(T trans. + 2)/V | 42 | 42.5 | n.d. | 39 |
| dV/dT(T trans. + 2)/V/deg. | 1.5 | 1.5 | n.d. | 2 |
| dV*/dT(T trans. + 2)/deg.$^{-1}$ | 0.04 | 0.03 | n.d. | 0.05 |

TABLE 1s

| | Use example | | | |
|---|---|---|---|---|
| | 1.73 | 1.74 | 1.75 | 1.76 |
| | Compound of example | | | |
| | 451 | 452 | 453 | 454 |
| $T_{trans.}/°C.$ | 15 | 7.5 | 14.5 | 11.5 |
| T trans. – Iso/deg. | 23 | 18 | 22.5 | 20.5 |
| ΔT/deg. | 8 | 10.5 | 8 | 9 |
| $V_{100}$(T trans. + 2)/V | 40 | 42 | 43 | 40 |
| dV/dT(T trans. + 2)/V/deg. | 2 | 2 | 2 | 1.5 |
| dV*/dT(T trans. + 2)/deg.$^{-1}$ | 0.04 | 0.06 | 0.04 | 0.04 |

TABLE 1t

| | Use example | | | |
|---|---|---|---|---|
| | 1.77 | 1.78 | 1.79 | 1.80 |
| | Compound of example | | | |
| | 455 | 456 | 457 | 458 |
| $T_{trans.}/°C.$ | 23.5 | 15 | 9 | 3.3 |
| T trans. – Iso/deg. | 31 | 25.3 | 18.8 | 14.3 |
| ΔT/deg. | 7.5 | 10.3 | 9.8 | 11 |
| $V_{100}$(T trans. + 2)/V | 37 | 39.5 | 41 | 43.5 |
| dV/dT(T trans. + 2)/V/deg. | 3 | 4.5 | 3 | −1.5 |
| dV*/dT(T trans. + 2)/deg.$^{-1}$ | 0.08 | 0.12 | 0.07 | −0.05 |

Remarks:
n.d.: not determined.

TABLE 1u

| | Use example | | | |
|---|---|---|---|---|
| | 1.81 | 1.82 | 1.83 | 1.84 |
| | Compound of example | | | |
| | 459 | 460 | 461 | 462 |
| $T_{trans.}/°C.$ | −2.6 | 1.9 | 22.1 | 3.9 |
| T trans. – Iso/deg. | 9.4 | 12.9 | 29 | 15.1 |
| ΔT/deg. | 12 | 11 | 6.9 | 11.2 |
| $V_{100}$(T trans. + 2)/V | 42.5 | 39.5 | 41 | 43.5 |
| dV/dT(T trans. + 2)/V/deg. | 1.5 | 1.0 | 0.8 | 0.9 |
| dV*/dT(T trans. + 2)/deg.$^{-1}$ | 0.05 | 0.03 | 0.02 | 0.03 |

TABLE 1v

| | Use example | | | |
|---|---|---|---|---|
| | 1.85 | 1.86 | 1.87 | 1.88 |
| | Compound of example | | | |
| | 463 | 464 | 465 | 466 |
| $T_{trans.}/°C.$ | 26.9 | 11.7 | −1.1 | n.d. |
| T trans. – Iso/deg. | 33.4 | 20.2 | 8.0 | n.d. |
| ΔT/deg. | 6.5 | 8.5 | 9.1 | n.d. |
| $V_{100}$(T trans. + 2)/V | 46 | 40 | n.d. | n.d. |
| dV/dT(T trans. + 2)/V/deg. | 1.5 | 1.0 | n.d. | n.d. |
| dV*/dT(T trans. + 2)/deg.$^{-1}$ | 0.03 | 0.02 | n.d. | n.d. |

TABLE 1w

| | Use example | | | |
|---|---|---|---|---|
| | 1.89 | 1.90 | 1.91 | 1.92 |
| | Compound of example | | | |
| | 467 | 468 | 469 | 470 |
| $T_{trans.}/°C.$ | n.d. | 28.1 | 7.5 | n.d. |
| T trans. – Iso/deg. | n.d. | 34.0 | 19.4 | n.d. |
| ΔT/deg. | n.d. | 5.9 | 12.1 | n.d. |
| $V_{100}$(T trans. + 2)/V | n.d. | 45 | 43.5 | n.d. |
| dV/dT(T trans. + 2)/V/deg. | n.d. | 1.6 | 0.7 | n.d. |
| dV*/dT(T trans. + 2)/deg.$^{-1}$ | n.d. | 0.03 | 0.02 | n.d. |

Remarks:
n.d.: not determined.

Use-Example 2

To the host mixture A various concentrations of the compound of example 47 (also abbreviated as $(P(O3)_2UQU-3O-T)$ are added.

The concentration of the compound of example 47 in the host mixture A is varied from 3% over 5% and 7% to 15% The data are compiled in table 2.

TABLE 2

| | Use example | | | |
|---|---|---|---|---|
| | 2.1 | 2.2 | 2.3 | 2.4 |
| Host mixture A $P(O3)_2UQU-3O-T$ (Compound of example 47) | | | | |
| c/% | 3 | 5 | 7 | 15 |
| $T_{trans.}/°$ C. | 52 | 48 | 42 | 20 |
| $V_{100}$(T trans. + 2)/V | 115 | 123 | 127 | 96 |
| dV/dT(T trans. + 2)/V/deg. | 18 | 15 | 17 | 11 |
| +/−/V/deg. | 2 | 5 | 5 | 3 |
| dV*/dT(T trans. + 2)/deg.$^{-1}$ | 0.16 | 0.13 | 0.13 | 0.11 |
| +/−/deg.$^{-1}$ | 0.04 | 0.04 | 0.03 | 0.03 |

Remarks:

$T_{trans.}$ is the transition temperature from the cholesteric phase into the optically isotropic phase. It can be observed in electro-optical cells with cross-polarisers.

There is no marked range with a flat dependency of the characteristic voltages on the temperature, however there is a marked decrease of the temperature dependency compared to the medium without the inventive compound.

Use-Example 3

To the host mixture A various concentrations of the compound of example 47 $(P(O3)_2UQU-3O-T)$ are added in combination with various concentrations of the chiral dopant R-5011 available from Merck KGaA.

The concentrations and the data are compiled in table 3.

TABLE 3

| | Use example | |
|---|---|---|
| | 3.2 | 3.3 |
| Host mixture A $P(O3)_2UQU-3O-T$ (Compound of example 47) | | |
| c/% | 5 | 10 |
| c(R-5011)/% | 5 | 3 |
| $T_{trans.}/°$ C. | 18 | n.d. |
| T trans − Iso/deg. | 26 | n.d. |
| Flat T Range/deg. | 8 | n.d. |
| $V_{100}$(T trans. + 2)/V | 42 | n.d. |
| dV/dT(T trans. + 2)/V/deg. | 1.5 | n.d. |
| (+/−)/V/deg. | 1 | n.d. |
| dV*/dT(T trans. + 2)/deg.$^{-1}$ | 0.03 | n.d. |
| (+/−)/V/deg. | 0.03 | n.d. |

In these systems a blue phase is observed and the temperature dependence of the characteristic voltages is dramatically reduced, in fact, an extended range of temperatures with a flat temperature dependence is obtained.

Use-Example 4

A liquid crystal mixture, host mixture B, is realised consisting of:

| Mixture B | |
|---|---|
| Compound Abbreviation | Concentration/ mass-% |
| UZU-3A-N | 15.0 |
| UZU-4A-N | 5.6 |
| GZU-3A-N | 15.0 |
| GZU-4A-N | 15.0 |
| GZU-4O-N | 12.0 |
| CUZU-2-N | 11.0 |
| CUZU-3-N | 11.0 |
| CUZU-4-N | 11.0 |
| HP-3N•F | 4.4 |
| Σ | 100.0 |

This mixture has the following properties:

Clearing point (T(N,I))/° C.: 22.5

To 85.0% of this mixture, host mixture B, 15% of the compound of example 47 $(P(O3)_2UQU-3O-T)$ is added and the properties of the resulting mixture are determined. The concentrations and the data are compiled in table 4.

There is no marked range with a flat dependency of the characteristic voltages on the temperature, however there is a marked decrease of the temperature dependency compared to the medium without the inventive compound.

TABLE 4

| | Use example 4 |
|---|---|
| Host mixture B $P(O3)_2UQU-3O-T$ (Compound of example 47) | |
| c/% | 15 |
| $T_{trans.}/°$ C. | −10 |
| T trans − Iso/deg. | — |
| Flat T Range/deg. | — |
| $V_{100}$(T trans. + 2)/V | 59 |
| dV/dT(T trans. + 2)/V/deg. | 5.5 |
| +/−/V/deg. | 2 |
| dV*/dT(T trans. + 2)/deg.$^{-1}$ | 0.10 |
| +/−/deg.$^{-1}$ | 0.04 |

Use-Example 5

A liquid crystal mixture, host mixture C, is realised consisting of:

| Mixture C | |
|---|---|
| Compound Abbreviation | Concentration/ mass-% |
| ME2N•F | 12.0 |
| ME3N•F | 15.0 |
| ME4N•F | 20.0 |
| ME5N•F | 20.0 |
| HP-3N•F | 10.0 |
| HP-4N•F | 10.0 |

-continued

Mixture C

| Compound Abbreviation | Concentration/ mass-% |
|---|---|
| HP-5N•F | 8.0 |
| PCH-3N•F•F | 5.0 |
| Σ | 100.0 |

This mixture has the following properties:

Clearing point (T(N,I))/° C.: 60.2

To 90% of this mixture, host mixture C, 5% of the compound of example 47 (P(O3)$_2$UQU-3O-T) and 5% of the chiral dopant R-5011 are added and the properties of the resulting mixture are determined. The concentrations and the data are compiled in table 5.

TABLE 5

| | Use example 5 |
|---|---|
| Host mixture C P(O3)$_2$UQU-3O-T (Compound of example 47) | |
| c/% | 5 |
| c(R-5011)/% | 5 |
| T$_{trans}$/° C. | 33 |
| T trans – Iso/deg. | 38 |
| Flat T Range/deg. | 5 |
| V$_{100}$(T trans. + 2)/V | 69 |
| dV/dT(T trans. + 2)/V/deg. | 0 |
| +/−/V/deg. | 2 |
| dV*/dT(T trans. + 2)/deg.$^{-1}$ | 0.00 |
| +/−/deg.$^{-1}$ | 0.05 |

In these systems a blue phase is observed and the temperature dependence of the characteristic voltages is dramatically reduced, in fact, an extended range of temperatures with a flat temperature dependence is obtained.

Use-Example 6

(The physical parameters given in the use-examples 6 to 8 are determined according to "Merck Liquid Crystals, Physical Properties of Liquid Crystals", Status November 1997, Merck KGaA, Germany)

A liquid crystal mixture is realised consisting which has the following composition and properties.

TABLE 6

| Composition | |
|---|---|
| Compound Abbreviation | Conc./ % |
| BCH-3F•F | 10.79 |
| BCH-5F•F | 8.99 |
| ECCP-3OCF3 | 4.50 |
| ECCP-5OCF3 | 4.50 |
| CBC-33F | 1.80 |
| CBC-53F | 1.80 |
| CBC-55F | 1.80 |
| PCH-5F | 8.99 |
| PCH-6F | 7.19 |
| PCH-7F | 5.39 |
| CCP-2OCF3 | 7.19 |
| CCP-3OCF3 | 10.79 |

TABLE 6-continued

| CCP-4OCF3 | 6.29 |
|---|---|
| CCP-5OCF3 | 9.89 |
| P(O3)$_2$UQU-3O-T | 10.10 |
| Σ | 100.00 |

| Properties | |
|---|---|
| T(N, I) = | 65° C. |
| n$_e$ = | 1.5688 |
| Δn = | 0.0881 |
| ε∥ = | 11.2 |

Use-Example 7

A liquid crystal mixture is realised, which has the following composition and properties.

TABLE 7

| Composition | |
|---|---|
| Compound Abbreviation | Conc./ % |
| ME2N•F | 10.8 |
| ME3N•F | 10.8 |
| ME4N•F | 10.8 |
| ME5N•F | 10.8 |
| HP-3N•F | 4.5 |
| HP-4N•F | 4.5 |
| HP-5N•F | 4.5 |
| CC-5-V | 9.0 |
| CCG-V-F | 13.5 |
| CCPC-33 | 3.6 |
| CCPC-34 | 3.6 |
| CCPC-35 | 3.6 |
| P(O3)$_2$UQU-3O-T | 10.0 |
| Σ | 100.0 |

| Properties | |
|---|---|
| T(N, I) = | 51.2° C. |
| n$_e$ = | 1.6229 |
| Δn = | 0.1227 |
| ε∥ = | 58.8 |
| Δε = | +48.0 |

Use-Example 8

A liquid crystal mixture is realised, which has the following composition and properties.

TABLE 8

| Composition | |
|---|---|
| Compound Abbreviation | Conc./ % |
| CCP-2F•F•F | 10.8 |
| CCP-3F•F•F | 11.7 |
| CCP-5F•F•F | 7.2 |
| CCP-2OCF3 | 9.0 |
| CCP-3OCF3 | 7.2 |
| CCP-4OCF3 | 6.3 |
| CCP-5OCF3 | 7.2 |
| CGU-2-F | 10.8 |

TABLE 8-continued

| | |
|---|---|
| CGU-3-F | 10.8 |
| CGU-5-F | 9.0 |
| P(O3)₂UQU-3O-T | 10.0 |
| Σ | 100.0 |

| Properties | |
|---|---|
| T(N, I) = | 43.1° C. |
| $n_e$ = | 1.5601 |
| Δn = | 0.0781 |
| ε∥ = | 17.6 |

Use-Example 9

A liquid crystal mixture, host mixture D, is realised consisting of,

| Mixture D | |
|---|---|
| Compound Abbreviation | Concentration/ mass-% |
| AUUQU-3-N | 11.7 |
| CUZU-3-N | 10.6 |
| CUZU-3-N | 10.6 |
| HP-3N•F | 9.4 |
| AUUQU-3-OT | 11.8 |
| AUUQU-3-F | 10.6 |
| AUUQU-3-T | 9.4 |
| AUUQP-3-T | 5.9 |
| PUZU-3-F | 10.6 |
| PUZU-5-F | 9.4 |
| Σ | 100.0 |

This mixture has the following properties:

Clearing point (T(N,I))/° C.: 99.0.

Use-Example 9.1

To this mixture, host mixture D, 10% of the compound of example 47 (P(O3)₂UQU-3O-T) and 5% of the chiral dopant R-5011 are added, as shown in the following table, table 9, and the properties of the resulting mixture are determined. The results are compiled in table 9.

Use-Example 9.2

To the same mixture, host mixture D, now 5% of the compound of example 47 (P(O3)₂UQU-3O-T), and 5% of the chiral dopant R-5011 and 2% of its enantiomer S-5011 (equivalent to the addition of 3% of R-5011 and 4% of the racemate) are added, as shown in the following table, table 9, and the properties of the resulting mixture are determined. The results are compiled in table 9.

TABLE 9

| | Use example | |
|---|---|---|
| | 9.1 | 9.2 |
| Host mixture | D | |
| | P(O3)₂UQU-3O-OT | |
| | (Compound of example 47) | |
| c | 10 | 5 |
| c(R-5011)/% | | 5 |
| c(S-5011) | 0 | 2 |
| $T_{trans.}$/° C. | 31.0 | 49.0 |
| T trans – Iso/deg. | 33.0 | |
| Flat T Range/deg. | 13.5 | 7.0 |
| $V_{100}$(T trans. + 2)/V | 42 | 28 |

Use-Example 10

Use-Examples 10.1 and 10.2

To 85%, respectively 84%, of the host mixture D, used in example 9, 10% of the compound of example 1 (P(O3)₂UQU-3O-F) and the chiral dopant R-5011 is added in a concentration of 5% (Use-example 10.1), respectively of 4% (Use-example 10.2), and the properties of the resulting mixture are determined. The concentrations and the data are compiled in table 10.

TABLE 10

| | Use example | |
|---|---|---|
| | 10.1 | 10.2 |
| Host mixture D | | |
| P(O3)₂UQU-3O-F | | |
| (Compound of example 1) | | |
| C/% | 10 | |
| c(R-5011)/% | 5 | 4 |
| $T_{trans.}$/° C. | 33.0 | 42.0 |
| T trans – Iso/deg. | | |
| Flat T Range/deg. | 12.5 | 9.0 |
| $V_{100}$(T trans. + 2)/V | 43 | 35 |

Use-Example 11

Use-Example 11.1

To 85% of the host mixture D, used in Use-examples 9 and 10, 10% of the compound of example 3 (P(O6)₂UQU-6O-F)

and 5% of the chiral dopant R-5011 are added and the properties of the resulting mixture are determined. The concentrations and the data are compiled in table 11.

TABLE 11

| | Use example | |
|---|---|---|
| | 11.1 | 11.2 |
| | Host mixture | |
| | D | E |
| P(O6)$_2$UQU-6O-F (Compound of example 3) | | |
| c/% | 10 | 4 |
| c(R-5011)/% | 5 | 13 |
| T$_{trans.}$/° C. | 33.0 | 8.5 |
| T trans – Iso/deg. | | |
| Flat T Range/deg. | 15.0 | 20.0 |
| V$_{100}$(T trans. + 2)/V | 41 | 60 |

Use-Example 11.2

A liquid crystal mixture, host mixture E, is realised consisting of:

| Mixture E | |
|---|---|
| Compound Abbreviation | Concentration/ mass-% |
| AUUQGU-3-F | 9.0 |
| AUUQU-2-N | 8.0 |
| AUUQU-3-N | 9.0 |
| AUUQU-3-OT | 10.0 |
| AUUQU-3-T | 10.0 |
| AUUQU-3-F | 9.0 |
| AUUQP-3-T | 11.0 |
| CUZU-3-N | 7.0 |
| CUZU-3-N | 7.0 |
| HP-3N•F | 8.0 |
| PUZU-3-F | 5.0 |
| PUZU-5-F | 9.0 |
| UZU-3-N | 9.0 |
| Σ | 100.0 |

To 83% of this mixture, host mixture E, 4% of the compound of example 3 (P(O6)$_2$UQU-6O-F) and 13% of the chiral dopant R-5011 are added and the properties of the resulting mixture are determined. The concentrations and the data are compiled in table 11.

Use-Example 12

To 85% of the host mixture D, used in use-examples 0, 10 and 11.1, 10% of the compound of example 408 (P(O3)$_2$PQU-3O-F) and 5% of the chiral dopant R-5011 are added and the properties of the resulting mixture are determined. The concentrations and the data are compiled in table 12.

TABLE 12

| | Use example 12 |
|---|---|
| Host mixture D P(O3)$_2$PQU-3O-F (Compound of example 408) | |
| c/% | 5 |
| c(R-5011)/% | 10 |
| T$_{trans.}$/° C. | 44 |
| T trans – Iso/deg. | |
| Flat T Range/deg. | 11.5 |
| V$_{100}$(T trans. + 2)/V | 32 |

Use-Example 13

A liquid crystal mixture, host mixture F, is realised consisting of:

| Mixture F | |
|---|---|
| Compound Abbreviation | Concentration/ mass-% |
| AUUQU-3-N | 12.0 |
| AUZU-3-N | 12.0 |
| AUZU-5-N | 12.0 |
| GZU-3A-N | 9.0 |
| UZU-3A-N | 9.0 |
| AUUQU-3-OT | 12.0 |
| AUUQU-3-T | 8.0 |
| AUUQU-3-F | 8.0 |
| PUZU-3-F | 6.0 |
| PUZU-5-F | 12.0 |
| Σ | 100.0 |

Use-Examples 13.1 to 13.7

To this mixture, host mixture F, various concentrations of the compound of example 47 (P(O3)$_2$UQU-3O-T) and various concentrations of the chiral dopant R-5011 are added and the properties of the resulting mixtures are determined. The concentrations and the data are compiled in tables 13a and 13b.

TABLE 13a

| | Use example | | | |
|---|---|---|---|---|
| | 13.1 | 13.2 | 13.3 | 13.4 |
| Host mixture F P(O3)$_2$UQU-3O-OT (Compound of example 47) | | | | |
| c/% | | 5 | | 7 |
| c(R-5011) | 3 | 5 | 7 | 5 |
| T$_{trans.}$/° C. | 32.0 | 19.0 | 7.0 | 11.0 |
| T trans – Iso/deg. | | | | |
| Flat T Range/deg. | 4.0 | 8.5 | 12.5 | 11.5 |
| V$_{100}$(T trans. + 2)/V | 18 | 24 | 25 | 18.5 |

TABLE 13b

| | Use example | | |
|---|---|---|---|
| | 13.5 | 13.6 | 13.7 |
| Host mixture F | | | |
| P(O3)$_2$UQU-3O-OT | | | |
| (Compound of example 47) | | | |
| c/% | 2 | 5 | 2 |
| c(R-5011)/% | 3 | 5 | 3 |
| T$_{trans.}$/° C. | 12.0 | 4.0 | 3.5 |
| T trans – Iso/deg. | | | |
| Flat T Range/deg. | 14.5 | 13.5 | 18.5 |
| V$_{100}$(T trans. + 2)/V | 30 | 29.5 | 28 |

Use-Example 14

A liquid crystal mixture, host mixture G, is realised consisting of:

| Mixture G | |
|---|---|
| Compound Abbreviation | Concentration/ mass-% |
| AUUQU-2-F | 11.0 |
| AUUQU-3-F | 13.0 |
| AUUQU-4-F | 6.0 |
| AUUQU-5-F | 5.5 |
| AUUQU-7-F | 6.0 |
| AUUQU-3-T | 11.0 |
| AUUQU-3-OT | 13.0 |
| AUUQGU-3-F | 7.0 |
| PUZU-2-F | 5.5 |
| PUZU-3-F | 11.0 |
| PUZU-5-F | 11.0 |
| Σ | 100.0 |

This mixture has the following properties:

Clearing point (T(N,I))/° C., 75.0.

Use-Examples 14.1 and 14.2

To this mixture, host mixture G, alternatively 5% (use-example 14.1), 7% (use-example 14.2), and 10% (use-example 14.3), respectively, of the compound of example 47 (P(O3)$_2$UQU-3O-T) and 5% of the chiral dopant R-5011 are added and the properties of the resulting mixtures are determined. The concentrations and the data are compiled in table 14.

TABLE 14

| | Use example | | |
|---|---|---|---|
| | 14.1 | 14.2 | 14.3 |
| Host mixture F | | | |
| P(O3)$_2$UQU-3O-OT | | | |
| (Compound of example 47) | | | |
| c/% | 5 | 7 | 10 |
| c(R-5011)/% | | 5 | |
| T$_{trans.}$/° C. | 36.0 | n.d. | 7.5 |
| T trans – Iso/deg. | | | |

TABLE 14-continued

| | Use example | | |
|---|---|---|---|
| | 14.1 | 14.2 | 14.3 |
| Flat T Range/deg. | 6.0 | n.d. | 13.0 |
| V$_{100}$(T trans. + 2)/V | 47 | n.d. | 41.5 |

Use-Example 15

Use-Examples 15.1 to 15.3

Three different liquid crystal mixtures, host mixtures H to I, are realised consisting of:

| Mixture H | | Mixture I | |
|---|---|---|---|
| Compound Abbreviation | Compound Abbreviation | Concentration/ mass-% | Concentration/ mass-% |
| PPYP-4N | AUUQU-3-N | 11.0 | 10.0 |
| PTU-4O-N | GZU-3A-N | 10.0 | 10.0 |
| PU-3-AN | HP-3N•F | 8.0 | 15.0 |
| PU-5-AN | AUUQU-3-F | 9.0 | 12.0 |
| PGU-2-F | AUUQGU-3-F | 9.0 | 10.0 |
| PGU-3-F | CUZP-3-SF5 | 9.0 | 10.0 |
| PGU-5-F | PUZP-3-SF5 | 8.0 | 10.0 |
| PGU-4-T | AUZP-3-SF5 | 10.0 | 10.0 |
| AUUQU-3-N | AUUQP-2-SF5 | 9.0 | 4.0 |
| MU-3-AN | AUUQP-3-SF5 | 9.0 | 5.0 |
| PTG-3-N | AUUQP-5-SF5 | 8.0 | 4.0 |
| Σ | Σ | 100.0 | 100.0 |

| Mixture J | |
|---|---|
| Compound Abbreviation | Concentration/ mass-% |
| AUUQGU-3-F | 8.0 |
| AUUQU-3-F | 8.0 |
| AUUQU-3-N | 10.0 |
| AUUQU-3-OT | 9.0 |
| AUUQU-3-T | 9.0 |
| CUZU-2-N | 10.0 |
| CUZU-3-N | 10.0 |
| GZU-3A-N | 10.0 |
| HP-2N•F | 7.0 |
| PUZU-2-F | 6.0 |
| PUZU-3-F | 7.0 |
| UUQU-3°-F | 6.0 |
| Σ | 100.0 |

To each one of these mixtures, host mixtures H to K, the compound of example 47 (P(O3)$_2$UQU-3O-T) is addded together with the chiral dopant R-5011 in the concentrations given in table 15 and the properties of the resulting mixtures are determined. The results are compiled in table 15, too.

TABLE 15

| | Use example | | |
|---|---|---|---|
| | 15.1 | 15.2 | 15.3 |
| | Host mixture | | |
| | H | I | J |
| P(O3)$_2$UQU-3O-OT (Compound of example 47) | | | |
| c/% | 5 | 6 | 4.5 |
| c(R-5011) | 5 | 7 | 10.0 |
| T$_{trans.}$/° C. | 19.0 | 21.0 | 5.0 |
| T trans – Iso/deg. | | | |
| Flat T Range/deg. | 4.0 | 16.0 | 27.0 |
| V$_{100}$(T trans. + 2)/V | 45 | 56.5 | 55 |

Use-Example 16

A liquid crystal mixture, host mixture K, is realised consisting of:

| Mixture K | |
|---|---|
| Compound Abbreviation | Concentration/ mass-% |
| AUUQU-3-N | 11.0 |
| CUZU-2-N | 11.0 |
| CUZU-3-N | 11.0 |
| GZU-3A-N | 10.0 |
| HP-2N•F | 8.0 |
| AUUQU-3-OT | 9.0 |
| AUUQU-3-T | 10.0 |
| AUUQU-3-F | 9.0 |
| AUUQGU-3-F | 9.0 |
| PUZU-2-F | 4.0 |
| PUZU-3-F | 8.0 |
| Σ | 100.0 |

To this mixture, host mixture K, 5% of the compound of example 47 (P(O3)$_2$UQU-3O-T) is addded together with 9% of the chiral dopant BO2C*H—C-5 (which is a homologue of S-5011 (also: BO2C*H—C-3) with an n-pentyl terminal chain instead of an n-propyl group and which has an HTP in MLC-6260, available from Merck KGaA, at 20° C. of −71.7 μm$^{-1}$) and the property of the resulting mixture is determined. The results are compiled in table 16.

TABLE 16

| | Use example 16 |
|---|---|
| Host mixture K P(O3)$_2$PQU-3O-T (Compound of example 47) | |
| c/% | 5 |
| c(BO2C*H-C-5)/% | 9 |
| T$_{trans.}$/° C. | 34.5 |
| T trans – Iso/deg. | |
| Flat T Range/deg. | 14.5 |
| V$_{100}$(T trans. + 2)/V | 35.5 |

Use-Example 17

A liquid crystal mixture, host mixture L, which is similar to host mixture H used in use-example 15.1, is realised consisting of:

| Mixture L | |
|---|---|
| Compound Abbreviation | Concentration/ mass-% |
| PPYP-4N | 10.0 |
| PTU-4O-N | 10.0 |
| PU-3-AN | 13.0 |
| PU-5-AN | 13.0 |
| PGU-2-F | 10.0 |
| PGU-3-F | 12.0 |
| PGU-5-F | 10.0 |
| PGU-4-T | 10.0 |
| AUUQU-3-T | 5.0 |
| AUUQU-3-OT | 5.0 |
| MU-3-AN | 5.0 |
| PTG-3-N | 7.0 |
| Σ | 100.0 |

To this mixture, host mixture L, 10% of the compound of example 47 (P(O3)$_2$UQU-3O-T) is addded together with 5 of the chiral dopant R-5011 and the property of the resulting mixture is determined. The results are compiled in table 17.

TABLE 17

| | Use example 17 |
|---|---|
| Host mixture L P(O3)$_2$PQU-3O-T (Compound of example 47) | |
| c/% | 10 |
| c(R-5011)/% | 5 |
| T$_{trans.}$/° C. | 4.0 |
| T trans – Iso/deg. | |
| Flat T Range/deg. | 10.0 |
| V$_{100}$(T trans. + 2)/V | 53 |

The invention claimed is:

1. A liquid crystal medium comprising a strongly dielectrically positive liquid crystal component A, which comprises one or more compounds of formula I

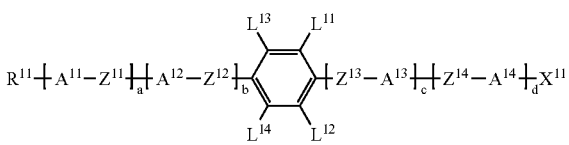

wherein:
a, b, c and d are independently of each other 0, 1 or 2, whereby a+b+c+d≦4;
R$^{11}$ is hydrogen, an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH═CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen; or aryl, aryloxy, alkylaryl, alkylaryloxy, alkylarylalkyl, alkylarylalkoxy, cycloalkyl, cycloalkyloxy, cycloalkylalkenyloxy, alkylcycloalkyl, alkylcycloalkyloxy or alkylcycloalkylalkenyloxy, each with up to 15 carbon atoms, wherein said in radicals being unsubstituted or mono-substituted with a —CN group or mono- or poly-substituted with halogen one ore more =CH— groups maybe replaced independently of each other by =N— and/orone more —CH$_2$— groups may be replaced independently of each other by —O—, —S—, —SiR$^x$R$^y$—, —CH=CH—, —C≡C—, —CO—O— and/or —O—CO— such that nitrogen and oxygen and/or sulfur atoms are not linked directly to each other;

L$^{11}$, L$^{12}$, L$^{13}$ and L$^{14}$ are, independently of each other, hydrogen, an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen; or aryl, aryloxy, alkylaryl, alkylaryloxy, alkylarylalkyl, alkylarylalkoxy, cycloalkyl, cycloalkyloxy, cycloalkylalkenyloxy, alkylcycloalkyl, alkylcycloalkyloxy or alkylcycloalkylalkenyloxy, each with up to 15 carbon atoms, wherein said in radicals being unsubstituted or mono-substituted with a —CN group or mono- or poly-substituted with halogen one ore more =CH—groups may be replaced independently of each other by =N— and/or one more —CH$_2$— groups may be replaced independently of each other by —O—, —S—, —SiR$^x$R$^y$—, —CH=CH—, —C≡C—, —CO—O— and/or —O—CO— such that nitrogen and oxygen and/or sulfur atoms are not linked directly to each other, provided that:
L$^{13}$ and L$^{14}$ are both alkoxy; or
L$^{11}$ and L$^{12}$ are both alkoxy; or
each of L$^{11}$, L$^{12}$, L$^{13}$, and L$^{14}$ are alkoxy;

X$^{11}$ is H, halogen, —CN, —NCS, —SF$_5$, —S-R$^Z$, —SO$_2$—R$^Z$, an alkyl or alkoxy radical having from 1 to 15 carbon atoms, wherein one or more methylene groups of said alkyl or alkoxy radical may be replaced independently of each other by —O—, —S—, —SiR$^X$R$^Y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen; or aryl, aryloxy, alkylaryl, alkylaryloxy, alkylarylalkyl, alkylarylalkoxy, cycloalkyl, cycloalkyloxy, cycloalkylalkenyloxy, alkylcycloalkyl, alkylcycloalkyloxy or alkylcycloalkylalkenyloxy, each with up to 15 carbon atoms, wherin said in radicals being unsubstituted or mono-substituted with a —CN group or mono- or poly-substituted with halogen one ore more =CH— groups may be replaced independently of each other by =N— and/or one more CH$_2$- groups may be replaced independently of each other by —O—, —S—, —SiR$^X$R$^Y$, —CH=CH—,—C≡C—, —CO—O— and/or —O—CO— such that nitrogen and oxygen and/or sulfur atoms are not linked directly to each other;

R$^x$ and R$^y$ are independently of each other hydrogen or an alkyl radical having from 1 to 7 carbon atoms;

R$^z$ is an alkyl radical having from 1 to 7 carbon atoms, said alkyl radical being unsubstituted or mono- or poly-substituted with halogen;

A$^{11}$, A$^{12}$, A$^{13}$ and A$^{14}$ are independently of each other a ring of one of the following formulas:

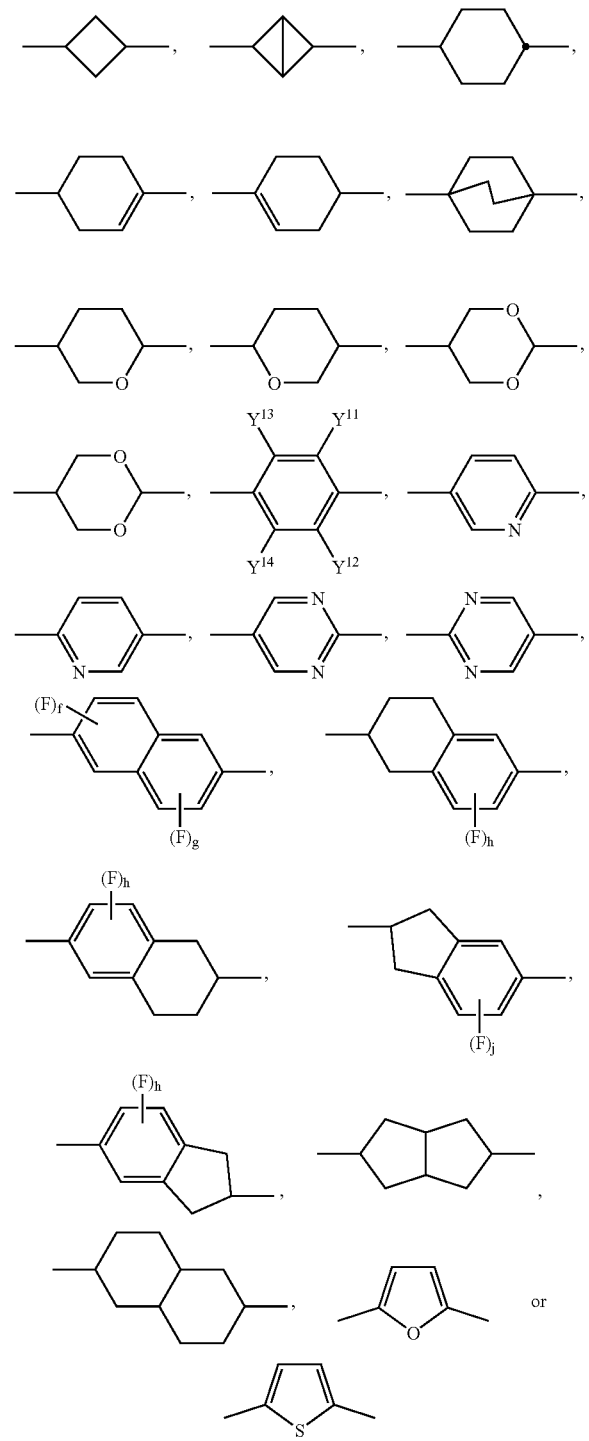

whereby each of A$^{11}$, A$^{12}$, A$^{13}$ and A$^{14}$ may be the same ring or two different rings if present more than once; and provided that at least one of A$^{11}$, A$^{12}$, A$^{13}$ and A$^{14}$ is

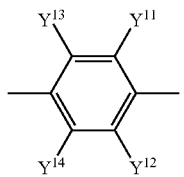

where $Y^{11}$ and $Y^{12}$ are both F, or $Y^{13}$ and $Y^{14}$ are both F, or each of $Y^{11}$, $Y^{12}$, $Y^{13}$, and $Y^{14}$ are F;

$Y^{11}$, $Y^{12}$, $Y^{13}$ and $Y^{14}$ are independently of each other hydrogen, halogen, an alkyl or alkoxy radical having from 1 to 15 carbon atoms wherein one or more methylene groups of said alkyl or alkoxy radical may be replaced independently of each other by —O—, —S—, —SiR$^x$R$^y$—, —CH=CH—, —C≡C—, —CO—O— and/or —O—CO— such that oxygen and/or sulfer atoms are not linked directly to each other, said alkyl or alkoxy radical being unsubstituted or mono- or poly-substituted with halogen; or aryl, aryloxy, alkylaryl, alkylaryloxy, alkylarylalkyl, alkylarylalkoxy, cycloalkyl, cycloalkyloxy, cycloalkylalkenyloxy, alkylcycloalkyl, alkylcycloalkyloxy or alkylcycloalkylalkenyloxy, each with up to 15 carbon atoms, wherin said in radicals being unsubstituted or mono-substituted with a —CN group or mono- or poly-substituted with halogen one ore more =CH— groups may be replaced independently of each other by =N— and/or one more —CH$_2$— groups may be replaced independently of each other by —O—, —S—, —SiR$^x$R$^y$—, —CH=CH—, —C≡C—, —CO—O— and/or —O—CO— such that nitrogen and oxygen and/or sulfur atoms are not linked directly to each other;

f, g, h and j are independently of each other 0, 1, 2 or 3;

$Z^{11}$, $Z^{12}$, $Z^{13}$ and $Z^{14}$ are independently of each other a single bond, —CH$_2$CH$_2$—CH—, (—CH$_2$CH$_2$—)$_2$, —CF$_2$—CF$_2$—, —CF$_2$—CH$_2$—, —CH$_2$—CF$_2$—, —CH=CH——CF=CF—, —CF=CH—, —CH=CF—, —C≡C—, —CH$_2$O—, —OCH$_2$—, —CF$_2$O—, —OCF$_2$—, —CO—O— or —O—CO— whereby each of $Z^{11}$, $Z^{12}$, $Z^{13}$ and $Z^{14}$ may have the same or a different meaning if present more than once.

2. A Liquid crystal medium according to claim 1, which comprises one or more compounds of formula I-1

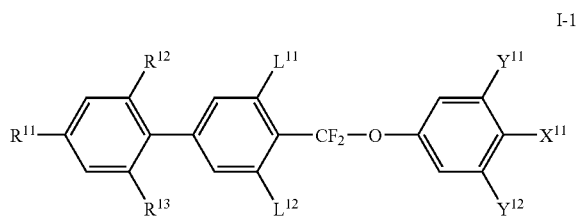

wherein $R^{12}$ and $R^{13}$ independently have one of the meanings for $R^{11}$ and the other parameters have the meaning given in claim 17, provided that at least one of the pairs: $R^{12}$ and $R^{13}$; or $L^{11}$ and $L^{12}$; are both alkoxy and that $Y^{11}$ and $Y^{12}$ are both F.

3. A Liquid crystal medium according to claim 2, which comprises one or more compounds of formula I-1 wherein:

$R^1$, $R^{12}$ and $R^{13}$, independently of each other, are n-alkyl or n-alkoxy with 1 to 20 C-atoms, alkenyl, alkenyloxy or alkoxyalkyl with 2 to 20 C-atoms or CN, NCS, halogen, halogenated alkyl, alkenyl or alkoxy, $L^{11}$, $L^{12}$, $Y^{11}$ and $Y^{12}$, independently of each other, are H, halogen, CN, NCS, halogenated alkyl, alkenyl or alkoxy, $X^{11}$ is H, halogen or Cl, CN, NCS, SF$_5$, —SCF$_3$, —SO$_2$CF$_3$, —SO$_2$C$_2$F$_5$, —SO$_2$C$_4$F$_9$, halogenated alkyl, alkenyl or alkoxy.

4. A Liquid crystal medium according to claim 1, wherein the dielectrically positive component B comprises one or more compounds of formula II

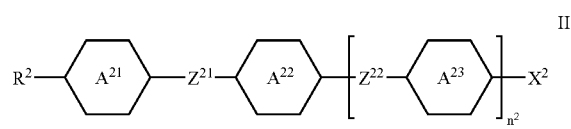

wherein $n^2$ is 0, 1 or 2, $R^2$ has the meaning given for $R^{11}$ under formula I in claim 1, $Z^{21}$ and $Z^{22}$, independently of each other, are a single bond, —CH$_2$CH$_2$—, (—CH$_2$CH$_2$—)$_2$, —CF$_2$—CF$_2$—, —CF$_2$—CH$_2$—, —CH$_2$—CF$_2$—, —CH=CH—, —CF=CF—, —CF=CH—, —CH=CF—, —C≡C—, —CH$_2$O—, —OCH$_2$—, —CF$_2$O—, —OCF$_2$—, —CO—O— or —O—CO— whereby each of $Z^{22}$ may have the same or a different meaning if present twice,

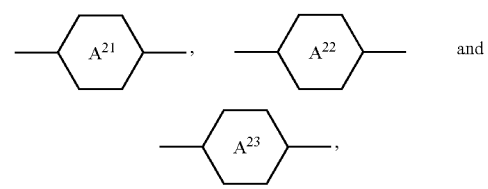

each, independently of each other, are

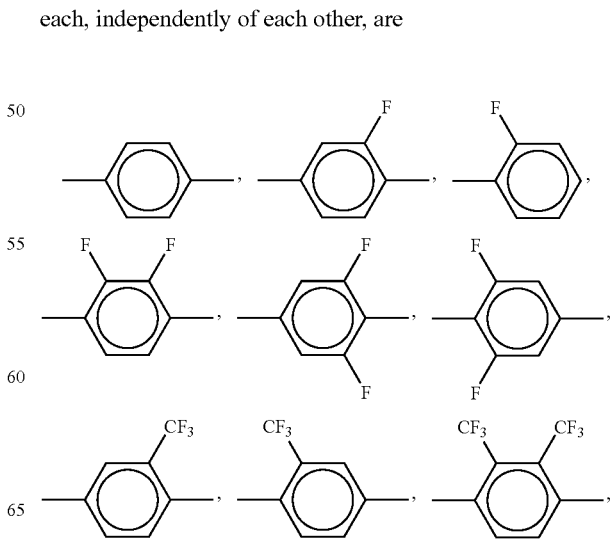

-continued

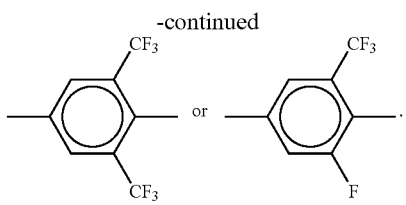

whereby

is also

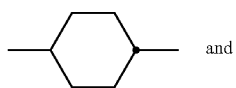
and $X^2$ is CN, NCS, $SF_5$, $SO_2CF_3$, $CF_3$, $OCF_3$, F or Cl.

5. A compound of formula I-1

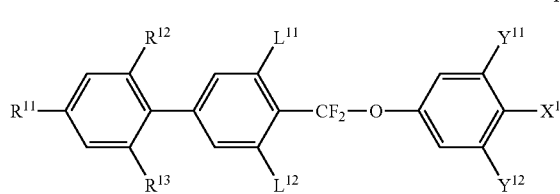

I-1 wherein:

$R^{11}$, $R^{12}$ and $R^{13}$, independently of each other, are n-alkyl or n-alkoxy with 1 to 20 C-atoms, alkenyl, alkenyloxy or alkoxyalkyl with 2 to 20 C-atoms, or CN, NCS, halogen, halogenated alkyl, alkenyl or alkoxy, $L^{11}$ and $L^{12}$, independently of each other, are H, halogen, CN, NCS, unsubstituted or halogenated alkyl, alkenyl or alkoxy, provided that at least one of the pairs: $R^{12}$ and $R^{13}$ or $L^{12}$; are both alkoxy, $Y^{11}$ and $Y^{12}$ are both F, and $X^{11}$ is H, halogen, CN, NCS, $SF_5$, $SO_2CF_3$, unsubstituted or halogenated alkyl, alkenyl or alkoxy.

6. A compound of formula I-1 of claim 5, wherein $X^{11}$ is fluorinated alkyl, alkenyl or alkoxy.

7. A compound of formula I-1 of claim 5, wherein:

$R^{11}$, $R^{12}$ and $R^{13}$, independently of each other, are n-alkyl or n-alkoxy with 1 to 7 C-atoms, alkenyl, alkenyloxy or alkoxyalkyl with 2 to 7 C-atoms, CN, NCS, halogen.

8. A compound of formula I-1 of claim 5, wherein:

$R^{11}$, $R^{12}$ and $R^{13}$, independently of each other, are n-alkyl or n-alkoxy with 2 to 5 C-atoms alkenyl, alkenyloxy or alkoxyalkyl with 2 to 7 C-atoms or CN, NCS, F, Cl, or halogenated alkyl, alkenyl or alkoxy, and $L^{11}$ and $L^{12}$, independently of each other, are H, halogen, CN, NCS, unsubstituted or florinated alkyl, alkenyl or alkoxy, provided that at least one of the pairs: $R^{12}$ and $R^{13}$; or $L^{11}$ and $L^{12}$; are both alkoxy.

9. A compound of formula I-1 of claim 5, wherein:

$R^{11}$, $R^{12}$ and $R^{13}$ are identical to each other.

10. A compound of formula I-1 of claim 5, wherein:

$R^{11}$, $R^{12}$ and $R^{13}$, independently of each other, are n-alkyl or n-alkoxy with 1 to 7 C-atoms or alkenyloxy with 2 to 7 C-atoms,

11. A compound of formula I-1 of claim 5, wherein:

$X^{11}$ is F, Cl, CN, NCS, $SF_5$, $SO_2CF_3$, F, $CF_3$ or $OCF_3$.

12. A compound of formula I-1 of claim 5, wherein:

$L^{11}$ and $L^{12}$ are independently of each other, H or F.

13. A liquid crystal display which comprises a liquid crystal medium according to claim 1.

14. A liquid crystal display according to claim 13, which is operated or operable at a temperature at which liquid crystal medium is in an optically isotropic state.

15. A liquid crystal medium comprising a compound according to claim 6.

16. An electro-optical display comprising a liquid crystal medium according to claim 15.

17. An electro-optical display comprising a liquid crystal medium according to claim 1.

18. An electro-optical display comprising a liquid crystal medium according to claim 2.

* * * * *

UNITED STATES PATENT AND TRADEMARK OFFICE
CERTIFICATE OF CORRECTION

PATENT NO. : 7,531,106 B2 Page 1 of 1
APPLICATION NO. : 10/569459
DATED : May 12, 2009
INVENTOR(S) : Peer Kirsch et al.

It is certified that error appears in the above-identified patent and that said Letters Patent is hereby corrected as shown below:

Column 109, line 11, reads "and/orone more -$CH_2$- groups may be replaced inde-" should read -- and/or one more -$CH_2$- groups may be replaced inde- --

Column 110, line 25, please delete " " and insert -- --

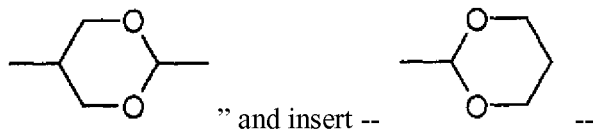

Column 111, line 38, reads "single bond, -$CH_2CH_2$-CH-, (-$CH_2CH_2$-)$_2$," should read -- single bond, -$CH_2CH_2$, (-$CH_2CH_2$-)$_2$ --

Column 111, line 66, reads "$R^1$, $R^{12}$ and $R^{13}$, independently have one of the meanings" should read -- $R^{11}$, $R^{12}$, and $R^{13}$, independently have one of the meanings --

Column 112, line 3, reads "$L^{11}$, $L^{12}$, $Y^{11}$, and $Y^{12}$, independently of each other, are H," should read -- $L^{11}$ and $L^{12}$, independently of each other, are H --

Column 114, line 1, reads "provided that at least one of the pairs: $R^{12}$ and $R^{13}$ or $L^{12}$;" should read -- provided that at least one of the pairs: $R^{12}$ and $R^{13}$ or $L^{11}$ and $L^{12}$ --

Signed and Sealed this

Twenty-first Day of July, 2009

JOHN DOLL
*Acting Director of the United States Patent and Trademark Office*